US012794756B1

(12) United States Patent
Piazza et al.

(10) Patent No.: US 12,794,756 B1
(45) Date of Patent: Nov. 10, 2026

(54) AI-DRIVEN PREDICTIVE, DIAGNOSTIC, AND RISK ANALYTICS FOR INFORMATION TECHNOLOGY OPERATIONS

(71) Applicant: Ensono, Inc., Downers Grove, IL (US)

(72) Inventors: James R. Piazza, Chesterfield, MO (US); Christopher Wayne Howie, Inman, SC (US); John Stamford, Hull (GB)

(73) Assignee: Ensono, Inc., Downers Grove, IL (US)

( * ) Notice: Subject to any disclaimer, the term of this patent is extended or adjusted under 35 U.S.C. 154(b) by 0 days.

(21) Appl. No.: 19/664,105

(22) Filed: Apr. 30, 2026

(51) Int. Cl.
*H04L 41/0604* (2022.01)
*H04L 41/0631* (2022.01)
*H04L 41/16* (2022.01)

(52) U.S. Cl.
CPC ...... *H04L 41/0609* (2013.01); *H04L 41/0631* (2013.01); *H04L 41/16* (2013.01)

(58) Field of Classification Search
CPC .. H04L 41/0609; H04L 41/0631; H04L 41/16
See application file for complete search history.

(56) References Cited

U.S. PATENT DOCUMENTS 11,252,052 B1 2/2022 Babu Balasubramani et al.
12,580,805 B2 3/2026 Zhang et al.
2019/0132191 A1 5/2019 Mann et al.
2023/0289586 A1* 9/2023 Breen .................. G06N 3/0464
2023/0419176 A1* 12/2023 Wang ..................... G06N 3/045
2024/0248790 A1 7/2024 Verma et al.
2025/0131032 A1 4/2025 Platais et al.
2025/0284579 A1 9/2025 Ball et al.
2026/0023642 A1* 1/2026 Agrawal ............. G06F 11/0793
2026/0037533 A1 2/2026 Ghosh et al.
2026/0142987 A1 5/2026 Neverkar et al.
2026/0178282 A1 6/2026 Narang et al.

FOREIGN PATENT DOCUMENTS

EP 3447696 A1 2/2019
WO 2024251381 A1 12/2024

* cited by examiner

*Primary Examiner* — Quang N Nguyen
(74) *Attorney, Agent, or Firm* — Bryan Cave Leighton Paisner LLP

(57) ABSTRACT

A computer-implemented method including receiving operational telemetry data from one or more monitoring sources and an ITSM platform. The operational telemetry data can include alert events, incident records, change requests, and configuration item metadata. The method also can include generating structured features from the operational telemetry data. The structured features can include temporal features, relational features, and cross-tenant features. The method additionally can include routing the operational telemetry data to one or more of a predictive system, a diagnostic system, or a change risk system based at least on an event type of the operational telemetry data. The method further can include generating, by the one or more of the predictive system, the diagnostic system, or the change risk system, one or more model outputs based at least on the structured features. The method additionally can include evaluating the one or more model outputs based at least on a confidence score to produce an aggregated risk evaluation. The method further can include executing an operational response based at least on the aggregated risk evaluation. Other embodiments are described.

20 Claims, 15 Drawing Sheets

AI-DRIVEN PREDICTIVE, DIAGNOSTIC, AND RISK ANALYTICS FOR INFORMATION TECHNOLOGY OPERATIONS

CROSS-REFERENCE TO RELATED APPLICATIONS

The following four applications, including this application, are being filed concurrently, and the other three are hereby incorporated by reference in their entirety:

1. U.S. patent application Ser. No. 19/664,105, filed Apr. 30, 2026, titled "AI-DRIVEN PREDICTIVE, DIAGNOSTIC, AND RISK ANALYTICS FOR INFORMATION TECHNOLOGY OPERATIONS";
2. U.S. patent application Ser. No. 19/664,135, filed Apr. 30, 2026, titled "AI-DRIVEN PREDICTIVE, DIAGNOSTIC, AND RISK ANALYTICS FOR INFORMATION TECHNOLOGY OPERATIONS";
3. U.S. patent application Ser. No. 19/664,163, filed Apr. 30, 2026, titled "AI-DRIVEN PREDICTIVE, DIAGNOSTIC, AND RISK ANALYTICS FOR INFORMATION TECHNOLOGY OPERATIONS"; and
4. U.S. patent application Ser. No. 19/664,202, filed Apr. 30, 2026, titled "AI-DRIVEN PREDICTIVE, DIAGNOSTIC, AND RISK ANALYTICS FOR INFORMATION TECHNOLOGY OPERATIONS".

TECHNICAL FIELD

This disclosure generally relates to artificial intelligence (AI)-driven predictive, diagnostic, and risk analytics for information technology operations.

BACKGROUND

Information technology operations environments generate operational data across distributed computing infrastructure, such as mainframes, distributed systems, networks, and cloud platforms. The operational data can include alerts, incidents, change records, and configuration item telemetry. Organizations often deploy monitoring tools, incident tracking platforms, and change governance systems to collect and process this operational data. The volume and variety of operational data generated across these computing environments can present considerations for timely analysis and response. The coordination of operational data analysis across multiple data streams presents ongoing considerations for information technology operations.

BRIEF DESCRIPTION OF THE DRAWINGS

To facilitate further description of the embodiments, the following drawings are provided in which.

Figure 1:
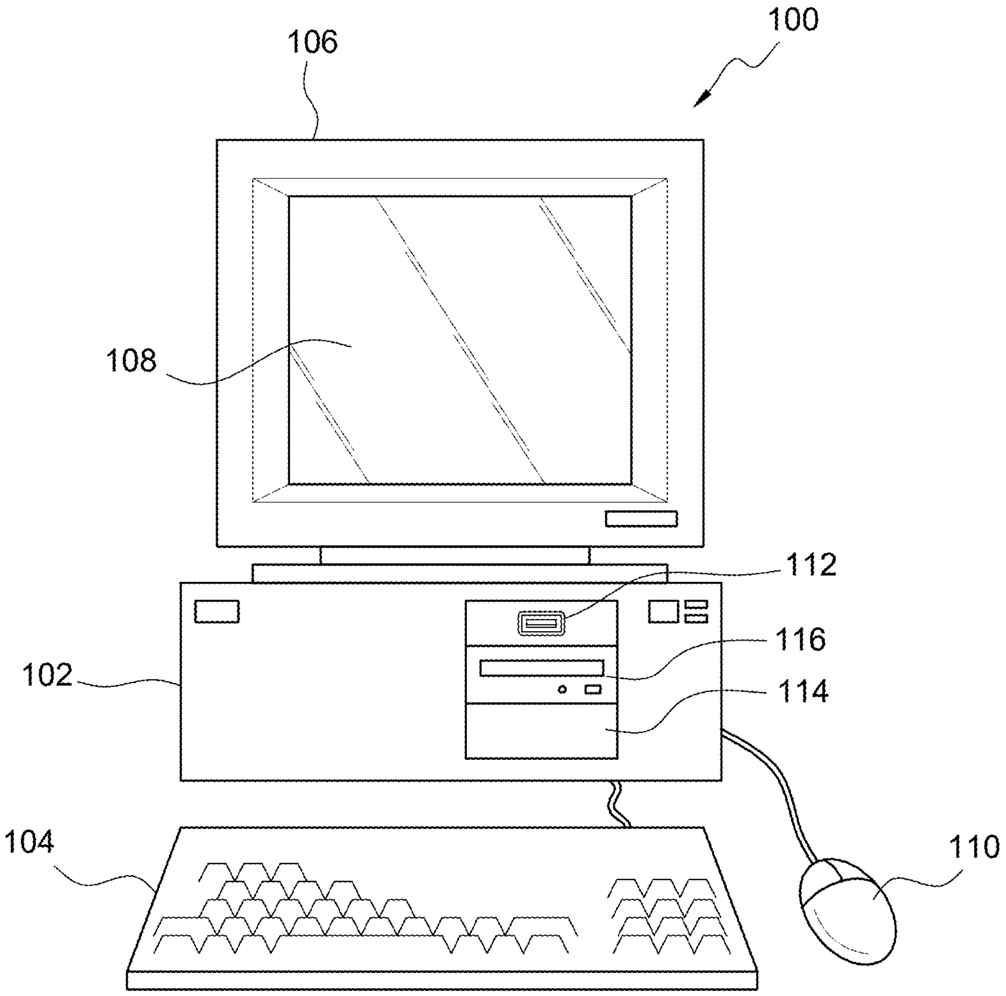
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds, for example.

DESCRIPTION OF EXAMPLES OF EMBODIMENTS

The systems and methods described herein pertain to AI-driven predictive, diagnostic, and risk analytics for information technology operations. The systems and methods described herein can address the intersection of several technical disciplines, including operational telemetry analysis, machine learning-based incident prediction, similarity-based diagnostic acceleration, and/or change risk evaluation across heterogeneous computing infrastructure. The systems and methods described herein can be designed to operate within information technology environments ranging from single-tenant enterprise deployments to multi-tenant managed service operations spanning mainframes, distributed systems, networks, and/or cloud platforms.

Enterprise information technology operations environments can generate large volumes of operational data, such as alerts, events, incident records, change requests, and/or configuration item telemetry, across heterogeneous computing infrastructure. Organizations can deploy monitoring tools, incident tracking platforms, change governance systems, and/or knowledge bases to collect and process this operational data. These systems can operate in isolation from one another, with monitoring tools generating alerts independently from incident tracking platforms and/or change governance systems. Conventional monitoring systems can rely on static threshold-based alerting, rule-based correlation engines, reactive incident detection, and/or manual triage processes.

Enterprise information technology organizations can handle large volumes of incidents across heterogeneous environments, such as mainframes, distributed systems, cloud platforms, and/or networks. Incident resolution processes can rely on manual knowledge searches, static knowledge bases, keyword-based matching, and/or resolver experience. These approaches can lack contextual similarity beyond keyword matching, and/or can lack the ability to benchmark expected resolution duration and/or quantify resolution acceleration.

Enterprise information technology change processes can rely on manual change advisory board review, static risk classifications, declarative fields such as risk, impact, and/or type designations, incomplete documentation review, and/or human interpretation of historical performance. These conventional change processes can lack the ability to dynamically quantify risk, and/or can lack integration between compliance timing risk and incident risk. Conventional change processes can lack behavioral scoring of change owners and/or teams, contextual intelligence from configuration item metadata, and/or structured learning from historical change failures. Conventional change processes also can rely on declared risk fields instead of computed risk.

In many embodiments, the systems and methods described herein can provide for AI-driven operational risk analytics across predictive, diagnostic, and/or preventive intelligence systems. In some embodiments, the system can include a decision system that functions as a supervisory control layer above multiple AI subsystems and/or operational data streams. In some embodiments, the decision system can integrate predictive intelligence for pre-incident detection, diagnostic acceleration intelligence for incident resolution, and/or change risk and compliance intelligence for change governance. In some embodiments, the decision system can perform confidence-based arbitration between models, apply customer-specific dynamic thresholds, track cross-module feedback loops, and/or coordinate automated operational responses. In some embodiments, the decision system can continuously recalibrate based on performance drift. In some embodiments, the decision system can implement a unified orchestration framework that links operational telemetry ingestion, feature engineering, model arbitration, and/or automated action coordination within a single processing pipeline, which can reduce the separation between monitoring tools, incident tracking platforms, and/or change governance systems.

In many embodiments, the decision system can route operational events to a predictive system, a diagnostic system, and/or a change risk system based on event type. In some embodiments, alert events and/or operational events can be routed to the predictive system, active incidents can be routed to the diagnostic system, and/or change requests can be routed to the change risk system. In some embodiments, the decision system can cross-link predictions with upcoming changes, flag predicted incidents that correlate with scheduled changes, and/or escalate high-risk changes when predictive signals increase.

In many embodiments, the decision system can maintain a model registry that can include base predictive models, specialized infrastructure models, diagnostic similarity models, and/or change risk scoring models. In some embodiments, when a model produces output, the decision system can evaluate model confidence, compare historical calibration accuracy, and/or determine whether to accept the output, route to a secondary model, aggregate multiple outputs, and/or escalate to human review. In some embodiments, the confidence-based arbitration can provide a technical improvement to the functioning of the machine learning models by dynamically selecting and/or combining model outputs based on measured confidence, rather than relying on a single static model for all infrastructure types. In some embodiments, the confidence-based arbitration can reduce false positive rates in incident prediction and/or improve generalization of machine learning models across heterogeneous computing environments, such as mainframes, distributed systems, networks, and/or cloud platforms.

In many embodiments, the system can record predictions made, diagnoses recommended, change risk classifications, and/or actual outcomes such as whether an incident occurred, whether a change failed, and/or resolution time. In some embodiments, these outcomes can be fed into periodic retraining cycles, used to recalibrate threshold sensitivity, and/or used to adjust arbitration weighting. In some embodiments, reinforcement adjustments can occur during retraining intervals rather than in live inference, which can maintain inference latency while incorporating performance feedback. In some embodiments, the closed-loop feedback can provide a technical improvement to the machine learning models by detecting feature drift in the operational telemetry data and/or triggering retraining recommendations when distribution shifts are detected, which can maintain model accuracy as operational patterns change over time.

In many embodiments, the system can train models across multiple tenants while maintaining tenant-isolated thresholding. In some embodiments, tenant data can be aggregated as part of a single model training run, enabling cross-tenant pattern learning while maintaining tenant-specific threshold configurations. In some embodiments, the system can track cross-tenant learning effectiveness and/or measure transfer learning success rate. In some embodiments, the cross-tenant machine learning can provide a technical improvement to the training process by aggregating diverse operational patterns across heterogeneous computing environments into a single model training run, which can improve the generalization capability of the resulting machine learning models and/or reduce cold-start limitations for new tenants.

In many embodiments, when thresholds are exceeded, the system can create predicted incidents, trigger ticket generation within an information technology service management (ITSM) platform, notify operations teams, escalate to change advisory board review, and/or block high-risk change approval. In some embodiments, all automated actions (or certain portions thereof) can be logged for audit and/or retraining purposes.

In many embodiments, the system can include a predictive system that can ingest multi-tenant operational telemetry data and/or engineer temporal and relational features across alerts, incidents, changes, and/or configuration items. In some embodiments, the predictive system can train machine learning models across multiple tenants to detect patterns preceding major incidents. In some embodiments, the predictive system can generate probabilistic risk scores within a defined time horizon, such as up to approximately one hour before incident manifestation. In some embodiments, the predictive system can produce both a risk probability score and/or an impact classification, such as low, medium, and/or high. In some embodiments, the predictive system can apply customer-specific dynamic thresholds to trigger alerts. In some embodiments, the predictive system can use a confidence-based arbitration mechanism to route low-confidence predictions to secondary specialized models. In some embodiments, the predictive system can continuously retrain models using resolved incident data and/or feedback loops. In some embodiments, the predictive system can operate in real-time and/or near-real-time using streaming ingestion mechanisms and/or scheduled retraining cycles.

In many embodiments, the system can include a diagnostic system that can ingest incident information, journal notes, assignment history, configuration item information, and/or resolution outcomes. In some embodiments, the diagnostic system can generate structured feature embeddings using natural language processing and/or operational metadata. In some embodiments, the diagnostic system can identify similarity clusters across tenants using semantic similarity scoring and/or string similarity scoring, such as Jaro-Winkler similarity. In some embodiments, the diagnostic system can produce confidence-weighted recommended cases, calculate expected resolution time benchmarks, and/or quantify actual hours saved relative to similar historical cases. In some embodiments, the diagnostic system can differentiate between cycle time and/or active work time. In some embodiments, the diagnostic system can learn from user feedback and/or resolution outcomes to recalibrate similarity scoring. In some embodiments, the diagnostic system can provide both operational acceleration and/or measurable financial impact attribution. In some embodiments, the contextual similarity scoring can provide a technical improvement to the incident resolution process by reducing the search space of historical incidents to contextually relevant matches based on multiple dimensions, such as semantic content, configuration item correlation, assignment group patterns, and/or resolution patterns, rather than relying on keyword-based matching alone.

In many embodiments, the system can include a change risk system that can ingest structured change request data, configuration management database intelligence, and/or configuration item metadata. In some embodiments, the change risk system can analyze behavioral history of change owners and/or teams. In some embodiments, the change risk system can determine heuristic risk scores across compliance, timing, and/or operational factors. In some embodiments, the change risk system can perform similarity-based historical failure analysis and/or predict probability of a change causing a major incident. In some embodiments, the change risk system can evaluate documentation quality using language models. In some embodiments, the change risk system can generate explainable recommendation outputs, such as an auto-approve recommendation, a needs-review recommendation, and/or a manual-approval recommendation. In some embodiments, the change risk system can combine deterministic risk scoring, historical statistical analysis, pattern-based similarity matching, and/or large language model contextual reasoning. In some embodiments, the hybrid architecture can include heuristic fallback logic that can provide deterministic behavior when the large language model is unavailable, which can maintain operational continuity of the change risk evaluation process.

In many embodiments, the systems and methods disclosed herein can provide practical applications in various information technology operations environments, such as enterprise data centers, managed service operations, multi-tenant hosting environments, and/or other computing environments in which coordinated predictive, diagnostic, and/or risk analytics can enhance operational outcomes. The system can provide coordinated analytics across multiple operational data streams while reducing dependency on manual intervention and/or static rule-based approaches.

In some embodiments, the systems and methods described herein can provide technical improvements and advantages over conventional monitoring systems that rely on static threshold-based alerting and/or rule-based correlation engines, by providing probabilistic machine learning-based prediction that can detect patterns preceding major incidents across heterogeneous computing infrastructure.

In some embodiments, the systems and methods described herein can provide technical improvements and advantages over conventional systems in which monitoring tools, incident tracking platforms, and/or change governance systems operate in isolation from one another, by providing a unified orchestration framework that coordinates predictive, diagnostic, and/or risk analytics across multiple operational data streams.

In some embodiments, the systems and methods described herein can provide technical improvements and advantages over conventional systems that do not adaptively arbitrate between multiple predictive models, by providing confidence-based arbitration that evaluates model confidence, routes low-confidence predictions to secondary specialized models, and/or aggregates multiple model outputs using weighted voting.

In some embodiments, the systems and methods described herein can provide technical improvements and advantages over conventional incident resolution processes that rely on manual knowledge searches, static knowledge bases, and/or keyword-based matching, by providing contextual similarity scoring that combines semantic embeddings and/or string similarity scoring to identify similar historical incidents across multiple tenants.

In some embodiments, the systems and methods described herein can provide technical improvements and advantages over conventional change governance systems that rely on manual change advisory board review, static risk classifications, and/or declarative risk fields, by providing multi-dimensional risk scoring that combines compliance risk, behavioral risk, major incident probability, and/or documentation quality evaluation.

In some embodiments, the systems and methods described herein can provide technical improvements and advantages over conventional change governance systems that rely on human interpretation of historical performance and/or incomplete documentation review, by providing a hybrid architecture that combines deterministic heuristic risk scoring with large language model contextual reasoning to generate explainable approval recommendations with field-level flag classifications.

In some embodiments, the systems and methods described herein can provide technical improvements and advantages over single-tenant analytical systems that lack cross-environment learning, by providing cross-tenant machine learning in which models can be trained on aggregated multi-tenant operational telemetry data while preserving tenant-specific threshold configurations and/or risk tolerance profiles.

In some embodiments, the systems and methods described herein can provide technical improvements and advantages over reactive incident detection systems that detect incidents after service impact has occurred, by providing predictive analytics that can generate probabilistic risk scores within a defined time horizon using an ensemble of machine learning models operating in parallel with weighted voting.

In some embodiments, the systems and methods described herein can provide technical improvements and advantages over conventional systems that do not incorporate cross-module feedback, by providing closed-loop feedback integration in which actual operational outcomes can be fed into periodic retraining cycles to recalibrate threshold sensitivity, adjust arbitration weighting, and/or detect feature drift.

Various embodiments include a computer-implemented method including receiving operational telemetry data from one or more monitoring sources and an ITSM platform. The operational telemetry data can include alert events, incident records, change requests, and configuration item metadata. The method also can include generating structured features from the operational telemetry data. The structured features can include temporal features, relational features, and cross-tenant features. The method additionally can include routing the operational telemetry data to one or more of a predictive system, a diagnostic system, or a change risk system based at least on an event type of the operational telemetry data. The method further can include generating, by the one or more of the predictive system, the diagnostic system, or the change risk system, one or more model outputs based at least on the structured features. The method additionally can include evaluating the one or more model outputs based at least on a confidence score to produce an aggregated risk evaluation. The method further can include executing an operational response based at least on the aggregated risk evaluation.

A number of embodiments include a system including one or more processors and one or more non-transitory computer-readable media storing computing instructions that, when executed on the one or more processors, cause the one or more processors to perform various operations. The operations can include receiving operational telemetry data from one or more monitoring sources and an ITSM platform. The operational telemetry data can include alert events, incident records, change requests, and configuration item metadata. The operations also can include generating structured features from the operational telemetry data. The structured features can include temporal features, relational features, and cross-tenant features. The operations additionally can include routing the operational telemetry data to one or more of a predictive system, a diagnostic system, or a change risk system based at least on an event type of the operational telemetry data. The operations further can include generating, by the one or more of the predictive system, the diagnostic system, or the change risk system, one or more model outputs based at least on the structured features. The operations additionally can include evaluating the one or more model outputs based at least on a confidence score to produce an aggregated risk evaluation. The operations further can include executing an operational response based at least on the aggregated risk evaluation.

Some embodiments include one or more non-transitory computer-readable media storing computing instructions that, when executed on one or more processors, cause the one or more processors to perform various operations. The operations can include receiving operational telemetry data from one or more monitoring sources and an ITSM platform. The operational telemetry data can include alert events, incident records, change requests, and configuration item metadata. The operations also can include generating structured features from the operational telemetry data. The structured features can include temporal features, relational features, and cross-tenant features. The operations additionally can include routing the operational telemetry data to one or more of a predictive system, a diagnostic system, or a change risk system based at least on an event type of the operational telemetry data. The operations further can include generating, by the one or more of the predictive system, the diagnostic system, or the change risk system, one or more model outputs based at least on the structured features. The operations additionally can include evaluating the one or more model outputs based at least on a confidence score to produce an aggregated risk evaluation. The operations further can include executing an operational response based at least on the aggregated risk evaluation.

Various embodiments include a computer-implemented method including receiving multi-tenant operational telemetry data. The multi-tenant operational telemetry data can include alert events, incident records, and configuration item metadata. The method also can include generating temporal features and relational features from the multi-tenant operational telemetry data. The temporal features can include time-windowed aggregation of event frequency metrics and alert burst patterns. The relational features can include configuration item-level aggregation and assignment group transitions. The method additionally can include generating, by an ensemble of machine learning models operating in parallel based at least on the temporal features and the relational features, a prediction output for a major incident within a predefined time horizon. The prediction output can include an incident probability score and an impact classification. The method further can include comparing a confidence score associated with the prediction output against a predefined threshold. The method additionally can include applying a tenant-specific risk threshold to the incident probability score when the confidence score meets or exceeds the predefined threshold. The method further can include generating one or more operational alerts when the incident probability score exceeds the tenant-specific risk threshold.

A number of embodiments include a system including one or more processors and one or more non-transitory computer-readable media storing computing instructions that, when executed on the one or more processors, cause the one or more processors to perform various operations. The operations can include receiving multi-tenant operational telemetry data. The multi-tenant operational telemetry data can include alert events, incident records, and configuration item metadata. The operations also can include generating temporal features and relational features from the multi-tenant operational telemetry data. The temporal features can include time-windowed aggregation of event frequency metrics and alert burst patterns. The relational features can include configuration item-level aggregation and assignment group transitions. The operations additionally can include generating, by an ensemble of machine learning models operating in parallel based at least on the temporal features and the relational features, a prediction output for a major incident within a predefined time horizon. The prediction output can include an incident probability score and an impact classification. The operations further can include comparing a confidence score associated with the prediction output against a predefined threshold. The operations additionally can include applying a tenant-specific risk threshold to the incident probability score when the confidence score meets or exceeds the predefined threshold. The operations further can include generating one or more operational alerts when the incident probability score exceeds the tenant-specific risk threshold.

Some embodiments include one or more non-transitory computer-readable media storing computing instructions that, when executed on one or more processors, cause the one or more processors to perform various operations. The operations can include receiving multi-tenant operational telemetry data. The multi-tenant operational telemetry data can include alert events, incident records, and configuration item metadata. The operations also can include generating temporal features and relational features from the multi-tenant operational telemetry data. The temporal features can include time-windowed aggregation of event frequency metrics and alert burst patterns. The relational features can include configuration item-level aggregation and assignment group transitions. The operations additionally can include generating, by an ensemble of machine learning models operating in parallel based at least on the temporal features and the relational features, a prediction output for a major incident within a predefined time horizon. The prediction output can include an incident probability score and an impact classification. The operations further can include comparing a confidence score associated with the prediction output against a predefined threshold. The operations additionally can include applying a tenant-specific risk threshold to the incident probability score when the confidence score meets or exceeds the predefined threshold. The operations further can include generating one or more operational alerts when the incident probability score exceeds the tenant-specific risk threshold.

Various embodiments include a computer-implemented method including receiving active incident data for an active incident and historical incident data. The active incident data can include active incident information and active configuration item information. The historical incident data can include historical incident information, historical configuration item information, and historical resolution outcomes. The method also can include generating feature embeddings from the active incident data and the historical incident data. The feature embeddings can include semantic embeddings and structured operational metadata embeddings. The method additionally can include determining contextual similarity scores between the active incident data and the historical incident data based at least on the feature embeddings. The method further can include identifying one or more similar historical incidents from the historical incident data based at least on the contextual similarity scores. The method additionally can include generating a resolution recommendation for the active incident based at least on the one or more similar historical incidents.

A number of embodiments include a system including one or more processors and one or more non-transitory computer-readable media storing computing instructions that, when executed on the one or more processors, cause the one or more processors to perform various operations. The operations can include receiving active incident data for an active incident and historical incident data. The active incident data can include active incident information and active configuration item information. The historical incident data can include historical incident information, historical configuration item information, and historical resolution outcomes. The operations also can include generating feature embeddings from the active incident data and the historical incident data. The feature embeddings can include semantic embeddings and structured operational metadata embeddings. The operations additionally can include determining contextual similarity scores between the active incident data and the historical incident data based at least on the feature embeddings. The operations further can include identifying one or more similar historical incidents from the historical incident data based at least on the contextual similarity scores. The operations additionally can include generating a resolution recommendation for the active incident based at least on the one or more similar historical incidents.

Some embodiments include one or more non-transitory computer-readable media storing computing instructions that, when executed on one or more processors, cause the one or more processors to perform various operations. The operations can include receiving active incident data for an active incident and historical incident data. The active incident data can include active incident information and active configuration item information. The historical incident data can include historical incident information, historical configuration item information, and historical resolution outcomes. The operations also can include generating feature embeddings from the active incident data and the historical incident data. The feature embeddings can include semantic embeddings and structured operational metadata embeddings. The operations additionally can include determining contextual similarity scores between the active incident data and the historical incident data based at least on the feature embeddings. The operations further can include identifying one or more similar historical incidents from the historical incident data based at least on the contextual similarity scores. The operations additionally can include generating a resolution recommendation for the active incident based at least on the one or more similar historical incidents.

Various embodiments include a computer-implemented method including receiving change request data. The change request data can include change request metadata, configuration item attributes, and historical change outcome data. The method also can include determining a compliance risk score for the change request data based at least on timing and governance factors. The method additionally can include determining a behavioral risk score based at least on a historical performance of a change owner. The method further can include determining a major incident probability score based at least on the change request data and the historical change outcome data. The method additionally can include generating an approval recommendation based at least on an aggregation of the compliance risk score, the behavioral risk score, and the major incident probability score.

A number of embodiments include a system including one or more processors and one or more non-transitory computer-readable media storing computing instructions that, when executed on the one or more processors, cause the one or more processors to perform various operations. The operations can include receiving change request data. The change request data can include change request metadata, configuration item attributes, and historical change outcome data. The operations also can include determining a compliance risk score for the change request data based at least on timing and governance factors. The operations additionally can include determining a behavioral risk score based at least on a historical performance of a change owner. The operations further can include determining a major incident probability score based at least on the change request data and the historical change outcome data. The operations additionally can include generating an approval recommendation based at least on an aggregation of the compliance risk score, the behavioral risk score, and the major incident probability score.

Some embodiments include one or more non-transitory computer-readable media storing computing instructions that, when executed on one or more processors, cause the one or more processors to perform various operations. The operations can include receiving change request data. The change request data can include change request metadata, configuration item attributes, and historical change outcome data. The operations also can include determining a compliance risk score for the change request data based at least on timing and governance factors. The operations additionally can include determining a behavioral risk score based at least on a historical performance of a change owner. The operations further can include determining a major incident probability score based at least on the change request data and the historical change outcome data. The operations additionally can include generating an approval recommendation based at least on an aggregation of the compliance risk score, the behavioral risk score, and the major incident probability score.

Figure 2:
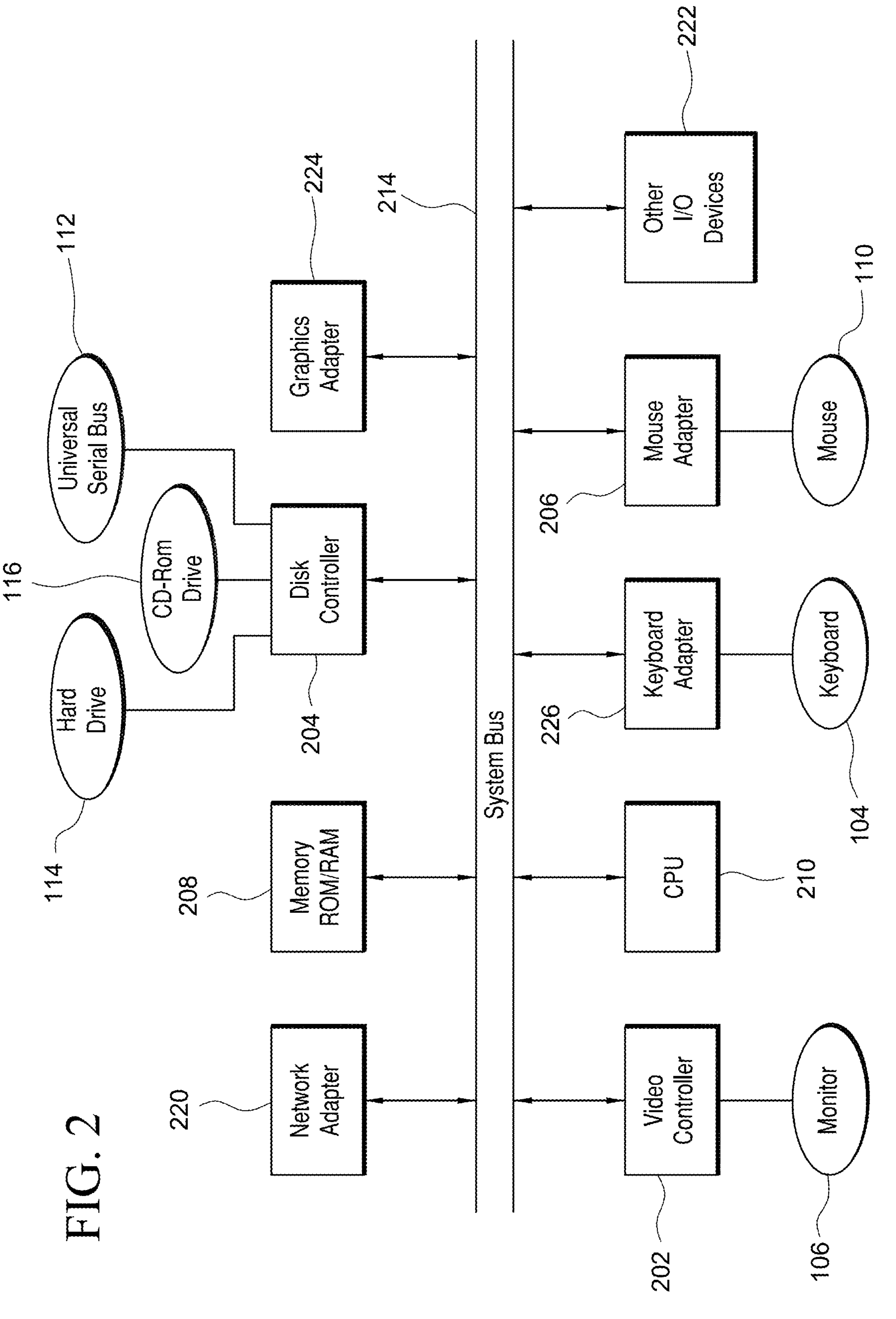
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random-access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or DVD, Blu-Ray, or other suitable media, such as media configured to be used in DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a DVD in DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general-purpose computer to a special purpose computer. For purposes of illustration, programs and other executable program components are shown herein as discrete systems, although it is understood that such programs and components may reside at various times in different storage components of computer system 100 and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples in which computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3A:
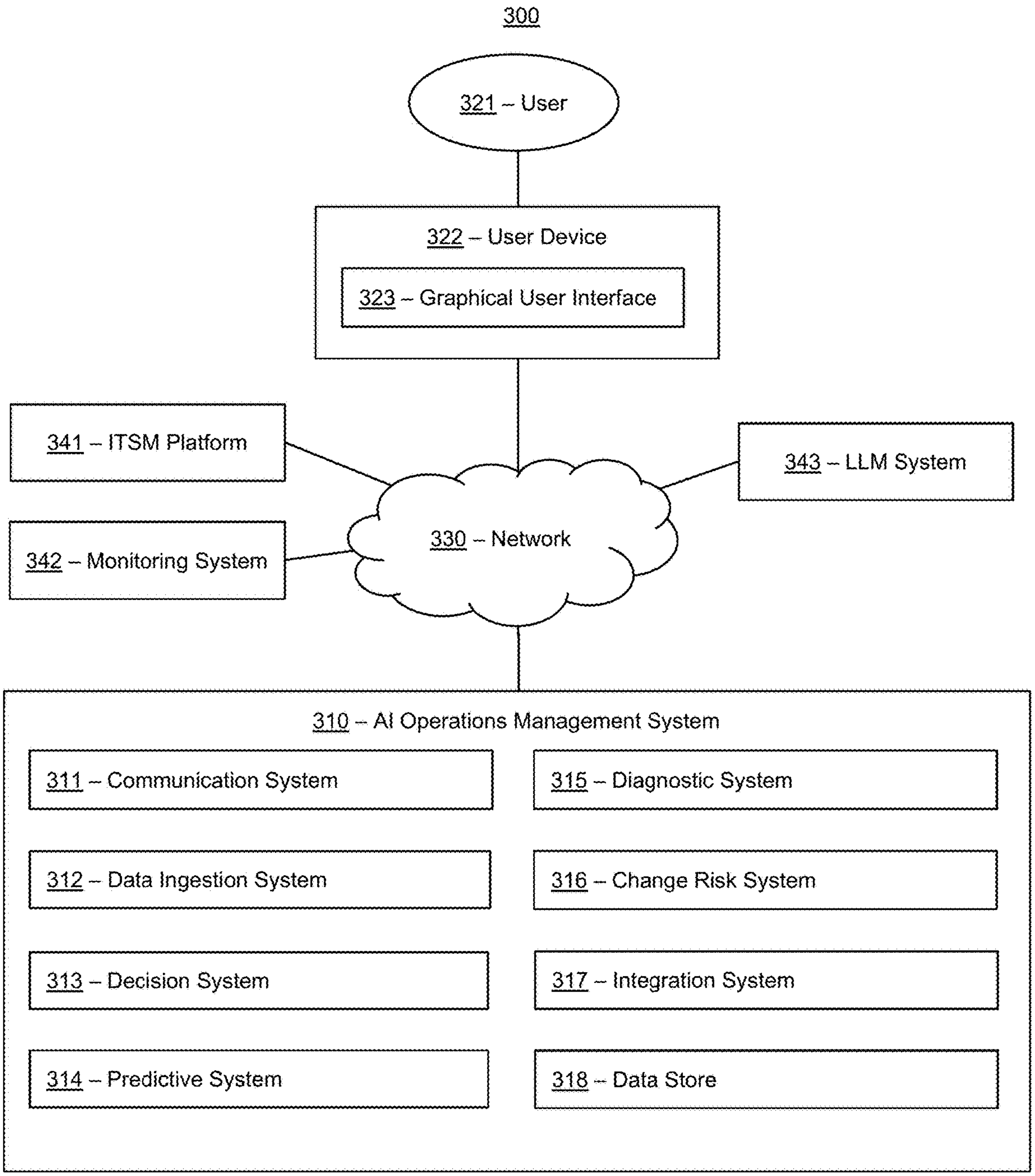
FIG. 3A illustrates a block diagram of a system that can be utilized for AI-driven predictive, diagnostic, and risk analytics for information technology operations, according to an embodiment.

Turning ahead in the drawings, FIG. 3A illustrates a block diagram of a system 300 that can be utilized for AI-driven predictive, diagnostic, and risk analytics for information technology operations, in accordance with an embodiment. System 300 is illustrative in nature, and embodiments of the system are not confined to the configurations presented herein. The system can be employed in many different embodiments or examples not specifically depicted or described in this document. In some embodiments, particular elements, modules, or components of system 300 can execute various procedures, processes, and/or activities. In other embodiments, these procedures, processes, and/or activities can be carried out by other appropriate elements, modules, or components of system 300. Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an AI operations management system 310, which can be operated by one or more users (e.g., user 321) using user devices (e.g., user device 322). As examples, user 321 can be an information technology operations engineer, a site reliability engineer, a change advisory board member, and/or a managed services operator. AI operations management system 310 and/or user device 322 can each be a computer system, such as computer system 100 (FIG. 1), as described above, and can be a single computer, a single server, or a cluster or collection of computers or servers, or a cloud of computers or servers. In another embodiment, a single computer system can host AI operations management system 310 and user device 322. In some embodiments, user 321 can interact with AI operations management system 310 to monitor, analyze, and/or respond to operational conditions of operational IT (information technology) infrastructure, such as production mainframes, distributed servers, network devices, and/or cloud-hosted services.

In some embodiments, AI operations management system 310 can be in data communication through a network 330 with user device 322, an ITSM platform 341, a monitoring system 342, and/or a large language model (LLM) system 343, which also can be part of system 300 in various embodiments. User device 322 can be part of system 300 or external to system 300. Network 330 can be the Internet or another suitable network. In many embodiments, AI operations management system 310 can host one or more websites and/or application servers. For example, AI operations management system 310 can host a website, or provide a server that interfaces with an application (e.g., a web application and/or a desktop application), on user device 322, which can provide a graphical user interface (GUI) 323 displayed on user device 322 to users (e.g., user 321) to interact with AI operations management system 310. In various embodiments, GUI 323 can be an application running on user device 322 or a website accessed through network 330.

In many embodiments, AI operations management system 310 can include one or more input devices (e.g., one or more keyboards, one or more keypads, one or more pointing devices such as a computer mouse or computer mice, one or more touchscreen displays, a microphone, etc.), and/or can include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to AI operations management system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of AI operations management system 310. In a similar manner, the processors and/or the non-transitory computer-readable media can be local and/or remote to each other.

Meanwhile, in many embodiments, AI operations management system 310 also can communicate with one or more databases and/or storage systems, such as a data store 318. The one or more databases and/or storage systems can include one or more interconnected databases and/or storage systems that store operational telemetry data, historical incident data, change request data, model outputs, prediction artifacts, tenant configurations, and/or performance metrics. For example, data store 318 can store alert events, incident records, case metadata, configuration item data, change records, and/or historical major incident classifications. Data store 318 also can store model training data, model version information, prediction outputs, and/or feedback data, such as true positives, false positives, and/or false negatives. Data store 318 also can store tenant-specific threshold configurations, cross-tenant learning effectiveness data, and/or transfer learning success rate data. The one or more databases and/or storage systems can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and/or IBM DB2 Database.

Meanwhile, AI operations management system 310, ITSM platform 341, monitoring system 342, LLM system 343, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, AI operations management system 310 can include a communication system 311, a data ingestion system 312, a decision system 313, a predictive system 314, a diagnostic system 315, a change risk system 316, an integration system 317, data store 318, and/or other suitable systems. In many embodiments, the systems of AI operations management system 310 can be modules of computing instructions (e.g., software modules) stored at non-transitory computer readable media that operate on one or more processors. In other embodiments, the systems of AI operations management system 310 can be implemented in hardware. In various embodiments, the functionality of one or more of the systems of AI operations management system 310 can be performed by another one of the systems, the functionalities of multiple systems can be combined in a system, or various functionalities of a system can be split into multiple systems.

In many embodiments, communication system 311 can facilitate data exchange between AI operations management system 310 and other components of system 300 via network 330. In some embodiments, communication system 311 can transmit and/or receive operational telemetry data, model outputs, prediction artifacts, resolution recommendations, change risk evaluations, and/or automated action directives between AI operations management system 310, ITSM platform 341, monitoring system 342, LLM system 343, and/or user device 322. In some embodiments, communication system 311 can manage data exchange between the various components of AI operations management system 310 and facilitate communication with user device 322, ITSM platform 341, monitoring system 342, and/or LLM system 343 via network 330.

In many embodiments, data ingestion system 312 can receive and/or process operational telemetry data from monitoring system 342, ITSM platform 341, and/or data store 318. In some embodiments, data ingestion system 312 can ingest alert events, incident records, change requests, configuration item metadata, historical outcomes, and/or model outputs from subordinate AI systems. In some embodiments, data ingestion system 312 can ingest data via streaming and/or batch pipelines. In some embodiments, the operational telemetry data ingested by data ingestion system 312 can reflect real-time and/or historical conditions of live IT infrastructure, such as hardware status, network performance, application health, storage utilization, and/or operating system conditions. In some embodiments, data ingestion system 312 can enable cross-module feature sharing across decision system 313, predictive system 314, diagnostic system 315, and/or change risk system 316.

In many embodiments, decision system 313 can perform confidence-based arbitration and/or routing of operational data across subsystems of AI operations management system 310. In some embodiments, decision system 313 can evaluate model confidence, compare historical calibration accuracy, and/or determine whether to accept a model output, route to a secondary model, aggregate multiple outputs, and/or escalate to human review. In some embodiments, decision system 313 can route operational events to predictive system 314, diagnostic system 315, and/or change risk system 316 based on event type. In some embodiments, alert events and/or operational events can be routed to predictive system 314, active incidents can be routed to diagnostic system 315, and/or change requests can be routed to change risk system 316. In some embodiments, decision system 313 can cross-link predictions with upcoming changes, flag predicted incidents that correlate with scheduled changes, and/or escalate high-risk changes when predictive signals increase. In some embodiments, decision system 313 can apply customer-specific thresholds, infrastructure-specific modifiers, and/or behavioral risk modifiers to AI outputs.

In some embodiments, decision system 313 can record predictions made, diagnoses recommended, change risk classifications, and/or actual outcomes, such as whether an incident occurred, whether a change failed, and/or resolution time. In some embodiments, these outcomes can be fed into periodic retraining cycles, used to recalibrate threshold sensitivity, and/or used to adjust arbitration weighting. In some embodiments, reinforcement adjustments can occur during retraining intervals rather than in live inference. In some embodiments, decision system 313 can train models across multiple tenants while maintaining tenant-isolated thresholding. In some embodiments, tenant data can be aggregated as part of a single model training run, which can enable cross-tenant pattern learning while maintaining tenant-specific threshold configurations. In some embodiments, decision system 313 can track cross-tenant learning effectiveness and/or measure transfer learning success rate. A tenant can include a customer, a client, an organization, a business unit, a division, a service account, and/or any other logical grouping of information technology infrastructure and/or operational data that can be managed as a distinct entity within AI operations management system 310.

In many embodiments, predictive system 314 can generate predictions regarding potential incidents based on operational telemetry data. In some embodiments, the predictions can pertain to potential incidents affecting live IT infrastructure, such as operating system failures, network failures, and/or software failures on production mainframes, distributed systems, and/or network devices. In some embodiments, predictive system 314 can include an ensemble of machine learning models, such as an XGBoost model, a neural network model, and/or a random forest model, operating in parallel with weighted voting to produce prediction outputs. In some embodiments, predictive system 314 can ingest multi-tenant operational telemetry data and/or engineer temporal and relational features across alerts, incidents, changes, and/or configuration items. In some embodiments, the temporal features can include event frequency metrics, alert burst patterns, temporal proximity features, time-windowed aggregation, rolling statistical metrics, normalized tenant-specific baselines, and/or cross-tenant embedding vectors. In some embodiments, the relational features can include configuration item-level aggregation, assignment group transitions, historical recurrence patterns, and/or cross-customer similarity embeddings.

In some embodiments, predictive system 314 can generate an incident probability score and/or an impact classification, such as low, medium, and/or high, for a major incident within a predefined time horizon, such as approximately five to approximately sixty minutes. In some embodiments, predictive system 314 can apply customer-specific dynamic thresholds to trigger alerts. In some embodiments, predictive system 314 can use a confidence-based arbitration mechanism to route low-confidence predictions to secondary specialized models, such as infrastructure-specific machine learning models for mainframe, network, and/or distributed systems environments. In some embodiments, predictive system 314 can continuously retrain models using resolved incident data and/or feedback loops. In some embodiments, predictive system 314 can operate in real-time and/or near-real-time using streaming ingestion mechanisms and/or scheduled retraining cycles. In some embodiments, predictive system 314 can store historical major incidents per configuration item and/or augment predictions with historical failure context for the same configuration item and/or related configuration item clusters.

In many embodiments, diagnostic system 315 can provide incident resolution acceleration through similarity-based intelligence. In some embodiments, the incident resolution acceleration can pertain to active incidents affecting live IT infrastructure, such as production outages, service degradations, and/or application failures. In some embodiments, diagnostic system 315 can ingest incident information, such as incident short descriptions, descriptions, journal entries, and/or work notes, assignment group transitions, configuration item metadata, resolution codes, opened and/or resolved timestamps, business pause duration, and/or work-time tracking. In some embodiments, diagnostic system 315 can generate feature embeddings from active incident data and/or historical incident data, such as semantic NLP encoding of descriptions, resolution code embeddings, configuration item clustering, assignment group vectors, and/or temporal resolution patterns.

In some embodiments, diagnostic system 315 can determine contextual similarity scores between active and historical incidents using weighted semantic similarity, structured metadata alignment, configuration item match weighting, assignment group weighting, and/or resolution pattern similarity. In some embodiments, diagnostic system 315 can use string similarity scoring, such as Jaro-Winkler similarity, as a method for identifying similar historical cases, and/or can use vector embeddings for semantic similarity during input preprocessing. In some embodiments, diagnostic system 315 can rank candidate similar cases and/or return a top number of matches. In some embodiments, diagnostic system 315 can assign confidence scores to recommended cases based on historical performance accuracy, resolution consistency, cross-tenant validation, and/or embedding proximity stability.

In some embodiments, diagnostic system 315 can determine expected resolution durations based on similar historical incidents, such as average mean time to resolution (MTTR), median MTTR, business-hour MTTR, and/or active work-time MTTR. In some embodiments, diagnostic system 315 can determine resolution time savings and/or estimated financial impact based on time saved, average hourly labor cost, and/or average personnel count derived from historical participation patterns. In some embodiments, diagnostic system 315 can differentiate between total cycle time, business-hour resolution time, and/or active work time excluding pause durations.

In some embodiments, diagnostic system 315 can construct a data structure, such as a JSON data structure, which can include concatenated alerts, changes, incidents, and/or requests associated with an active incident, and/or can transmit the data structure to LLM system 343 (FIG. 3A) for analysis. In some embodiments, LLM system 343 can generate an incident summary, a root cause analysis, and/or resolution recommendations based on the data structure. In some embodiments, diagnostic system 315 can use custom prompting strategies to drive summarization of incident-related details. In some embodiments, diagnostic system 315 can learn from user feedback and/or resolution outcomes to recalibrate similarity scoring during periodic retraining cycles. In some embodiments, historical data can be ingested across multiple tenants.

In many embodiments, change risk system 316 can evaluate change requests and/or determine risk scores for proposed changes. In some embodiments, the proposed changes can pertain to modifications to live IT infrastructure, such as software upgrades, maintenance operations, configuration modifications, and/or hardware replacements on production systems. In some embodiments, change risk system 316 can ingest change request metadata such as risk, impact, type, and/or category, assignment group and/or requestor history, configuration management database (CMDB) configuration item attributes such as environment, service level, and/or operational status, historical change outcomes such as success, failure, and/or backout, major incident linkage data, implementation windows and/or timestamps, documentation fields such as test plan, backout plan, and/or implementation plan, change reassignment counts, compliance state transition timestamps, attachment evidence, and/or conflict detection results.

In some embodiments, change risk system 316 can determine compliance risk scores based on timing and/or governance factors, such as window duration analysis, late state transition prediction, owner late closure history, rushed change detection, retroactive change detection, unauthorized change behavior patterns, and/or production flag mismatch with CMDB environment. In some embodiments, each compliance factor can contribute to a bounded risk score, such as a score from zero to one hundred. In some embodiments, urgent alerts can be generated when a change window has ended without proper state transition, a production mismatch is detected, and/or a compliance timing violation is imminent.

In some embodiments, change risk system 316 can determine behavioral risk scores based on historical performance of assignment groups, change owners, and/or clients, such as success rate, major incident causation rate, late closure rate, recent failures, and/or unauthorized and/or retroactive change patterns. In some embodiments, risk scores can be adjusted based on threshold-based behavioral patterns and/or relative performance versus organizational baseline.

In some embodiments, change risk system 316 can retrieve historical failed changes on the same configuration item, similar changes by description similarity using a string similarity threshold, such as Jaro-Winkler, similar changes by configuration item class and/or category, and/or cross-team similarity matches. In some embodiments, change risk system 316 can extract historical failure causes, identify recurring technical failure modes, generate specific and/or actionable mitigation steps, and/or determine a similarity-weighted major incident causation rate.

In some embodiments, change risk system 316 can determine a major incident probability score using a hybrid model that determines a heuristic major incident risk score based on risk classification, impact level, configuration item production status, high-risk keywords, missing rollback plan, similar change major incident history, configuration item historical major incident count, team major incident rate, and/or scheduling factors.

In some embodiments, change risk system 316 can invoke LLM system 343 (FIG. 3A) to contextualize structured risk factors, weigh historical major incident evidence, and/or produce a probability classification, such as high, medium, and/or low, a confidence score, a key risk factor, and/or an actionable recommendation. In some embodiments, if LLM system 343 fails, a heuristic fallback classification can be applied.

In some embodiments, change risk system 316 can evaluate documentation quality using LLM system 343 to score short description clarity, assess test plan completeness, evaluate rollback sufficiency, identify ambiguous and/or vague language, and/or detect missing success criteria. In some embodiments, documentation quality outputs can include section-level quality scores, an overall documentation score, such as a score from zero to one hundred, a list of gaps, and/or a risk rating, such as low, medium, high, and/or a different classification.

In some embodiments, change risk system 316 can analyze configuration item attributes, such as environment, service level, operational status, lifecycle stage, and/or configuration item class, and/or can adjust risk scores based on production and/or premium classification, high-risk configuration item classes, operational live systems, and/or non-production mitigating factors.

In some embodiments, change risk system 316 can identify scheduling conflicts, such as same-configuration-item overlapping changes, same-client overlapping windows, and/or state-based conflict conditions, and/or can determine overlap duration, risk of concurrency collision, and/or scheduling congestion.

In some embodiments, change risk system 316 can generate approval recommendations, such as auto-approve recommendations, needs-review recommendations, and/or manual-approval recommendations, based on aggregated risk dimensions, such as compliance risk score, major incident risk score, documentation quality, historical intelligence, conflict analysis, behavioral metrics, and/or structured risk assessment answers.

In some embodiments, change risk system 316 can feed structured context into LLM system 343 with approval policy rules and/or can output structured data, such as JSON data, which can include an overall situation summary, field-by-field flag analysis, such as green, yellow, and/or red classifications, a final recommendation, key concerns, and/or a confidence score. In some embodiments, change risk system 316 can use custom prompting strategies to drive summarization of change-related details.

In many embodiments, integration system 317 can coordinate interactions between AI operations management system 310 and external systems, such as ITSM platform 341, LLM system 343, automation platforms, and/or other operational tools. In some embodiments, integration system 317 can transmit automated action directives, such as predicted incident creation, ticket generation, operations team notifications, change advisory board escalations, and/or high-risk change approval blocks, to ITSM platform 341 and/or other external systems. In some embodiments, the automated action directives can affect the operational state of live IT infrastructure by triggering remediation actions on production systems, creating incident records in production ITSM systems, and/or blocking changes to production environments. In some embodiments, automated actions can be logged for audit and/or retraining purposes.

In many embodiments, ITSM platform 341 can provide information technology service management functionality, such as incident tracking, change request management, configuration item management, and/or service level agreement monitoring. In some embodiments, ITSM platform 341 can be an external platform, such as a ServiceNow platform and/or other suitable ITSM platform, which can be coupled to AI operations management system 310 via network 330. In some embodiments, AI operations management system 310 can receive incident records, change requests, and/or configuration item metadata from ITSM platform 341. In some embodiments, AI operations management system 310 can transmit prediction outputs, resolution recommendations, approval recommendations, and/or automated action directives to ITSM platform 341.

In many embodiments, monitoring system 342 can provide operational monitoring capabilities for heterogeneous computing infrastructure, such as mainframes, distributed systems, networks, and/or cloud platforms. In some embodiments, monitoring system 342 can generate alert events and/or operational telemetry data from one or more monitoring tools, such as network monitoring tools, hardware monitoring tools, log monitoring tools, and/or application monitoring tools. In some embodiments, monitoring system 342 can be coupled to AI operations management system 310 via network 330. In some embodiments, monitoring system 342 can monitor live IT infrastructure and/or can generate alert events reflecting real-time conditions of the monitored infrastructure, such as hardware status, network performance, application health, storage utilization, and/or operating system conditions.

In many embodiments, LLM system 343 can provide large language model processing capabilities. In some embodiments, LLM system 343 can be an external service, such as a cloud-hosted language model service, that can be coupled to AI operations management system 310 via network 330. In other embodiments, LLM system 343 can be internal to AI operations management system 310. In some embodiments, LLM system 343 can receive data structures, such as JSON data structures, which can include concatenated alerts, changes, incidents, and/or requests, from AI operations management system 310 and/or can return analytical outputs, such as incident summaries, root cause analyses, resolution recommendations, and/or contextual risk evaluations. In some embodiments, LLM system 343 can use custom prompting strategies to drive summarization of incident-related details and/or change risk evaluation.

Figure 3B:
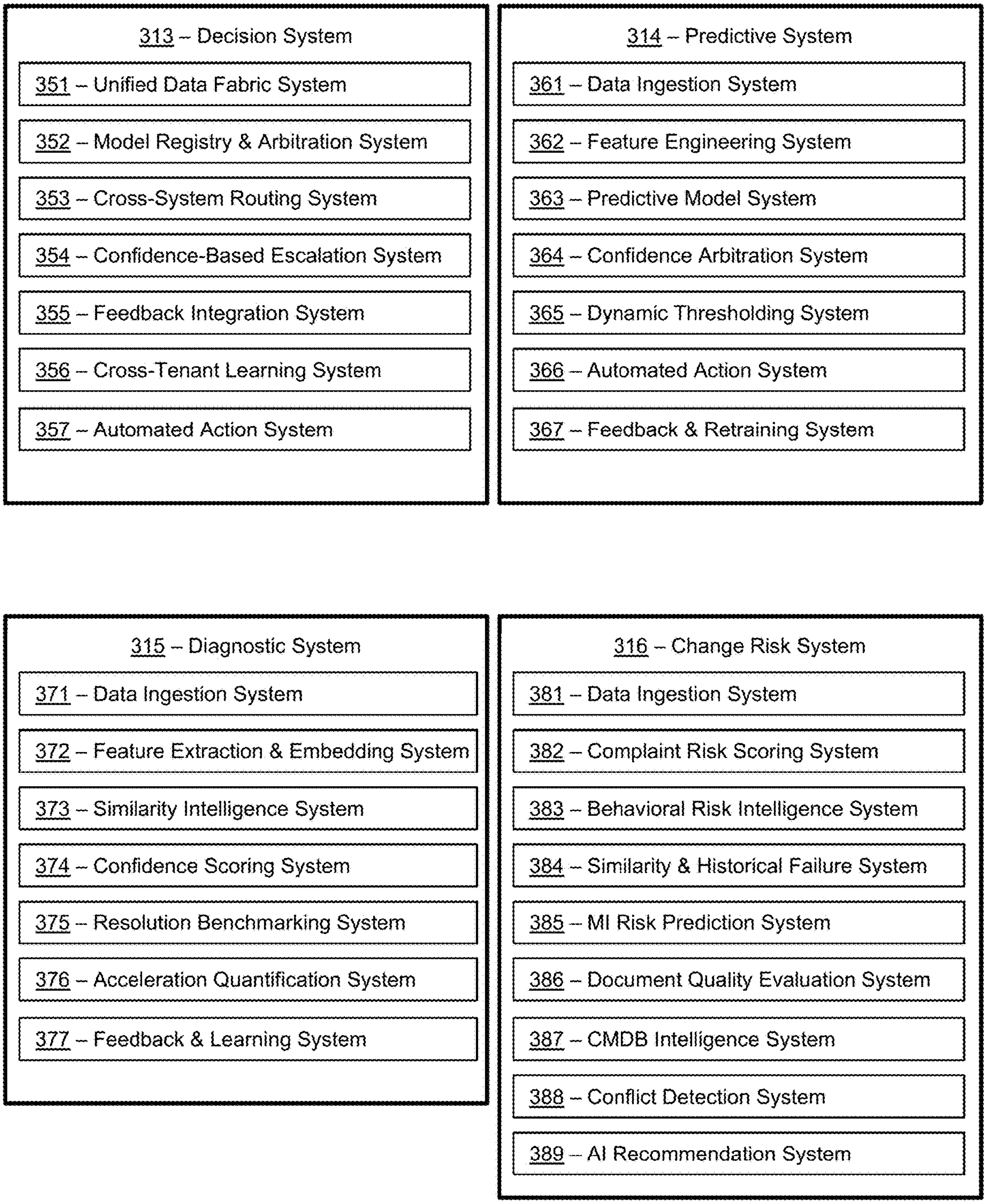
FIG. 3B illustrates a block diagram of subsystem architectures for the decision system, predictive system, diagnostic system, and change risk system of FIG. 3A.

Turning ahead in the drawings, FIG. 3B illustrates a block diagram of subsystem architectures for decision system 313, predictive system 314, diagnostic system 315, and change risk system 316, in accordance with an embodiment. In many embodiments, the systems of decision system 313, predictive system 314, diagnostic system 315, and/or change risk system 316 can be modules of computing instructions (e.g., software modules) stored at non-transitory computer readable media that operate on one or more processors. In other embodiments, the systems of AI operations management system 310 can be implemented in hardware. In various embodiments, the functionality of one or more of the systems of decision system 313, predictive system 314, diagnostic system 315, and/or change risk system 316 can be performed by another one of the systems, the functionalities of multiple systems can be combined in a system, or various functionalities of a system can be split into multiple systems.

Decision System

In many embodiments, decision system 313 can include a unified data fabric system 351, a model registry and arbitration system 352, a cross-system routing system 353, a confidence-based escalation system 354, a feedback integration system 355, a cross-tenant learning system 356, an automated action system 357, and/or other suitable systems.

In many embodiments, unified data fabric system 351 can aggregate data from multiple sources, such as monitoring system 342 (FIG. 3A), ITSM platform 341 (FIG. 3A), and/or data store 318 (FIG. 3A). In some embodiments, unified data fabric system 351 can ingest alerts, events, incidents, change requests, configuration item metadata, historical outcomes, and/or model outputs from subordinate AI systems. In some embodiments, unified data fabric system 351 can ingest data via streaming and/or batch pipelines. In some embodiments, unified data fabric system 351 can advantageously enable cross-module feature sharing across predictive system 314, diagnostic system 315, and/or change risk system 316.

In many embodiments, model registry and arbitration system 352 can maintain a plurality of predictive and/or analytical models, such as base predictive models, specialized infrastructure models, diagnostic similarity models, and/or change risk scoring models. In some embodiments, model registry and arbitration system 352 can store performance metrics for each model, such as accuracy, precision, recall, area under the curve (AUC), F1 score, and/or F1 weighted score. In some embodiments, model registry and arbitration system 352 can manage arbitration between model outputs by evaluating model confidence, comparing historical calibration accuracy, and/or determining whether to accept a model output, route to a secondary model, aggregate multiple outputs, and/or escalate to human review. In some embodiments, model registry and arbitration system 352 can advantageously provide for adaptive model arbitration instead of static execution.

In many embodiments, cross-system routing system 353 can route operational data to appropriate subsystems based on event type. In some embodiments, cross-system routing system 353 can route alert events and/or operational events to predictive system 314, active incidents to diagnostic system 315, and/or change requests to change risk system 316. In some embodiments, cross-system routing system 353 can cross-link predictions with upcoming changes, flag predicted incidents that correlate with scheduled changes, and/or escalate high-risk changes when predictive signals increase. In some embodiments, cross-system routing system 353 can advantageously coordinate between predictive and preventive actions.

In many embodiments, confidence-based escalation system 354 can evaluate confidence scores for AI outputs and/or can escalate to secondary models and/or human review when confidence falls below thresholds. In some embodiments, for each AI output, confidence-based escalation system 354 can retrieve a risk probability, an impact classification, and/or a confidence score. In some embodiments, confidence-based escalation system 354 can apply customer-specific thresholds, infrastructure-specific modifiers, and/or behavioral risk modifiers. In some embodiments, when a confidence score falls below a threshold, confidence-based escalation system 354 can invoke a secondary model, invoke ensemble aggregation, and/or invoke a human-in-the-loop workflow.

In many embodiments, feedback integration system 355 can ingest actual operational outcomes for model improvement. In some embodiments, feedback integration system 355 can record predictions made, diagnoses recommended, change risk classifications, and/or actual outcomes, such as whether an incident occurred, whether a change failed, and/or resolution time. In some embodiments, these outcomes can be fed into periodic retraining cycles, used to recalibrate threshold sensitivity, and/or used to adjust arbitration weighting. In some embodiments, reinforcement adjustments can occur during retraining intervals rather than in live inference.

In many embodiments, cross-tenant learning system 356 can enable pattern learning across multiple tenants while maintaining tenant-specific configurations. In some embodiments, cross-tenant learning system 356 can train models across multiple tenants while maintaining tenant-isolated thresholding. In some embodiments, tenant data can be aggregated as part of a single model training run, enabling cross-tenant pattern learning while maintaining tenant-specific threshold configurations. In some embodiments, cross-tenant learning system 356 can track cross-tenant learning effectiveness and/or measure transfer learning success rate. In some embodiments, cross-tenant learning system 356 can advantageously enable knowledge transfer without exposing tenant-specific data.

In many embodiments, automated action system 357 can execute operational responses based on aggregated risk evaluations. In some embodiments, when thresholds are exceeded, automated action system 357 can create predicted incidents, trigger ticket generation within ITSM platform 341 (FIG. 3A), notify operations teams, escalate to change advisory board review, and/or block high-risk change approval. In some embodiments, automated actions can be logged for audit and/or retraining purposes.

Figure 4A:
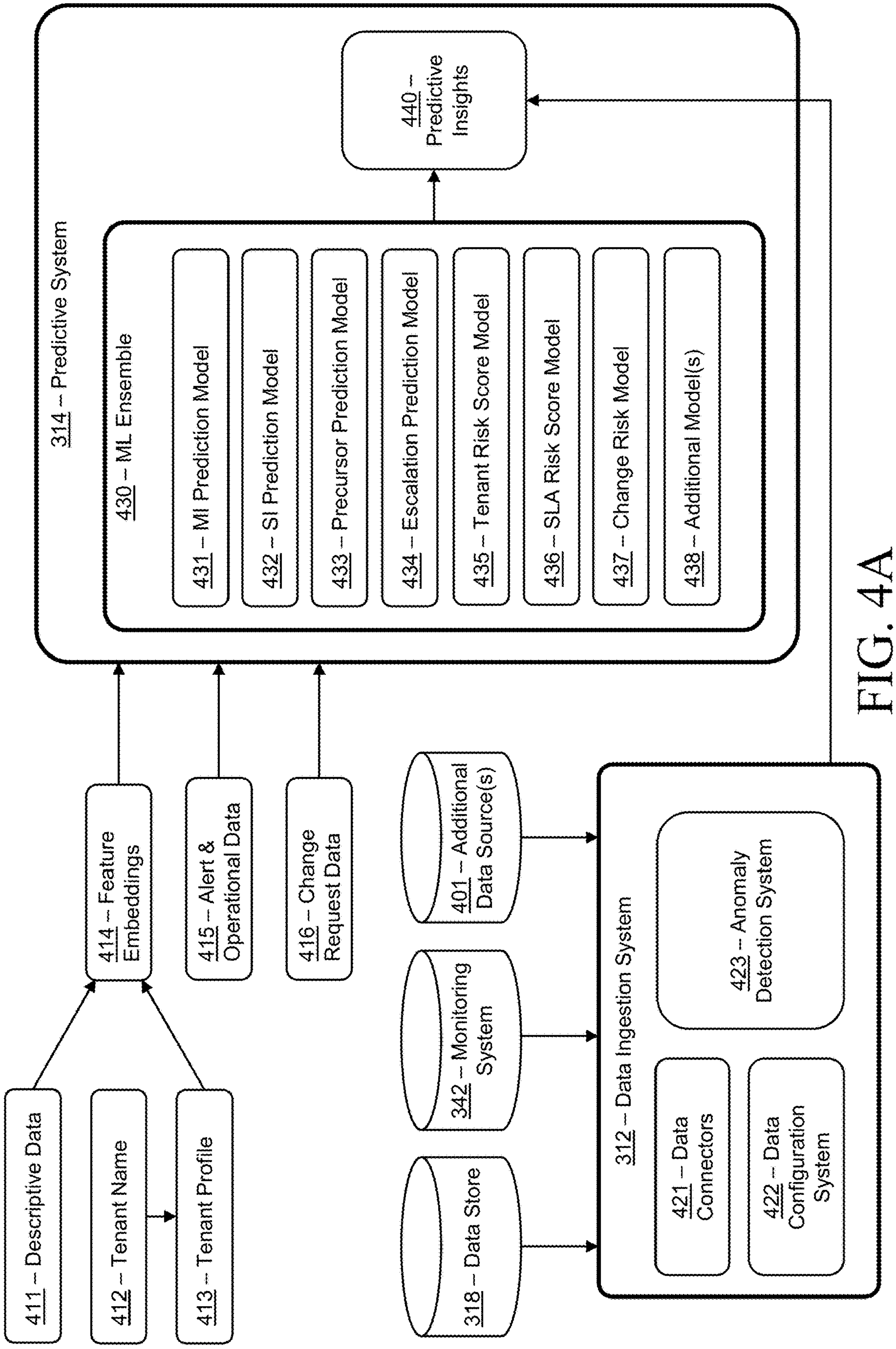
FIG. 4A illustrates a block diagram of a data ingestion and predictive analytics architecture of a method for AI-driven operational risk analytics, according to an embodiment.
Figure 4B:
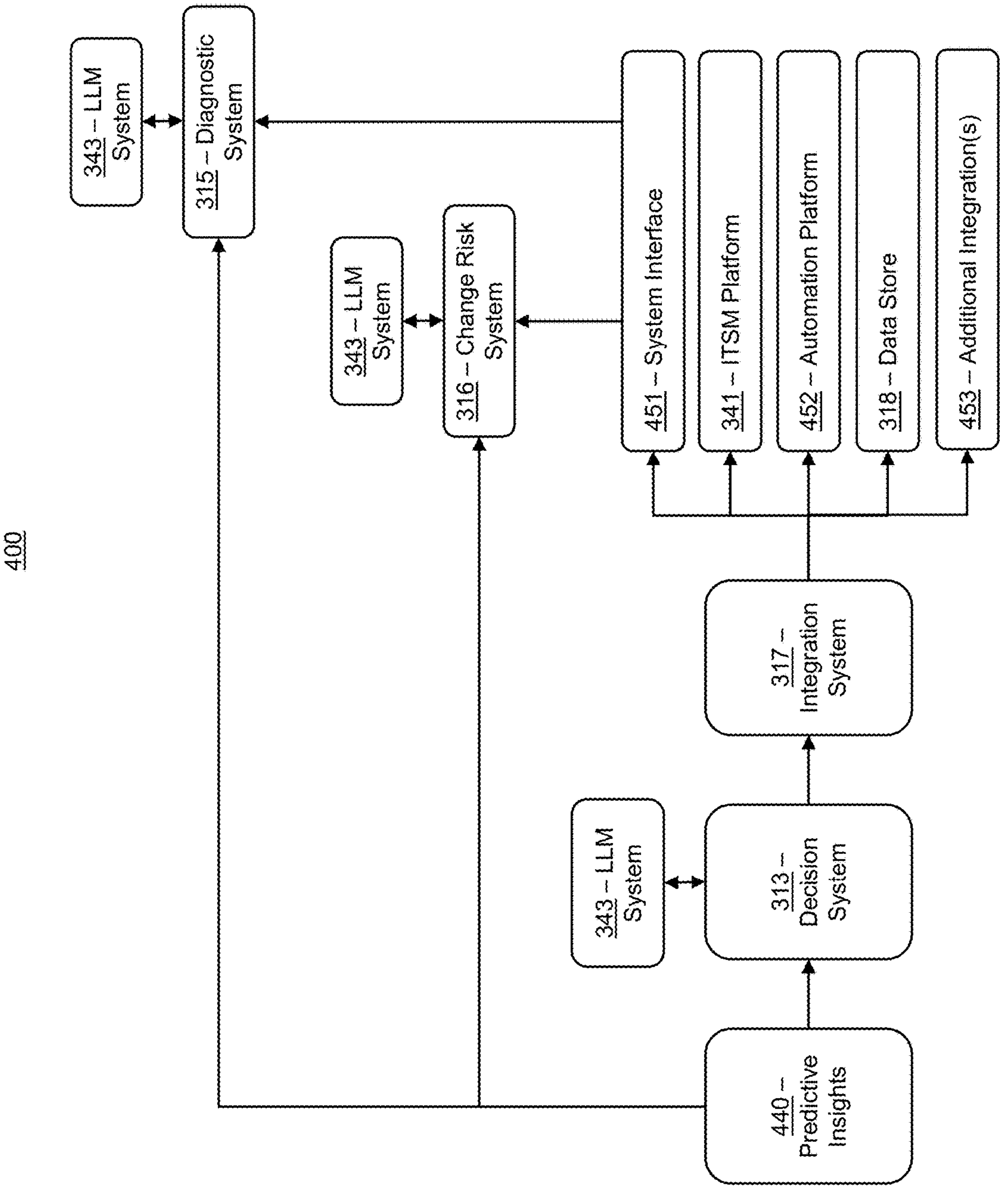
FIG. 4B illustrates a block diagram of a decision, integration, and subsystem routing architecture of a method for AI-driven operational risk analytics, according to an embodiment.

Turning ahead in the drawings, FIGS. 4A-4B illustrate block diagrams of a method 400 for AI-driven operational risk analytics, in accordance with an embodiment. Method 400 depicts a processing architecture in which operational telemetry data is ingested, processed through predictive models, evaluated by a decision system, and routed to diagnostic, change risk, and/or integration subsystems. FIG. 4A illustrates a data ingestion and predictive analytics portion of method 400. FIG. 4B illustrates a decision, integration, and subsystem routing portion of method 400. In some embodiments, method 400 can be implemented by AI operations management system 310 (FIG. 3A) and/or one or more subsystems thereof.

In many embodiments, as shown in FIG. 4A, method 400 can receive operational telemetry data from multiple data sources. In some embodiments, the data sources can include data store 318, monitoring system 342, and/or additional data sources 401. In some embodiments, data store 318 can provide cases, incidents, alerts, events, and/or other operational records. In some embodiments, monitoring system 342 can provide hardware telemetry, logs, and/or other monitoring data from live IT infrastructure, such as data from network monitoring tools, hardware monitoring tools, log monitoring tools, and/or application monitoring tools. In some embodiments, additional data sources 401 can provide supplementary operational data. In some embodiments, the operational telemetry data can include both structured data, such as alert and incident value data, and/or unstructured data, such as short descriptions, descriptions, and/or resolution notes. In some embodiments, the operational telemetry data can be normalized prior to processing.

In many embodiments, data ingestion system 312 can receive the operational telemetry data from the data sources. In some embodiments, data ingestion system 312 can include data connectors 421, a data configuration system 422, and/or an anomaly detection system 423. In some embodiments, data connectors 421 can establish connections to the data sources and/or retrieve operational telemetry data. In some embodiments, data configuration system 422 can configure data retrieval parameters, data transformation rules, and/or data validation criteria. In some embodiments, anomaly detection system 423 can detect anomalous patterns in the operational telemetry data, such as deviations from baseline operational patterns, unusual event sequences, and/or statistical outliers. In some embodiments, anomaly detection system 423 can include anomaly detection based on time series forecasting, term matching, and/or similarity matching. In some embodiments, anomaly detection outputs can be provided to predictive system 314 and/or decision system 313 (FIG. 4B). In some embodiments, the data foundation provided by data ingestion system 312 can be shared across predictive system 314, diagnostic system 315 (FIG. 3A), and/or change risk system 316 (FIG. 3A).

In many embodiments, method 400 can process descriptive data 411, such as short descriptions and/or descriptions from incident records, change requests, and/or other operational records. In some embodiments, descriptive data 411 can include structured data, such as alert and incident value data, and/or unstructured data, such as short descriptions, descriptions, and/or resolution notes. In some embodiments, descriptive data 411 can be transformed into feature embeddings 414 using embedding and/or vectorization techniques. In some embodiments, a tenant name 412 can be processed to generate a tenant profile 413. In some embodiments, tenant profile 413 can be generated by LLM system 343 (FIG. 3A), such as an LLM-generated company profile based on tenant name 412. In some embodiments, tenant profile 413 can be transformed into feature embeddings 414 using embedding and/or vectorization techniques. In some embodiments, tenant profile 413 can be combined with descriptive data 411 to generate feature embeddings 414.

In many embodiments, method 400 also can process alert and operational data 415. In some embodiments, alert and operational data 415 can include alerts at different intervals, such as alert counts at one-hour, two-hour, six-hour, twelve-hour, and/or twenty-four-hour intervals, alert event counts, alert flap counts, alert types, alert sources, and/or alert severity levels. In some embodiments, alert and operational data 415 also can include operational data, such as assignment group workloads and/or client workloads. In some embodiments, alert and operational data 415 also can include alert type parent designations, group alert indicators, case priority designations, incident priority designations, and/or case assignment group designations.

In many embodiments, method 400 also can process change request data 416. In some embodiments, change request data 416 can include short descriptions, descriptions, test plans, backout plans, implementation plans, change types, technology designations, urgency levels, change durations, start times and/or days, past records of assignees, past records of configuration items, assignment groups, approvers, client names, change risk assessments, risk questionnaires, pre-change checks, change outage indicators, send blackout on implement flags, and/or client testing information.

In many embodiments, descriptive data 411, feature embeddings 414, alert and operational data 415, and/or change request data 416 can be provided to predictive system 314. In some embodiments, predictive system 314 can include an ML ensemble 430, which can include a plurality of machine learning models that can produce risk and/or prediction scores. A major incident (MI) can include an incident in which a tenant has experienced service impact, such as a production outage, a service degradation, and/or a business-impacting failure affecting live IT infrastructure. A significant incident (SI) can include an incident that has a service-impacting and/or potentially service-impacting effect, such as an incident that affects a subset of users, a degradation in performance, and/or an event that has the potential to escalate to a major incident. In some embodiments, one or more of descriptive data 411, feature embeddings 414, alert and operational data 415, and/or change request data 416 can be provided as inputs to one or more suitable models of ML ensemble 430 based on the data type and/or the prediction task associated with each model.

In some embodiments, ML ensemble 430 can include a MI prediction model 431, a SI prediction model 432, a precursor prediction model 433, a priority escalation prediction model 434, a tenant risk score model 435, a service level agreement (SLA) risk score model 436, a change risk score model 437, and/or additional models 438. In some embodiments, ML ensemble 430 can include an ensemble of machine learning models, such as an XGBoost model, a neural network model, and/or a random forest model, operating in parallel with weighted voting to produce unified prediction outputs. In some embodiments, ML ensemble 430 also can include one or more specialized infrastructure-specific models, such as mainframe-specific, network-specific, and/or distributed systems-specific models.

In some embodiments, MI prediction model 431 can predict a probability of a major incident occurring within a predefined time horizon, such as approximately five to approximately sixty minutes. In some embodiments, MI prediction model 431 can be trained on past major incidents in which a tenant has experienced service impact, and can assign a probability between zero and one to each incident and/or alert. In some embodiments, MI prediction model 431 can predict operating system failures, network failures, and/or software failures on live IT infrastructure. In some embodiments, MI prediction model 431 can be implemented using one or more suitable machine learning techniques, such as gradient boosting models (e.g., XGBoost and/or LightGBM), neural networks, random forests, logistic regression, and/or other suitable binary classification models.

In some embodiments, SI prediction model 432 can predict a probability of a significant incident occurring within a predefined time horizon. In some embodiments, SI prediction model 432 can be implemented using one or more suitable machine learning techniques, such as gradient boosting models (e.g., XGBoost and/or LightGBM), neural networks, random forests, and/or other suitable binary classification models.

In some embodiments, precursor prediction model 433 can identify precursor events that can precede and/or indicate an increased likelihood of a major incident and/or a significant incident. In some embodiments, precursor prediction model 433 can analyze temporal patterns and/or sequences of alerts, incidents, changes, and/or requests that have historically preceded service-impacting events on live IT infrastructure. In some embodiments, precursor prediction model 433 can be implemented using one or more suitable machine learning techniques, such as recurrent neural networks (e.g., long short-term memory (LSTM) networks and/or gated recurrent units (GRUs)), temporal convolutional networks, transformer-based sequence models, gradient boosting models (e.g., XGBoost), and/or other suitable models for temporal pattern detection and/or sequence classification.

In some embodiments, priority escalation prediction model 434 can predict a probability that an incident and/or alert can escalate to a higher priority level, such as a priority one escalation. In some embodiments, priority escalation prediction model 434 can analyze incident characteristics and/or historical escalation patterns to identify incidents that can escalate. In some embodiments, priority escalation prediction model 434 can be implemented using one or more suitable machine learning techniques, such as gradient boosting models (e.g., XGBoost and/or LightGBM), neural networks, random forests, and/or other suitable ordinal and/or multi-class classification models.

In some embodiments, tenant risk score model 435 can generate a risk score for a tenant based on the tenant's operational telemetry data, such as alert volumes, incident frequencies, change activity, and/or historical major incident patterns. In some embodiments, tenant risk score model 435 can identify tenants that can be at elevated risk of service-impacting events. In some embodiments, tenant risk score model 435 can be implemented using one or more suitable machine learning techniques, such as gradient boosting models (e.g., XGBoost and/or LightGBM), neural networks, random forests, regression models (e.g., linear regression, ridge regression, and/or lasso regression), and/or other suitable scoring and/or regression models.

In some embodiments, SLA risk score model 436 can predict a probability that a service level agreement can be missed and/or breached based on current operational conditions, such as incident resolution progress, alert volumes, and/or resource availability. In some embodiments, SLA risk score model 436 can be implemented using one or more suitable machine learning techniques, such as survival analysis models (e.g., Cox proportional hazards models and/or accelerated failure time models), gradient boosting models (e.g., XGBoost and/or LightGBM), neural networks, and/or other suitable time-to-event and/or probability estimation models.

In some embodiments, change risk score model 437 can predict a risk level associated with a proposed change to live IT infrastructure, such as a software upgrade, a maintenance operation, a configuration modification, and/or a hardware replacement. In some embodiments, change risk score model 437 can analyze change request data, historical change outcomes, and/or configuration item attributes to generate the risk score. In some embodiments, change risk score model 437 can be implemented using one or more suitable machine learning techniques, such as gradient boosting models (e.g., XGBoost and/or LightGBM), neural networks, random forests, and/or other suitable classification and/or regression models.

In some embodiments, additional models 438 can include other suitable machine learning models for generating risk and/or prediction scores based on the operational telemetry data, such as anomaly detection models (e.g., isolation forests, autoencoders, and/or one-class support vector machines), clustering models (e.g., k-means and/or DBSCAN), and/or other suitable unsupervised and/or semi-supervised models.

In some embodiments, one or more models of ML ensemble 430 can be trained using supervised learning on historical incident outcomes from live IT infrastructure. In some embodiments, training labels can be constructed based on event windows preceding confirmed major incidents and/or significant incidents. In some embodiments, one or more models of ML ensemble 430 can be trained using human-in-the-loop labeled data, in which human operators can label and/or validate training data, along with unlabeled but cleaned data. In some embodiments, approximately seven to approximately eight months (or another suitable time period) of historical data can be used for training one or more models of ML ensemble 430.

In some embodiments, one or more models of ML ensemble 430 can be trained on multi-tenant operational telemetry data aggregated across a plurality of tenants. In some embodiments, tenant data can be aggregated as part of a single model training run, enabling cross-tenant pattern learning while maintaining tenant-specific threshold configurations. In some embodiments, patterns learned from a first tenant can be applied to a second tenant having no historical exposure to a failure pattern detected in the multi-tenant operational telemetry data of the first tenant.

In some embodiments, training data can be preprocessed prior to model training. In some embodiments, preprocessing can include using LLM system 343 (FIG. 3A) to extract key values from unstructured fields, such as short descriptions, descriptions, and/or resolution notes. In some embodiments, preprocessing also can include using text processing techniques, such as TF-IDF (term frequency-inverse document frequency), to transform unstructured data into structured features. In some embodiments, missing data can be imputed using suitable imputation techniques. In some embodiments, feature importance analysis, such as SHAP (SHapley Additive explanations) analysis, can be used to determine which features impact model performance and/or to select features for model training.

In some embodiments, one or more models of ML ensemble 430 can be retrained on a periodic schedule, such as weekly retraining cycles, based on resolved incident data and/or actual operational outcomes. In some embodiments, retraining can include comparing predicted versus actual outcomes, logging true positives, false positives, and/or false negatives, and/or updating model weights after validation testing. In some embodiments, training datasets and testing datasets can be split across different time periods, such as a training dataset spanning a first time period and a testing dataset spanning a subsequent time period. In some embodiments, reinforcement adjustments can be applied during retraining rather than during real-time inference, which can maintain inference latency while incorporating performance feedback.

In many embodiments, the outputs of ML ensemble 430 can be aggregated as predictive insights 440. In some embodiments, predictive insights 440 can include incident probability scores, impact classifications, confidence scores, tenant risk scores, SLA risk scores, change risk scores, and/or other prediction outputs generated by ML ensemble 430.

Continuing with FIG. 4B, in some embodiments, method 400 can include providing predictive insights 440 to decision system 313. In some embodiments, decision system 313 can receive predictive insights 440 and can perform confidence-based arbitration, routing, and/or automated action coordination based on predictive insights 440. In some embodiments, decision system 313 can categorize prediction outputs based on probability values and/or driver priority values, and can push categorized outputs to ITSM platform 341, such as into a custom risk field within ITSM platform 341.

In many embodiments, decision system 313 can be coupled to LLM system 343. In some embodiments, decision system 313 can transmit data to and/or receive analytical outputs from LLM system 343. In some embodiments, decision system 313 can use LLM system 343 to contextualize structured risk factors, synthesize operational data, and/or generate analytical summaries. In some embodiments, decision system 313 can integrate machine learning with large language model processing to provide a multimodal approach for AI-assisted predictions and/or operational analytics. In many embodiments, decision system 313 can be coupled to integration system 317. In some embodiments, decision system 313 can provide evaluated model outputs, aggregated risk evaluations, and/or automated action directives to integration system 317 for distribution to downstream systems.

In many embodiments, integration system 317 can be coupled to diagnostic system 315 and/or change risk system 316 through a system interface 451. In some embodiments, integration system 317 can route active incident data to diagnostic system 315 for similarity-based incident resolution acceleration. In some embodiments, integration system 317 can route change request data to change risk system 316 for change risk evaluation. In some embodiments, diagnostic system 315 can be coupled to a respective LLM system 343, and/or change risk system 316 can be coupled to a respective LLM system 343. In some embodiments, diagnostic system 315 and/or change risk system 316 can transmit data structures, such as JSON data structures, to their respective LLM system 343 instances and/or can receive analytical outputs, such as incident summaries, root cause analyses, resolution recommendations, communication plans, and/or contextual risk evaluations, from their respective LLM system 343 instances. In some embodiments system interface 451 can facilitate calls to diagnostic system 315 and/or change risk system 316 with the data structures. In some embodiments, system interface 451 can provide an interface layer for integration system 317, such as a web application interface and/or an API interface. In some embodiments, predictive insights 440 can be provided directly to diagnostic system 315 and/or change risk system 316, in addition to or as an alternative to routing through decision system 313 and/or integration system 317. In some embodiments, this direct routing can enable predictive insights 440 to inform diagnostic and/or change risk evaluation processes.

In many embodiments, integration system 317 also can be coupled to one or more external systems. In some embodiments, integration system 317 can be coupled to ITSM platform 341, an automation platform 452, and/or additional integrations 453. In some embodiments, ITSM platform 341 can receive automated action directives from integration system 317, such as predicted incident creation, ticket generation, operations team notifications, change advisory board escalations, and/or high-risk change approval blocks. In some embodiments, automation platform 452 can receive automation directives from integration system 317 for executing remediation actions and/or operational workflows on live IT infrastructure. In some embodiments, additional integrations 453 can provide connectivity with other external systems, such as communication platforms (e.g., messaging platforms, email systems, and/or collaboration tools), customer relationship management systems, and/or other suitable operational tools.

In some embodiments, data store 318 can receive prediction outputs, model results, feedback data, and/or audit logs from integration system 317, and data store 318 can update its records with such information.

In some embodiments, data ingestion system 312 (FIG. 4A) also can provide anomaly detection outputs, such as from anomaly detection system 423 (FIG. 4A), to integrations, such as additional integrations 453, in addition to or as an alternative to providing the anomaly detection outputs to predictive system 314. In some embodiments, data store 318 also can provide data to decision system 313, such as historical prediction data, feedback data, and/or tenant configuration data, to support confidence-based arbitration and/or threshold recalibration. In some embodiments, decision system 313 also can provide outputs to integrations, such as additional integrations 453, in addition to or as an alternative to providing outputs through integration system 317.

Figure 10:
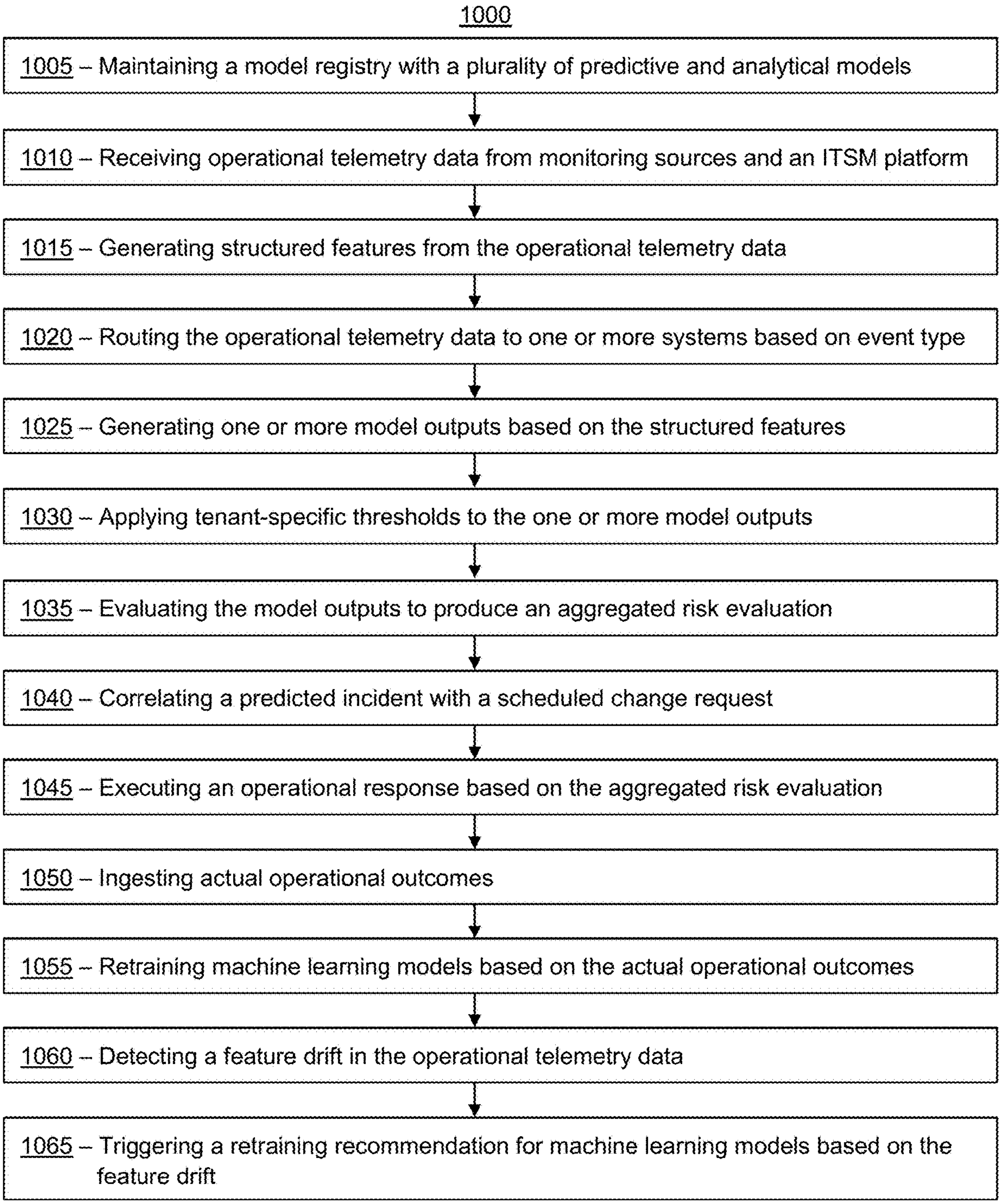
FIG. 10 illustrates a flowchart for a method for AI-driven operational risk management, according to an embodiment.

Jumping ahead in the drawings, FIG. 10 illustrates a flowchart for a method 1000 for AI-driven operational risk management, according to an embodiment. Method 1000 is exemplary and is not limited to the embodiments presented herein. The method can be employed in many different embodiments or examples not specifically depicted or described in this disclosure. In some embodiments, the procedures, processes, and/or activities of method 1000 can be executed in the sequence presented. In alternative embodiments, the procedures, processes, and/or activities of method 1000 can be executed in another suitable order. In further embodiments, one or more of the procedures, processes, and/or activities of method 1000 can be combined or omitted.

In various embodiments, system 300 (FIG. 3A), AI operations management system 310 (FIG. 3A), and/or decision system 313 (FIG. 3A) can be suitably configured to perform method 1000 and/or one or more of the activities of method 1000. In these or other embodiments, one or more of the activities of method 1000 can be implemented as computing instructions configured to execute on one or more processors and stored on one or more non-transitory computer-readable media. Such non-transitory computer-readable media can be part of system 300 (FIG. 3A). The processor(s) can be similar or identical to the processor(s) described with respect to computer system 100 (FIG. 1).

Referring to FIG. 10, method 1000 can include an activity 1005 of maintaining a model registry including a plurality of predictive and analytical models. The model registry can store performance metrics for each model of the plurality of predictive and analytical models. In some embodiments, the performance metrics can include accuracy, precision, recall, area under the curve (AUC), F1 score, and/or F1 weighted score. In some embodiments, the plurality of predictive and analytical models can include base predictive models, specialized infrastructure models, diagnostic similarity models, and/or change risk scoring models. In some embodiments, activity 1005 can be performed by decision system 313 (FIG. 3A) and/or model registry and arbitration system 352 (FIG. 3B).

In many embodiments, method 1000 also can include an activity 1010 of receiving operational telemetry data from one or more monitoring sources and an ITSM platform. The operational telemetry data can include alert events, incident records, change requests, and/or configuration item metadata. In some embodiments, the operational telemetry data can include both structured data, such as alert and incident value data, and/or unstructured data, such as short descriptions, descriptions, and/or resolution notes. In some embodiments, the operational telemetry data can be received via streaming and/or batch pipelines. In some embodiments, activity 1010 can be performed by data ingestion system 312 (FIG. 3A) and/or communication system 311 (FIG. 3A).

In many embodiments, method 1000 can include an activity 1015 of generating structured features from the operational telemetry data. The structured features can include temporal features, relational features, and/or cross-tenant features. In some embodiments, the temporal features can include event frequency metrics, alert burst patterns, temporal proximity features, time-windowed aggregation, rolling statistical metrics, normalized tenant-specific baselines, and/or cross-tenant embedding vectors. In some embodiments, the relational features can include configuration item-level aggregation, assignment group transitions, historical recurrence patterns, and/or cross-customer similarity embeddings. In some embodiments, the structured features can be generated from operational telemetry data aggregated across a plurality of tenants. In some embodiments, time-windowed aggregation can include computing event counts, case counts, and/or assignment group counts over multiple time windows, such as one-hour, two-hour, six-hour, twelve-hour, and/or twenty-four-hour windows. In some embodiments, the time-windowed aggregation can include alert counts at each time window, case counts at each time window, assignment group counts at each time window, and/or open group counts at each time window. In some embodiments, the structured features also can include machine-learning-ready text fields, such as processed short descriptions and/or processed alert descriptions, in which unstructured text has been transformed into structured representations using text processing techniques, such as TF-IDF and/or LLM-based key value extraction. In some embodiments, activity 1015 can be performed by feature engineering system 362 (FIG. 3B, described below).

In many embodiments, method 1000 can include an activity 1020 of routing the operational telemetry data to one or more of a predictive system, a diagnostic system, or a change risk system based at least on an event type of the operational telemetry data. In some embodiments, alert events can be routed to predictive system 314 (FIG. 3A), active incident records can be routed to diagnostic system 315 (FIG. 3A), and/or change requests can be routed to change risk system 316 (FIG. 3A). In some embodiments, activity 1020 can be performed by decision system 313 (FIG. 3A) and/or cross-system routing system 353 (FIG. 3B).

In many embodiments, method 1000 can include an activity 1025 of generating, by the one or more of the predictive system, the diagnostic system, or the change risk system, one or more model outputs based at least on the structured features. In some embodiments, the one or more model outputs can include incident probability scores, impact classifications, confidence scores, similarity scores, compliance risk scores, behavioral risk scores, major incident probability scores, documentation quality scores, and/or other suitable model outputs. In some embodiments, the one or more model outputs can be generated by one or more machine learning models trained on the aggregated operational telemetry data. In some embodiments, generating the one or more model outputs can include applying behavioral risk modifiers based on a historical performance of a change owner associated with a change request. The historical performance can include one or more of a success rate, a major incident causation rate, and/or an unauthorized change pattern. In some embodiments, activity 1025 can be performed by predictive system 314 (FIG. 3A), diagnostic system 315 (FIG. 3A), and/or change risk system 316 (FIG. 3A).

In many embodiments, method 1000 can include an activity 1030 of applying tenant-specific thresholds to the one or more model outputs. The tenant-specific thresholds can be independently configurable per tenant. In some embodiments, each tenant can be assigned a configurable risk tolerance profile. In some embodiments, the tenant-specific thresholds can allow higher sensitivity for brittle environments and/or allow higher specificity for noise-prone environments. In some embodiments, the tenant-specific thresholds can be set manually by operations teams, automatically based on historical operational data for the respective tenant, and/or through a combination of manual and automatic configuration. In some embodiments, applying the tenant-specific thresholds can include comparing the model output probability score against the tenant-specific threshold value and/or categorizing the model output into a risk level based on the tenant-specific threshold ranges. In some embodiments, the tenant-specific thresholds can be adjusted over time based on observed false positive rates, false negative rates, and/or operational feedback for the respective tenant. In some embodiments, activity 1030 can be performed by decision system 313 (FIG. 3A) and/or confidence-based escalation system 354 (FIG. 3B).

In many embodiments, method 1000 can include an activity 1035 of evaluating the one or more model outputs based at least on a confidence score to produce an aggregated risk evaluation. In some embodiments, the confidence score can be derived from a model output value between zero and one. In some embodiments, the confidence score can be categorized into risk levels, such as high, medium, and/or low, based on classification thresholds that combine a driver priority value and/or a model probability value. In some embodiments, the classification thresholds can be defined using conditional classification rules, such as case statement logic, in which different combinations of driver priority and model probability values can map to different risk level classifications.

In some embodiments, evaluating the one or more model outputs can include comparing a confidence score for a first output of a cross-tenant machine learning model against a predefined threshold. The first output can be one of the one or more model outputs. In some embodiments, when the confidence score is below the predefined threshold, the operational telemetry data can be routed to an infrastructure-specific machine learning model.

In some embodiments, evaluating the one or more model outputs further can include aggregating the first output of the cross-tenant machine learning model and a second output of the infrastructure-specific machine learning model using weighted voting to produce the aggregated risk evaluation. In some embodiments, weighted voting can include assigning a weight to each model output based on the model's historical calibration accuracy, confidence score, and/or infrastructure type metadata. In some embodiments, the weighted voting can produce a final risk score by computing a weighted average, a weighted majority vote, and/or other suitable weighted aggregation of the model outputs. In some embodiments, the weights can be dynamically adjusted based on observed model performance during periodic retraining cycles.

In some embodiments, evaluating the one or more model outputs further can include escalating to a human-in-the-loop workflow when the confidence score for the first output of the cross-tenant machine learning model and a confidence score for a second output of the infrastructure-specific machine learning model both fall below the predefined threshold. In some embodiments, the aggregated risk evaluation can include a unified operational risk score determined from a weighted aggregation of an incident probability, a change risk score, a behavioral risk score, a compliance risk score, and/or a historical major incident density. In some embodiments, the unified operational risk score can be used for executive dashboarding and/or automated prioritization of operational responses. In some embodiments, activity 1035 can be performed by decision system 313 (FIG. 3A) and/or model registry and arbitration system 352 (FIG. 3B).

In many embodiments, method 1000 can include an activity 1040 of correlating a predicted incident generated by the predictive system with a scheduled change request evaluated by the change risk system. In some embodiments, correlating the predicted incident with the scheduled change request can include increasing a risk score of the scheduled change request when a prediction horizon of the predicted incident intersects with a change window of the scheduled change request. In some embodiments, the prediction horizon can be a bounded future time interval, such as approximately five to approximately sixty minutes from the time of prediction. In some embodiments, the change window can be defined by implementation start and/or end timestamps associated with the scheduled change request. In some embodiments, correlating the predicted incident with the scheduled change request can include determining a temporal overlap between the prediction horizon and the change window. In some embodiments, when the temporal overlap is detected, decision system 313 (FIG. 3A) can log a cross-domain risk correlation event for audit and/or retraining purposes.

In some embodiments, when the predictive system predicts a high incident risk and a related change is scheduled, decision system 313 (FIG. 3A) can increase the change risk score, escalate a change advisory board review, and/or flag a cross-domain risk amplification. In some embodiments, when a change owner associated with a change request has a high unauthorized change history and/or the predictive system detects instability on a same configuration item associated with the change request, decision system 313 can amplify an escalation priority for the change request. In some embodiments, activity 1040 can be performed by decision system 313 (FIG. 3A) and/or cross-system routing system 353 (FIG. 3B).

In many embodiments, method 1000 can include an activity 1045 of executing an operational response based at least on the aggregated risk evaluation. In some embodiments, the operational response can include one or more of generating an operational alert, creating a predicted incident record within ITSM platform 341 (FIG. 3A), notifying an operations team, escalating to a change advisory board review, and/or blocking a high-risk change approval. In some embodiments, executing the operational response can include creating a predicted incident record within ITSM platform 341 (FIG. 3A) with a populated risk field indicating the predicted risk level for the incident. In some embodiments, the predicted incident record can be assigned to an operations team based on the assignment group associated with the alert event and/or configuration item. In some embodiments, executing the operational response can include transmitting a notification to one or more communication channels, such as messaging platforms, email systems, and/or collaboration tools, to alert operations personnel of the predicted incident on live IT infrastructure.

In some embodiments, executing the operational response can include blocking a high-risk change approval within ITSM platform 341, which can prevent the change from being implemented on live IT infrastructure until the change advisory board has reviewed the change request. In some embodiments, executing the operational response can include triggering an automated remediation workflow via automation platform 452 (FIG. 4B), such as executing a predefined runbook, restarting a service, and/or reallocating resources on the affected computing infrastructure. In some embodiments, automated actions can be logged for audit and/or retraining purposes. In some embodiments, activity 1045 can be performed by decision system 313 (FIG. 3A), integration system 317 (FIG. 3A), and/or automated action system 357 (FIG. 3B).

In many embodiments, method 1000 can include an activity 1050 of ingesting actual operational outcomes including incident occurrence data, change failure data, and/or resolution time data. In some embodiments, the actual operational outcomes can include whether an incident occurred, whether a change failed, and/or resolution time. In some embodiments, activity 1050 can be performed by decision system 313 (FIG. 3A) and/or feedback integration system 355 (FIG. 3B).

In many embodiments, method 1000 can include an activity 1055 of retraining one or more machine learning models based at least on the actual operational outcomes. In some embodiments, the retraining can include recalibrating threshold sensitivity and/or adjusting arbitration weighting based on the actual operational outcomes. In some embodiments, the retraining can be performed during a periodic retraining interval, such as weekly retraining cycles, rather than during real-time inference. In some embodiments, the retraining can include comparing predicted versus actual outcomes, logging true positives, false positives, and/or false negatives, and/or updating model weights after validation testing. In some embodiments, activity 1055 can be performed by decision system 313 (FIG. 3A) and/or feedback integration system 355 (FIG. 3B).

In many embodiments, method 1000 can include an activity 1060 of detecting a feature drift in the operational telemetry data. In some embodiments, detecting the feature drift can include detecting distribution shifts in the operational telemetry data and/or generating drift reports. In some embodiments, detecting the feature drift can include monitoring statistical properties of the operational telemetry data over time, such as mean values, variance values, and/or distribution shapes of one or more features. In some embodiments, detecting the feature drift can include applying statistical tests, such as Kolmogorov-Smirnov tests, population stability index calculations, and/or other suitable distribution comparison methods, to compare current feature distributions against baseline feature distributions. In some embodiments, when the feature drift exceeds a drift threshold, the drift report can include an identification of the drifted features, a magnitude of the drift, and/or a recommended retraining scope. In some embodiments, activity 1060 can be performed by decision system 313 (FIG. 3A) and/or feedback integration system 355 (FIG. 3B).

In many embodiments, method 1000 can include an activity 1065 of triggering a retraining recommendation for one or more machine learning models based at least on the feature drift. In some embodiments, the retraining recommendation can include logging pre-retraining and/or post-retraining performance for the one or more machine learning models. In some embodiments, activity 1065 can be performed by decision system 313 (FIG. 3A) and/or feedback integration system 355 (FIG. 3B).

Predictive System

Returning to FIG. 3B, in many embodiments, predictive system 314 can include a data ingestion system 361, a feature engineering system 362, a predictive model system 363, a confidence arbitration system 364, a dynamic thresholding system 365, an automated action system 366, a feedback and retraining system 367, and/or other suitable systems. In some embodiments, the data flow and processing architecture of predictive system 314 can be as described above with respect to FIG. 4A.

In many embodiments, data ingestion system 361 can receive multi-tenant operational telemetry data, such as alert events, incident records, case metadata, configuration item data, change records, and/or historical major incident classifications. In some embodiments, data ingestion system 361 can ingest data via streaming data pipelines. In some embodiments, data ingestion system 361 can receive data from data store 318 (FIG. 3A), monitoring system 342 (FIG. 3A), and/or additional data sources. In some embodiments, data ingestion system 361 can be part of or communicate with data ingestion system 312 (FIG. 3A) as described above with respect to FIG. 4A.

Continuing with FIG. 3B, in many embodiments, feature engineering system 362 can generate features, such as temporal features, relational features, and/or other suitable features, from the ingested data. In some embodiments, the temporal features can include event frequency metrics, alert burst patterns, temporal proximity features, time-windowed aggregation, rolling statistical metrics, normalized tenant-specific baselines, and/or cross-tenant embedding vectors. In some embodiments, the relational features can include configuration item-level aggregation, assignment group transitions, historical recurrence patterns, and/or cross-customer similarity embeddings. In some embodiments, feature engineering system 362 can use feature importance methods, such as SHAP and/or other suitable methods, to determine which features impact model performance. In some embodiments, feature engineering system 362 can use LLM system 343 (FIG. 3A) to extract key values from unstructured fields, such as short descriptions, descriptions, and/or resolution notes. In some embodiments, feature engineering system 362 can use TF-IDF (term frequency-inverse document frequency) and/or other text processing techniques to transform unstructured data. In some embodiments, feature engineering system 362 can impute missing data and/or transform data prior to training using a variety of preprocessing techniques.

In many embodiments, predictive model system 363 can generate prediction outputs, such as incident probability scores and/or impact classifications. In some embodiments, predictive model system 363 can include a base cross-tenant machine learning model, which can include an ensemble of machine learning models, such as an XGBoost model, a neural network model, and/or a random forest model, which can operate in parallel with weighted voting to produce a unified prediction output. In some embodiments, predictive model system 363 also can include one or more specialized infrastructure-specific models, such as mainframe-specific, network-specific, and/or distributed systems-specific models. In some embodiments, predictive model system 363 can produce a classification head output, which can include an incident probability score, an impact level classification, and/or a confidence score. In some embodiments, predictive model system 363 can predict probability of a major incident occurring within a predefined future time horizon, such as approximately five to approximately sixty minutes. In some embodiments, predictive model system 363 can operate using supervised learning trained on historical incident outcomes. In some embodiments, predictive model system 363 can use human-in-the-loop labeled data to train the models, along with unlabeled but cleaned data. In some embodiments, predictive model system 363 can predict operating system failures, network failures, and/or software failures on live IT infrastructure. In some embodiments, predictive model system 363 can include ML ensemble 430 (FIG. 4A), which can include MI prediction model 431, SI prediction model 432, precursor prediction model 433, priority escalation prediction model 434, tenant risk score model 435, SLA risk score model 436, change risk score model 437, and/or additional models 438, as described above with respect to FIG. 4A.

Continuing with FIG. 3B, in many embodiments, confidence arbitration system 364 can route low-confidence predictions to infrastructure-specific models. In some embodiments, when a base model confidence score falls below a predefined threshold, confidence arbitration system 364 can route the case to one or more specialized models. In some embodiments, outputs from the base model and/or the specialized models can be compared. In some embodiments, a weighted decision can be produced based on model confidence, historical performance calibration, and/or infrastructure type metadata. In some embodiments, confidence arbitration system 364 can advantageously reduce false positives and/or improve generalization across heterogeneous environments.

In many embodiments, dynamic thresholding system 365 can apply tenant-specific risk thresholds to prediction outputs. In some embodiments, each tenant can be assigned a configurable risk tolerance profile. In some embodiments, dynamic thresholding system 365 can apply tenant-specific thresholds to raw risk scores. In some embodiments, dynamic thresholding system 365 can allow higher sensitivity for brittle environments and/or allow higher specificity for noise-prone environments. In some embodiments, dynamic thresholding system 365 can maintain shared learning while preserving individualized alert triggers.

In many embodiments, automated action system 366 can generate operational alerts when thresholds are exceeded. In some embodiments, when an adjusted risk score exceeds a tenant threshold, automated action system 366 can generate an operational alert, a predicted incident record, and/or an automated incident creation within ITSM platform 341 (FIG. 3A). In some embodiments, automated action system 366 can store prediction artifacts for retrospective evaluation. In some embodiments, the prediction outputs generated by automated action system 366 can be aggregated as predictive insights 440 (FIG. 4A), as described above with respect to FIG. 4A.

In many embodiments, feedback and retraining system 367 can ingest resolved incident data and/or trigger periodic retraining cycles. In some embodiments, feedback and retraining system 367 can compare predicted versus actual outcomes. In some embodiments, feedback and retraining system 367 can log true positives, false positives, and/or false negatives. In some embodiments, feedback and retraining system 367 can detect feature drift trends. In some embodiments, feedback and retraining system 367 can trigger scheduled retraining cycles, such as weekly retraining cycles. In some embodiments, feedback and retraining system 367 can update model weights after validation testing. In some embodiments, reinforcement adjustments can be applied during retraining rather than in real-time inference. In some embodiments, approximately seven to approximately eight months of historical data can be used for training.

Figure 5:
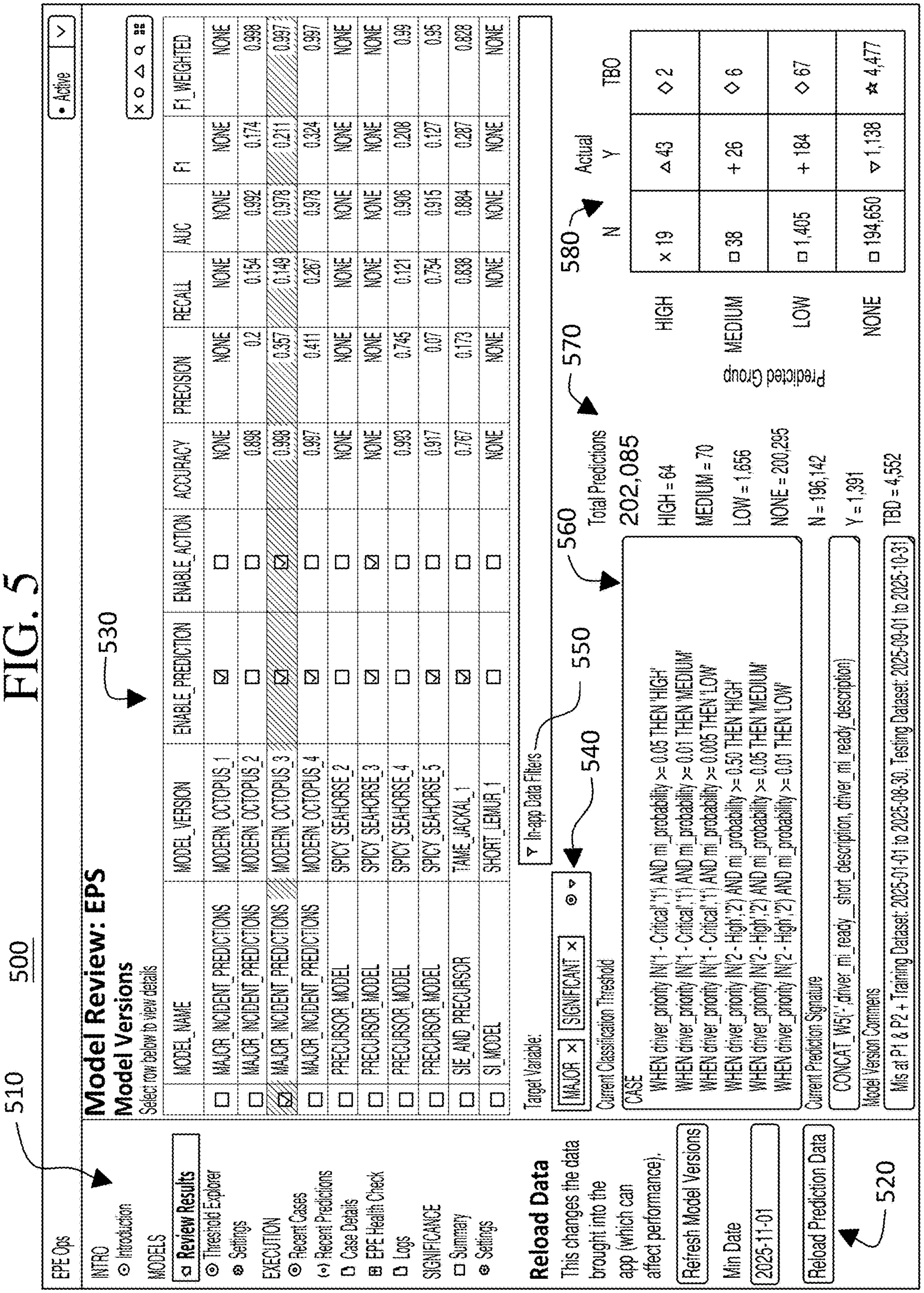
FIG. 5 illustrates an example of a display screen of a graphical user interface for a model review application.

Jumping ahead in the drawings, FIG. 5 illustrates a display screen of graphical user interface (GUI) 500 for a model review application, according to an embodiment. In some embodiments, GUI 500 can be an example of a graphical user interface displayed on GUI 323 (FIG. 3A) of user device 322 (FIG. 3A) and/or generated by AI operations management system 310 (FIG. 3A). In some embodiments, GUI 500 can be used by user 321 (FIG. 3A) to manage, evaluate, and/or configure one or more models of ML ensemble 430 (FIG. 4A).

In some embodiments, GUI 500 can include a navigation panel 510, which can include sections for introduction, models, execution, and/or significance. In some embodiments, GUI 500 can include a reload panel 520, which can include a reload data function, a refresh model versions option, a minimum date selector, and/or a reload prediction data control. In some embodiments, reload panel 520 can enable user 321 (FIG. 3A) to refresh model version data and/or reload prediction data from data store 318 (FIG. 3A).

In some embodiments, GUI 500 can include a model versions table 530, which can display machine learning models with columns for model name, model version, an enable prediction selector, an enable action selector, accuracy, precision, recall, AUC, F1, and/or F1 weighted. In some embodiments, model versions table 530 can list multiple model entries, such as major incident prediction models, precursor models, significant incident and precursor models, and/or significant incident models, with corresponding performance metrics. In some embodiments, each model entry can include an enable prediction control and/or an enable action control that can allow user 321 (FIG. 3A) to selectively enable and/or disable individual models and/or individual model versions for prediction and/or automated action. In some embodiments, model versions table 530 can display performance metrics for each model version, which can correspond to the performance metrics stored by model registry and arbitration system 352 (FIG. 3B).

In some embodiments, GUI 500 can include a target variable selector 540, which can include target variable selectors, such as major, significant, and/or other types of target variables. In some embodiments, GUI 500 can include a data filter 550, which can provide filtering controls for the displayed data.

In some embodiments, GUI 500 can include a threshold panel 560, which can display conditional classification rules that map driver priority and/or probability values to classification levels, such as high, medium, and/or low. In some embodiments, the conditional classification rules can include CASE statement logic in which different combinations of driver priority and model probability values can map to different classification levels. In some embodiments, threshold panel 560 can include current prediction signature, which can include a concatenation of driver fields used for generating predictions, and/or model version comments.

In some embodiments, GUI 500 can include a predictions panel 570, which can display a total prediction count and/or a breakdown of predictions by classification level, such as high, medium, low, and/or none categories, along with counts for actual outcome classifications.

In some embodiments, GUI 500 can include a predictions matrix 580. In some embodiments, predictions matrix 580 can display a confusion matrix comparing predicted group classifications against actual classifications. In some embodiments, predictions matrix 580 can include rows for high, medium, low, and/or none predicted classifications and columns for actual outcome classifications. In some embodiments, predictions matrix 580 can enable user 321 (FIG. 3A) to evaluate model performance, compare different model versions, and/or make informed decisions about which predictive models to deploy for major incident prediction.

Figure 11:
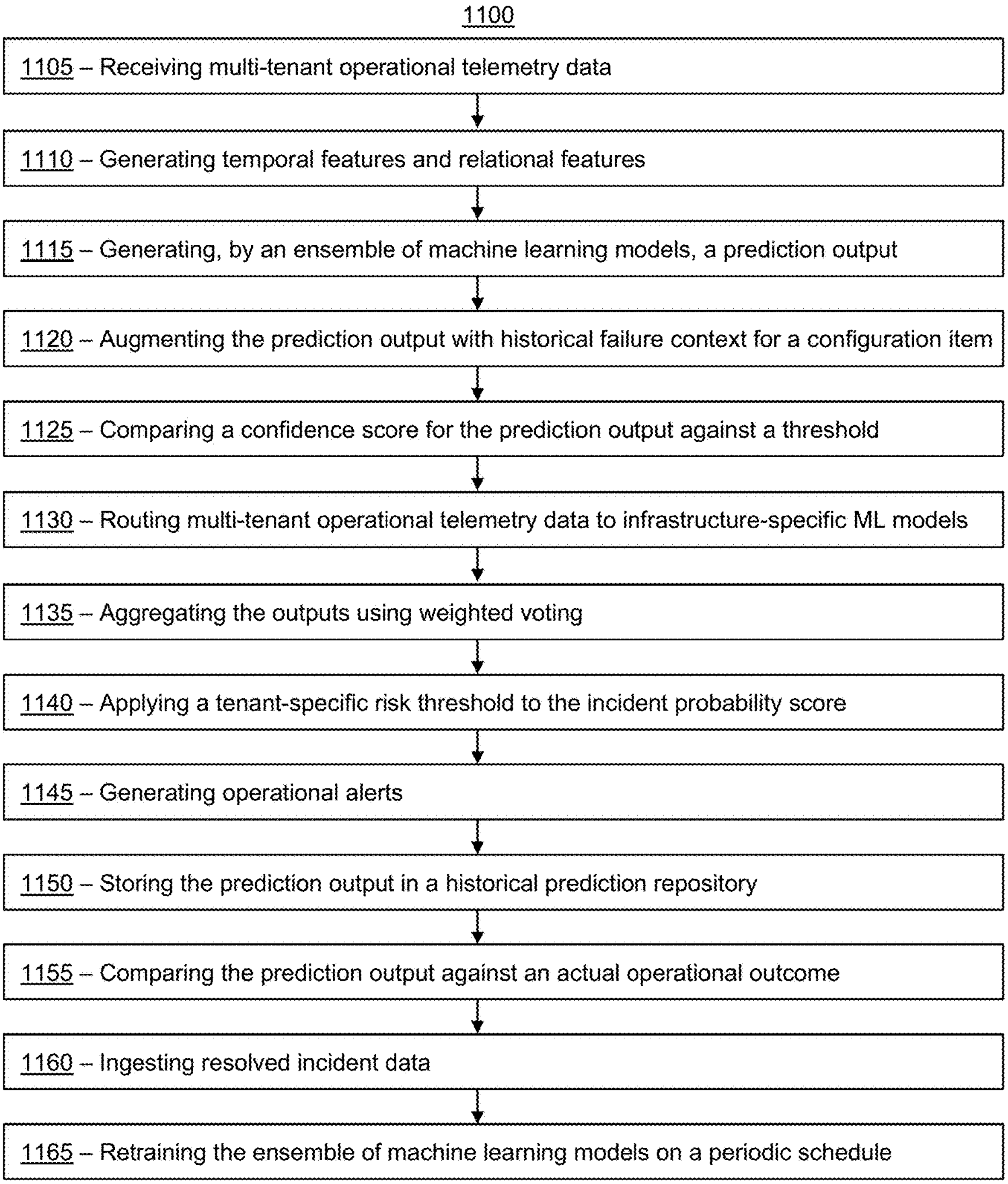
FIG. 11 illustrates a flowchart for a method for predictive analytics for multi-tenant operational telemetry processing, according to an embodiment.

Jumping ahead in the drawings, FIG. 11 illustrates a flowchart for a method 1100 for predictive analytics for multi-tenant operational telemetry processing, according to an embodiment. Method 1100 is exemplary and is not limited to the embodiments presented herein. The method can be employed in many different embodiments or examples not specifically depicted or described in this disclosure. In some embodiments, the procedures, processes, and/or activities of method 1100 can be executed in the sequence presented. In alternative embodiments, the procedures, processes, and/or activities of method 1100 can be executed in another suitable order. In further embodiments, one or more of the procedures, processes, and/or activities of method 1100 can be combined or omitted.

In various embodiments, system 300 (FIG. 3A), AI operations management system 310 (FIG. 3A), and/or predictive system 314 (FIG. 3A) can be suitably configured to perform method 1100 and/or one or more of the activities of method 1100. In these or other embodiments, one or more of the activities of method 1100 can be implemented as computing instructions configured to execute on one or more processors and stored on one or more non-transitory computer-readable media. Such non-transitory computer-readable media can be part of system 300 (FIG. 3A). The processor(s) can be similar or identical to the processor(s) described with respect to computer system 100 (FIG. 1).

Referring to FIG. 11, method 1100 can include an activity 1105 of receiving multi-tenant operational telemetry data. The multi-tenant operational telemetry data can include alert events, incident records, and/or configuration item metadata. In some embodiments, the multi-tenant operational telemetry data can include both structured data, such as alert and incident value data, and/or unstructured data, such as short descriptions, descriptions, and/or resolution notes. In some embodiments, the multi-tenant operational telemetry data can be received from data store 318 (FIG. 3A), monitoring system 342 (FIG. 3A), and/or additional data sources 401 (FIG. 4A). In some embodiments, activity 1105 can be performed by data ingestion system 361 (FIG. 3B).

In many embodiments, method 1100 can include an activity 1110 of generating temporal features and relational features from the multi-tenant operational telemetry data. The temporal features can include time-windowed aggregation of event frequency metrics and/or alert burst patterns. The relational features can include configuration item-level aggregation and/or assignment group transitions. In some embodiments, the temporal features also can include temporal proximity features, rolling statistical metrics, normalized tenant-specific baselines, and/or cross-tenant embedding vectors. In some embodiments, the relational features also can include historical recurrence patterns and/or cross-customer similarity embeddings. In some embodiments, time-windowed aggregation can include determining event counts, case counts, and/or assignment group counts over multiple time windows, such as one-hour, two-hour, six-hour, twelve-hour, and/or twenty-four-hour windows. In some embodiments, alert burst patterns can be detected by determining alert frequency exceeding a baseline threshold within a sliding time window. In some embodiments, configuration item-level aggregation can include grouping alerts and/or incidents by configuration item and determining aggregate statistics, such as alert counts, incident counts, and/or event frequency for each configuration item. In some embodiments, assignment group transitions can be tracked by determining reassignment counts, handoff patterns, and/or escalation sequences for incidents and/or alerts. In some embodiments, activity 1110 can be performed by feature engineering system 362 (FIG. 3B).

In many embodiments, method 1100 can include an activity 1115 of generating, by an ensemble of machine learning models operating in parallel based at least on the temporal features and the relational features, a prediction output for a major incident within a predefined time horizon. The prediction output can include an incident probability score and/or an impact classification. In some embodiments, the impact classification can be presented for operational awareness and/or can be independent of threshold triggering of the one or more operational alerts. In some embodiments, the predefined time horizon can be approximately five minutes to approximately sixty minutes. In some embodiments, the average prediction timeframe can be approximately seven minutes in advance of incident manifestation. In some embodiments, the ensemble of machine learning models can include an XGBoost model, a neural network model, and/or a random forest model. In some embodiments, the XGBoost model, the neural network model, and/or the random forest model can each process the same input features in parallel and can each produce a respective probability score. In some embodiments, the prediction output can be produced by determining a weighted combination, a weighted average, and/or a maximum of the respective probability scores from the ensemble of machine learning models. In some embodiments, the ensemble of machine learning models can be trained on the multi-tenant operational telemetry data. In some embodiments, patterns learned from a first tenant can be applied to a second tenant having no historical exposure to a failure pattern detected in the multi-tenant operational telemetry data of the first tenant. In some embodiments, the system can track cross-tenant early prediction effectiveness as part of retraining reports. In some embodiments, training labels can be constructed based on event windows preceding confirmed major incidents and/or significant incidents. In some embodiments, the event windows can be defined as operational telemetry events occurring within a predefined time period, such as approximately sixty minutes, preceding each confirmed major incident. In some embodiments, negative training examples can be constructed from event windows not preceding a major incident. In some embodiments, activity 1115 can be performed by predictive model system 363 (FIG. 3B) and/or ML ensemble 430 (FIG. 4A).

In many embodiments, method 1100 can include an activity 1120 of augmenting the prediction output with historical failure context for a configuration item associated with the prediction output. The historical failure context can include prior major incidents for the configuration item and/or related configuration item clusters. In some embodiments, the system can store historical major incidents per configuration item. In some embodiments, the historical failure context can be retrieved from data store 318 (FIG. 3A). In some embodiments, activity 1120 can be performed by predictive model system 363 (FIG. 3B).

In many embodiments, method 1100 can include an activity 1125 of comparing a confidence score associated with the prediction output against a predefined threshold. In some embodiments, the confidence score can be derived from a model output value between zero and one. In some embodiments, the confidence score can be categorized into risk levels, such as high, medium, and/or low, based on classification thresholds that combine a driver priority value and/or a model probability value. In some embodiments, for gradient boosting models such as XGBoost, the confidence score can be derived from the predicted probability output of the model. In some embodiments, for neural network models, the confidence score can be derived from softmax output values and/or output layer activation values. In some embodiments, for random forest models, the confidence score can be derived from the proportion of decision trees voting for the predicted class. In some embodiments, activity 1125 can be performed by confidence arbitration system 364 (FIG. 3B).

In many embodiments, method 1100 can include an activity 1130 of routing the multi-tenant operational telemetry data to one or more infrastructure-specific machine learning models when the confidence score is below the predefined threshold. The one or more operational alerts can be based at least on an output of the one or more infrastructure-specific machine learning models. In some embodiments, the infrastructure-specific machine learning models can include mainframe-specific, network-specific, and/or distributed systems-specific models. In some embodiments, the infrastructure type can be determined from configuration item metadata, alert source identifiers, and/or assignment group designations associated with the operational telemetry data. In some embodiments, activity 1130 can be performed by confidence arbitration system 364 (FIG. 3B).

In many embodiments, method 1100 can include an activity 1135 of aggregating the prediction output and the output of the one or more infrastructure-specific machine learning models using weighted voting. In some embodiments, weighted voting can include assigning a weight to each model output based on the model's historical calibration accuracy, confidence score, and/or infrastructure type metadata. In some embodiments, the weighted voting can produce a final risk score by determining a weighted average, a weighted majority vote, and/or other suitable weighted aggregation of the model outputs. In some embodiments, the weights can be dynamically adjusted based on observed model performance during periodic retraining cycles. In some embodiments, activity 1135 can be performed by confidence arbitration system 364 (FIG. 3B).

In many embodiments, method 1100 can include an activity 1140 of applying a tenant-specific risk threshold to the incident probability score. The tenant-specific risk threshold can be independently configurable for a respective tenant based at least on an infrastructure volatility of the respective tenant. In some embodiments, each tenant can be assigned a configurable risk tolerance profile. In some embodiments, the tenant-specific risk threshold can allow higher sensitivity for brittle environments and/or allow higher specificity for noise-prone environments. In some embodiments, for a production environment with brittle infrastructure, the tenant-specific risk threshold can be set to a lower value, such as approximately 0.3, so that lower-probability predictions can trigger operational alerts. In some embodiments, for a development and/or testing environment with higher noise levels, the tenant-specific risk threshold can be set to a higher value, such as approximately 0.7, to reduce false positive alerts. In some embodiments, activity 1140 can be performed by dynamic thresholding system 365 (FIG. 3B).

In many embodiments, method 1100 can include an activity 1145 of generating one or more operational alerts when the incident probability score exceeds the tenant-specific risk threshold. In some embodiments, the one or more operational alerts can include an operational alert, a predicted incident record within ITSM platform 341 (FIG. 3A), and/or an automated incident creation. In some embodiments, the predicted incident record can include a populated risk field indicating the predicted risk level for the incident. In some embodiments, the populated risk field within ITSM platform 341 can be visible to operations teams and/or can trigger automated workflows within ITSM platform 341, such as automatic assignment to an operations team, automatic escalation based on the risk level, and/or automatic notification to on-call personnel responsible for the affected live IT infrastructure. In some embodiments, the one or more operational alerts can trigger notifications to operations personnel via communication channels, such as messaging platforms, email systems, and/or collaboration tools. In some embodiments, activity 1145 can be performed by automated action system 366 (FIG. 3B).

In many embodiments, method 1100 can include an activity 1150 of storing the prediction output in a historical prediction repository. In some embodiments, the historical prediction repository can be part of data store 318 (FIG. 3A). In some embodiments, prediction artifacts can be stored for retrospective evaluation. In some embodiments, activity 1150 can be performed by automated action system 366 (FIG. 3B) and/or feedback and retraining system 367 (FIG. 3B).

In many embodiments, method 1100 can include an activity 1155 of comparing the prediction output against an actual operational outcome for calibration analysis. In some embodiments, the calibration analysis can include logging true positives, false positives, and/or false negatives. In some embodiments, the calibration analysis can be used to recalibrate threshold sensitivity and/or adjust arbitration weighting. In some embodiments, activity 1155 can be performed by feedback and retraining system 367 (FIG. 3B).

In many embodiments, method 1100 can include an activity 1160 of ingesting resolved incident data. In some embodiments, the resolved incident data can include resolution codes, resolution timestamps, and/or resolution notes from ITSM platform 341 (FIG. 3A). In some embodiments, activity 1160 can be performed by feedback and retraining system 367 (FIG. 3B).

In many embodiments, method 1100 can include an activity 1165 of retraining the ensemble of machine learning models on a periodic schedule based at least on the resolved incident data. In some embodiments, the periodic schedule can include weekly retraining cycles and/or other suitable retraining intervals. In some embodiments, the retraining can include updating model weights after validation testing. In some embodiments, reinforcement adjustments can be applied during retraining rather than during real-time inference. In some embodiments, approximately seven to approximately eight months of historical data can be used for training. In some embodiments, training datasets and testing datasets can be split across different time periods, such as a training dataset spanning a first time period and a testing dataset spanning a subsequent time period. In some embodiments, activity 1165 can be performed by feedback and retraining system 367 (FIG. 3B).

Diagnostic System

Returning to FIG. 3B, in many embodiments, diagnostic system 315 can include a data ingestion system 371, a feature extraction and embedding system 372, a similarity intelligence system 373, a confidence scoring system 374, a resolution benchmarking system 375, an acceleration quantification system 376, a feedback and learning system 377, and/or other suitable systems.

In many embodiments, data ingestion system 371 can receive active incident data and/or historical incident data. In some embodiments, data ingestion system 371 can ingest incident short descriptions, descriptions, journal entries, work notes, assignment group transitions, configuration item metadata, resolution codes, opened and/or resolved timestamps, business pause duration, and/or work-time tracking. In some embodiments, historical data can be ingested across multiple tenants. In some embodiments, data ingestion system 371 can be part of or communicate with data ingestion system 312 (FIG. 3A).

In many embodiments, feature extraction and embedding system 372 can generate semantic and/or structured operational metadata embeddings. In some embodiments, feature extraction and embedding system 372 can transform raw textual and/or structured data into embeddings using semantic NLP encoding of descriptions, resolution code embeddings, configuration item clustering, assignment group vectors, and/or temporal resolution patterns. In some embodiments, feature types can include Jaro-Winkler similarity as a method for identifying similar historical cases, vector embeddings for semantic similarity used during input preprocessing, operational metadata vectors, and/or hybrid structured and unstructured similarity scoring. In some embodiments, feature extraction and embedding system 372 can produce a unified similarity feature representation. In some embodiments, feature extraction and embedding system 372 can construct a data structure, such as a JSON data structure, which can include concatenated alerts, changes, incidents, and/or requests data, which can be sent to LLM system 343 (FIG. 3A) for analysis.

In many embodiments, similarity intelligence system 373 can determine contextual similarity scores between active incidents and historical incidents. In some embodiments, similarity intelligence system 373 can determine similarity scores using weighted semantic similarity, structured metadata alignment, configuration item match weighting, assignment group weighting, and/or resolution pattern similarity. In some embodiments, similarity intelligence system 373 can rank candidate similar cases and/or return a top number of matches. In some embodiments, similarity can advantageously be determined using contextual embeddings and/or operational correlation features rather than keyword search alone. In some embodiments, similarity intelligence system 373 can produce a composite similarity score using weighted aggregation of NLP semantic embeddings, structured metadata similarity, configuration item-level correlation, and/or assignment group transition patterns. In some embodiments, patterns learned from one tenant's incident resolutions can be used to inform recommendations for another tenant with similar infrastructure profiles. In some embodiments, tenant-specific thresholds can restrict cross-tenant visibility while preserving pattern learning.

In many embodiments, confidence scoring system 374 can assign confidence scores to recommended cases. In some embodiments, each recommended case can be assigned a similarity score and/or a confidence score derived from historical performance accuracy, resolution consistency, cross-tenant validation, and/or embedding proximity stability. In some embodiments, low-confidence matches can be excluded and/or deprioritized.

In many embodiments, resolution benchmarking system 375 can determine expected resolution durations based on similar historical incidents. In some embodiments, resolution benchmarking system 375 can calculate average MTTR, median MTTR, business-hour MTTR, and/or active work-time MTTR of similar historical cases. In some embodiments, resolution benchmarking system 375 can determine an expected resolution duration. In some embodiments, a current case's resolution duration can be compared against the benchmark.

In many embodiments, acceleration quantification system 376 can determine resolution time savings and/or estimated impact. In some embodiments, upon resolution of an active incident, acceleration quantification system 376 can determine actual cycle time, actual business-hour time, estimated time savings relative to benchmark, estimated labor hours saved, and/or estimated financial impact. In some embodiments, financial impact can be calculated using average hourly resolver cost and/or number of personnel typically involved in similar incidents.

In many embodiments, feedback and learning system 377 can recalibrate similarity scoring based on resolution outcomes. In some embodiments, feedback and learning system 377 can record whether recommendations were acted upon, user feedback ratings, post-resolution outcome, and/or deviation from predicted benchmark. In some embodiments, the similarity model can be recalibrated during periodic retraining cycles using resolution effectiveness data. In some embodiments, similarity weighting can be dynamically adjusted during retraining based on whether similar case recommendations led to faster resolution, post-resolution feedback, and/or false similarity correlations.

Figure 6:
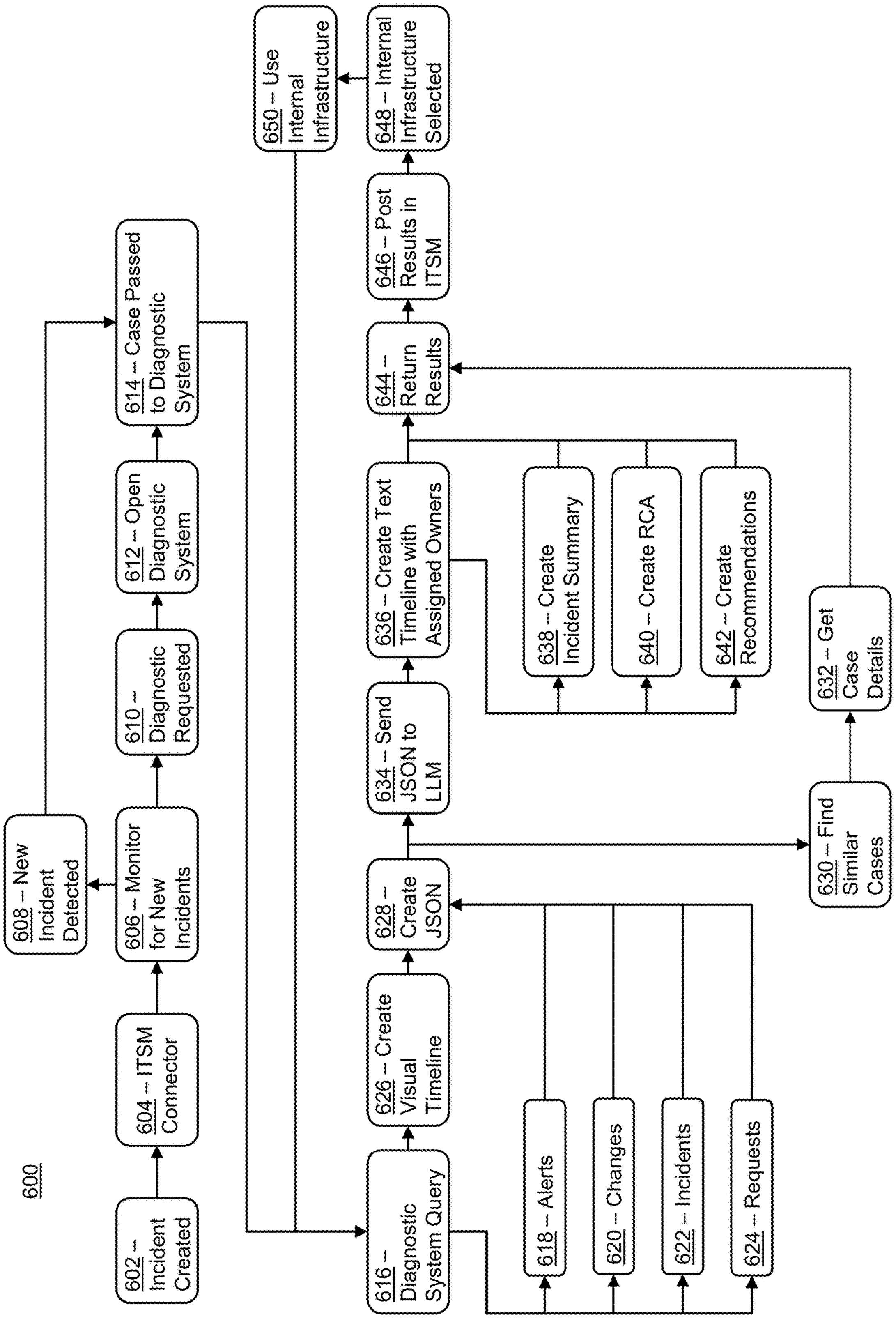
FIG. 6 illustrates a flowchart for a method for diagnostic incident resolution, according to an embodiment.

Jumping ahead in the drawings, FIG. 6 illustrates a flowchart for a method 600 depicting a diagnostic workflow process for incident resolution, according to an embodiment. In some embodiments, method 600 can be performed by diagnostic system 315 (FIG. 3A) and/or one or more subsystems thereof, in coordination with ITSM platform 341 (FIG. 3A), LLM system 343 (FIG. 3A), and/or integration system 317 (FIG. 3A).

In many embodiments, method 600 can begin with an activity 602 in which an incident is created within ITSM platform 341 (FIG. 3A). In some embodiments, the incident can be created in response to an alert event, a user report, and/or an automated detection on live IT infrastructure.

In some embodiments, method 600 can proceed to an activity 604 in which an ITSM connector receives the incident data from ITSM platform 341 (FIG. 3A). ITSM connector can interface with ITSM platform 341 (FIG. 3A), such as to monitor ITSM platform 341 (FIG. 3A) for new incidents.

In some embodiments, method 600 can proceed to an activity 606 in which the system monitors for new incidents.

In some embodiments, at an activity 608, a new incident is detected. In some embodiments, when a new incident is detected, the case can be automatically passed to diagnostic system 315 (FIG. 3A) at an activity 614.

In many embodiments, method 600 can proceed to an activity 610 in which a diagnostic is requested. In some embodiments, the diagnostic can be requested by a user clicking a diagnostic button within ITSM platform 341 (FIG. 3A) and/or by an automated trigger.

In some embodiments, method 600 can proceed to an activity 612 in which an application interface opens. In some embodiments, the application interface can be a web application hosted on AI operations management system 310 (FIG. 3A), diagnostic system 315 (FIG. 3A), and/or data store 318 (FIG. 3A). In some embodiments, the application interface can be similar or identical to system interface 451 (FIG. 4B).

In many embodiments, method 600 can proceed to an activity 614 in which the case and/or incident identifier is passed to diagnostic system 315 (FIG. 3A). In some embodiments, the case and/or incident identifier can be automatically passed to diagnostic system 315 (FIG. 3A) from ITSM platform 341 (FIG. 3A) when a new incident is detected at activity 608. In some embodiments, the case and/or incident identifier also can be passed to diagnostic system 315 (FIG. 3A) in response to the diagnostic request at activity 610.

In many embodiments, method 600 can proceed to an activity 616 in which diagnostic system 315 (FIG. 3A) executes a query. In some embodiments, the query can be executed against data store 318 (FIG. 3A) and/or ITSM platform 341 (FIG. 3A) using the case and/or incident identifier from activity 614. In some embodiments, the query can retrieve data from past and/or current IT support cases associated with the active incident. In some embodiments, the query can incorporate a user-selectable time scale parameter allowing lookback periods, such as approximately one to approximately seventy-two hours prior to the incident. In some embodiments, the query can retrieve incident short descriptions, descriptions, journal entries, work notes, assignment group transitions, configuration item metadata, resolution codes, opened and/or resolved timestamps, business pause duration, and/or work-time tracking data. In some embodiments, the query can retrieve multiple categories of related operational data. In some embodiments, the query can retrieve alerts 618, changes 620, incidents 622, and/or requests 624. In some embodiments, the user-selectable time scale parameter can control the lookback period for retrieving the alerts, changes, incidents, and/or requests relative to the incident creation time.

In many embodiments, method 600 can proceed to an activity 626 in which a visual timeline is created based on the queried data. In some embodiments, the visual timeline can display the retrieved alerts, changes, incidents, and/or requests in chronological order relative to the incident, such as plotted along a horizontal time axis measured in minutes before the incident.

In many embodiments, method 600 can proceed to an activity 628 in which a data structure is created. In some embodiments, the data structure can be a JSON data structure. In some embodiments, the data structure can include concatenated alerts, changes, incidents, and/or requests associated with the active incident, and/or the timeline created in activity 626.

In some embodiments, from activity 628, method 600 can branch to an activity 630 of finding similar cases. In some embodiments, similar cases can be found using string similarity scoring, such as Jaro-Winkler similarity, applied to the active incident data and/or historical incident data. In some embodiments, method 600 can proceed to an activity 632 in which case details are retrieved for the similar cases.

In many embodiments, method 600 can proceed after activity 628 to an activity 634 in which the data structure is sent to LLM system 343 (FIG. 3A) for analysis. In some cases, activity 634 can proceed in parallel with activities 630 and/or 632. In some embodiments, LLM system 343 (FIG. 3A) can use custom prompting strategies to drive summarization of incident-related details. In some embodiments, the custom prompting strategies can include structured prompt templates that instruct LLM system 343 to generate specific output types from the data structure. In some embodiments, the custom prompting strategies can include a prompt template for generating an incident summary based on the concatenated alerts, changes, incidents, and/or requests in the data structure. In some embodiments, the custom prompting strategies can include a prompt template for generating a root cause analysis based on the timeline of events, the affected configuration items, and/or the patterns of alerts preceding the incident. In some embodiments, the custom prompting strategies can include a prompt template for generating resolution recommendations based on the root cause analysis, the similar historical cases, and/or the resolution outcomes of the similar historical cases. In some embodiments, the custom prompting strategies can include instructions for LLM system 343 to identify relationships between preceding events and the active incident, assign ownership information to timeline entries, and/or prioritize recommendations based on the severity and/or urgency of the incident. In some embodiments, the custom prompting strategies can include instructions for LLM system 343 to generate output in a structured format, such as separate sections for incident summary, root cause analysis, and/or recommendations.

In many embodiments, method 600 can proceed to an activity 636 in which a text timeline with assigned owners is created. In some embodiments, the text timeline can include timestamps, event descriptions, assignment group designations, and/or assignee information for each event in the timeline. In some embodiments, activity 636 can receive input from an activity 638 in which an incident summary is created. In some embodiments, the incident summary can include a description of the incident, affected systems, affected applications, and/or precursor events on live IT infrastructure. In some embodiments, activity 636 also can receive input from an activity 640 in which a root cause analysis is created. In some embodiments, the root cause analysis can identify underlying causes of the incident based on the operational telemetry data, the timeline of preceding events, and/or the LLM analysis. In some embodiments, activity 636 also can receive input from an activity 642 in which recommendations are created. In some embodiments, the recommendations can include actionable resolution steps, such as specific commands, procedures, verification steps, and/or configuration changes to be performed on the affected live IT infrastructure.

In many embodiments, method 600 can proceed to an activity 644 in which results are returned to the application interface. In some embodiments, the results can include the incident summary, the root cause analysis, the recommendations, the text timeline with assigned owners, and/or the similar cases with case details.

In many embodiments, method 600 can proceed to an activity 646 in which the results are posted in ITSM platform 341 (FIG. 3A). In some embodiments, the results can be posted as work notes, journal entries, and/or resolution notes within the incident record in ITSM platform 341 (FIG. 3A). In some embodiments, the posted results can be visible to operations teams and/or can inform subsequent incident resolution activities on the affected live IT infrastructure.

In some embodiments, method 600 can include an activity 648 in which internal infrastructure is selected, after which an activity 650 can be performed to use internal infrastructure, such as associated with the entity that provides AI operations management system 310, which can proceed to activity 616 based on that tenant as the entity. In some embodiments, the internal infrastructure can be used to perform remediation actions on the affected live IT infrastructure, such as via automation platform 452 (FIG. 4B) and/or other suitable operational tools. In some embodiments, method 600 also can include integration with one or more external systems, such as automation platforms, data platforms, ITSM platforms, and/or customer relationship management systems, via integration system 317 (FIG. 3A).

Figure 7:
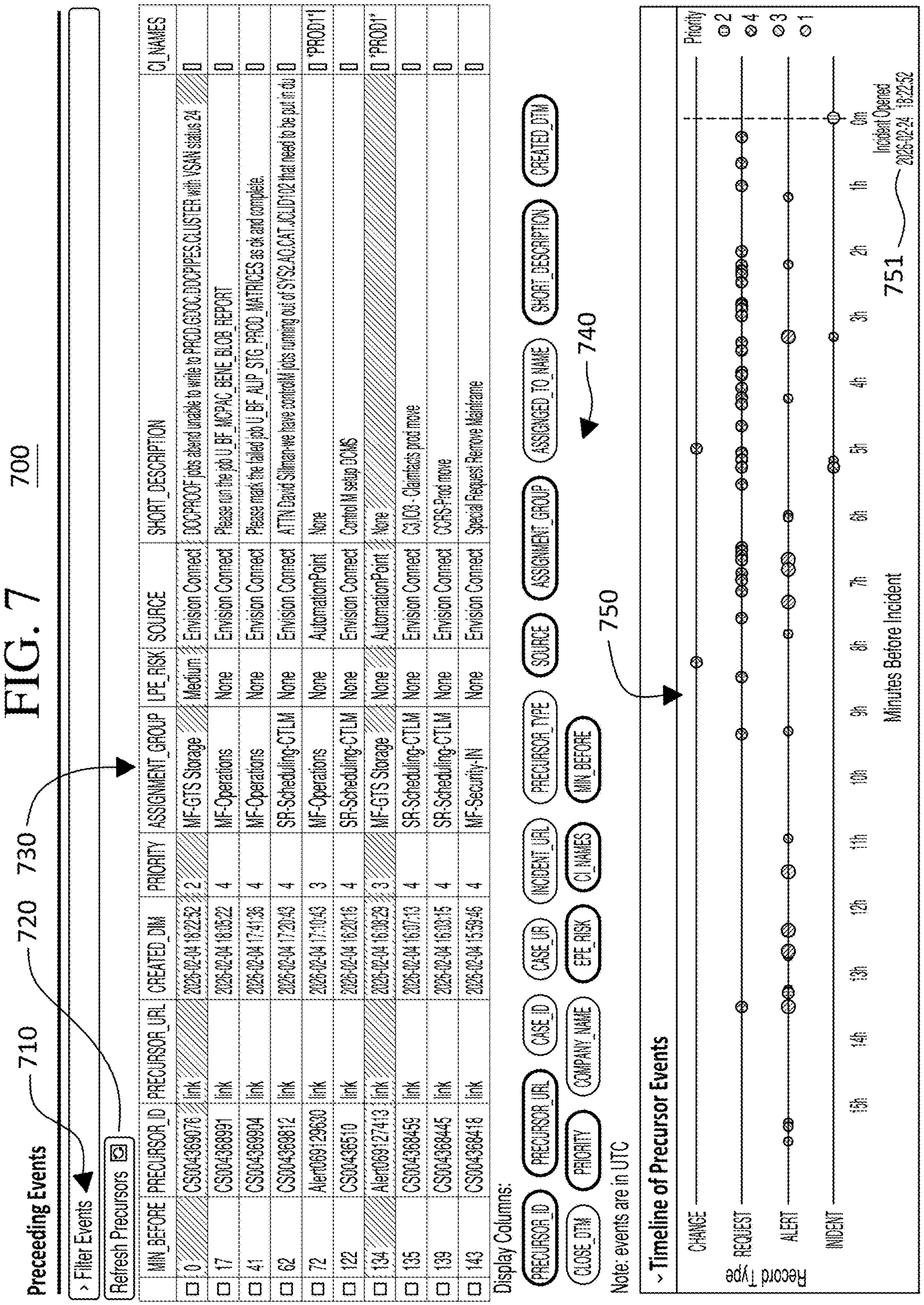
FIG. 7 illustrates an example of a display screen of a graphical user interface for a preceding events display.

Turning ahead in the drawings, FIG. 7 illustrates a display screen for a graphical user interface (GUI) 700 for a preceding events display, according to an embodiment. In some embodiments, GUI 700 can be an example of a graphical user interface displayed on GUI 323 (FIG. 3A) of user device 322 (FIG. 3A) and/or generated by AI operations management system 310 (FIG. 3A). In some embodiments, GUI 700 can be used by user 321 (FIG. 3A) to view and/or analyze precursor events that occurred prior to an incident on live IT infrastructure. In some embodiments, GUI 700 can be generated by diagnostic system 315 (FIG. 3A), predictive system 314 (FIG. 3A), and/or precursor prediction model 433 (FIG. 4A).

In some embodiments, GUI 700 can include a filter panel 710, which can allow filtering the displayed precursor events.

In some embodiments, GUI 700 can include a refresh selector 720, which can allow for refreshing the precursor event data from data store 318 (FIG. 3A) and/or ITSM platform 341 (FIG. 3A).

In some embodiments, GUI 700 can include a precursor table 730, which can display preceding event records. In some embodiments, precursor table 730 can include columns for minutes before incident, precursor identifier, precursor URL, created date and time, priority, assignment group, risk level, source, short description, and/or configuration item names. In some embodiments, each row of precursor table 730 can represent a distinct precursor event that occurred prior to the incident. In some embodiments, the priority column can display numerical priority values, such as priority values ranging from one to five. In some embodiments, the assignment group column can display group identifiers, such as mainframe operations, scheduling, storage, and/or security designations. In some embodiments, the risk level column can display risk classifications generated by predictive system 314 (FIG. 3A), such as high, medium, low, and/or none values. In some embodiments, the source column can display source identifiers indicating the data origin of each precursor event, such as monitoring system connectors and/or automation tools. In some embodiments, each row can include a checkbox for selection, a link element in the precursor URL column, and/or text entries for the remaining columns.

In some embodiments, GUI 700 can include a display column selector 740, which can allow the user to modify the columns displayed in precursor table 730. In some embodiments, other the column labels not shown in precursor table 730, but which could be selected, can include case identifier, case URL, incident identifier, incident URL, precursor type, assigned to name, close date and time, and/or company name.

In some embodiments, GUI 700 can include a timeline 750, which can display a horizontal axis representing minutes before incident, such as ranging from approximately fifteen hours to approximately zero minutes before the incident. In some embodiments, timeline 750 can display a vertical axis representing record type categories, such as change, request, alert, and/or incident. In some embodiments, markers at various positions along timeline 750 can correspond to precursor events. In some embodiments, the markers can be displayed in different colors or patterns corresponding to different priority levels, such as for priorities 1-4. In some embodiments, timeline 750 can include an incident opened indicator 751 displayed as a vertical dashed line at a right edge of timeline 750 with a corresponding timestamp indicating when the incident was opened. In some embodiments, timeline 750 can enable user 321 (FIG. 3A) to visualize temporal patterns and/or correlations between different types of precursor events leading up to a major incident on live IT infrastructure. In some embodiments, the distribution of events across timeline 750 can support identification of alert clustering patterns, temporal proximity of changes to incidents, and/or sequences of requests preceding service-impacting events. In some embodiments, the precursor event data displayed in GUI 700 can support the similarity-based historical analysis and/or pattern recognition functions of diagnostic system 315 (FIG. 3A) and/or predictive system 314 (FIG. 3A).

Figure 8:
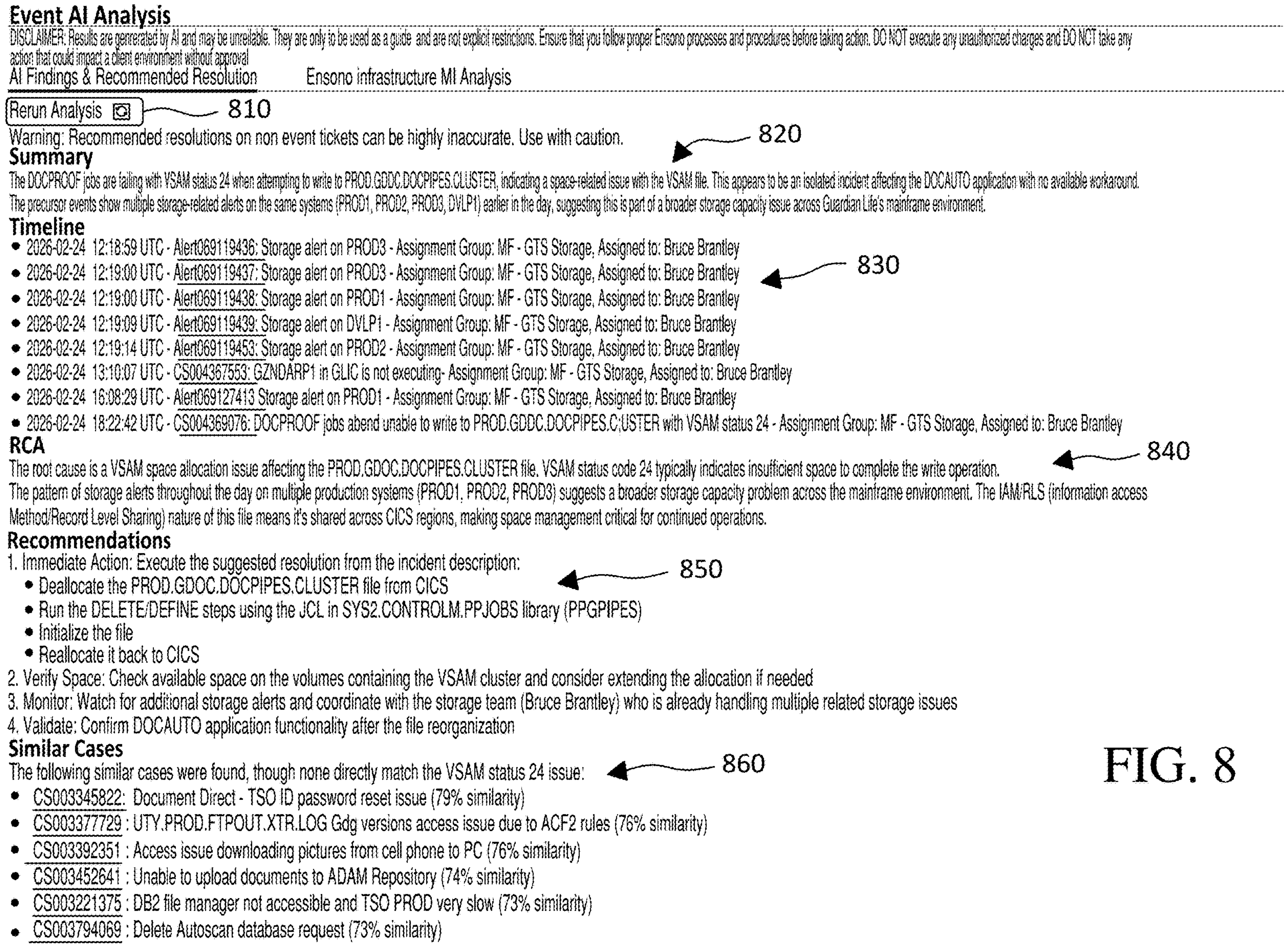
FIG. 8 illustrates an example of a display screen of a graphical user interface for an events AI analysis display.

Turning ahead in the drawings, FIG. 8 illustrates a display screen for graphical user interface (GUI) 800 for an events AI analysis display, according to an embodiment. In some embodiments, GUI 800 can be an example of a graphical user interface displayed on GUI 323 (FIG. 3A) of user device 322 (FIG. 3A) and/or generated by diagnostic system 315 (FIG. 3A). In some embodiments, GUI 800 can display the results generated by method 600 (FIG. 6) and/or diagnostic system 315 (FIG. 3A) for an active incident on live IT infrastructure. In some embodiments, GUI 800 can include a tab panel with selectable tabs, such as a tab for AI findings and recommended resolution and/or a tab for infrastructure major incident analysis.

In some embodiments, GUI 800 can include a rerun analysis control 810, which can be used for re-executing the diagnostic analysis on the active incident.

In some embodiments, GUI 800 can include a summary section 820, which can display descriptive text regarding the active incident, such as a description of the failure, the affected application, the affected systems, and/or precursor events. In some embodiments, summary section 820 can describe the incident as affecting live IT infrastructure, such as production systems, and/or can reference precursor events showing related alerts on the same and/or related systems earlier in the day.

In some embodiments, GUI 800 can include a timeline section 830, which can display a chronological list of events with timestamps, alert identifiers displayed as hyperlinks, event descriptions, assignment group designations, and/or assignee information. In some embodiments, the timeline entries can span a time period leading up to the incident and can include alerts, cases, and/or other operational events on live IT infrastructure. In some embodiments, each entry in timeline section 830 can show the assignment group and/or the assigned individual responsible for the event.

In some embodiments, GUI 800 can include a root cause analysis (RCA) section 840, which can describe the root cause of the incident based on the operational telemetry data, the timeline of preceding events, and/or the LLM analysis. In some embodiments, root cause analysis section 840 can identify patterns of alerts throughout the day on multiple production systems and/or can describe the broader operational context of the incident on the affected live IT infrastructure.

In some embodiments, GUI 800 can include a recommendations section 850, which can include items for immediate action, verification, monitoring, and/or validation steps. In some embodiments, the immediate action items can include specific commands, procedures, and/or configuration changes to be performed on the affected live IT infrastructure. In some embodiments, additional recommendations can address verifying available resources, monitoring for additional alerts, coordinating with operations teams, and/or confirming application functionality after remediation.

In some embodiments, GUI 800 can include a similar cases section 860. In some embodiments, similar cases section 860 can display a list of similar historical cases with case identifiers displayed as hyperlinks and/or similarity percentages. In some embodiments, the similarity percentages can indicate the degree of contextual similarity between the active incident and each similar historical case, as determined by similarity intelligence system 373 (FIG. 3B). In some embodiments, the similar cases can include descriptions of the historical incidents to enable user 321 (FIG. 3A) to reference past resolutions and/or patterns for the active incident on live IT infrastructure.

Figure 12:
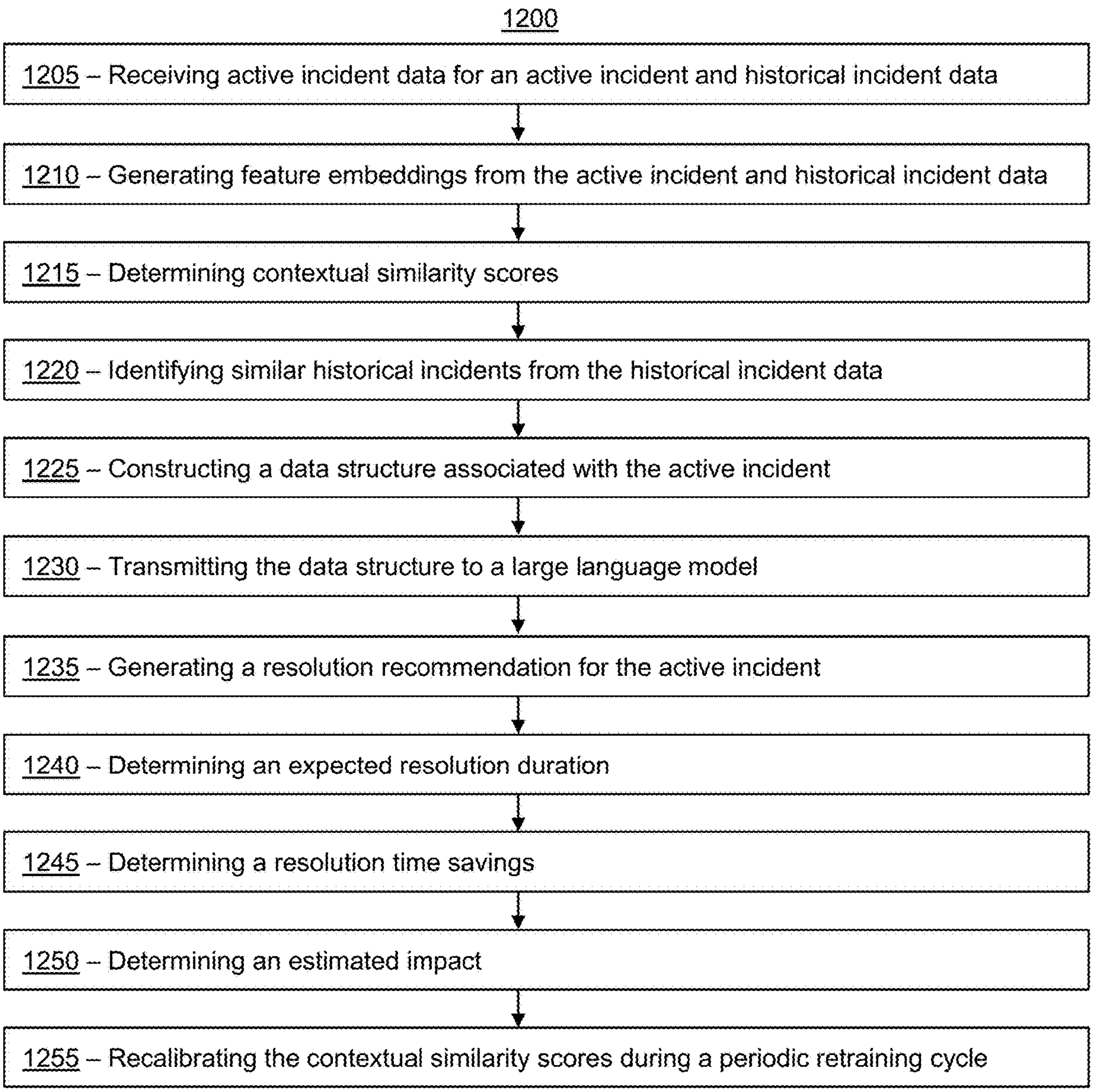
FIG. 12 illustrates a flowchart for a method for diagnostic incident resolution, according to an embodiment.

Jumping ahead in the drawings, FIG. 12 illustrates a flowchart for a method 1200 for diagnostic incident resolution, according to an embodiment. Method 1200 is exemplary and is not limited to the embodiments presented herein. The method can be employed in many different embodiments or examples not specifically depicted or described in this disclosure. In some embodiments, the procedures, processes, and/or activities of method 1200 can be executed in the sequence presented. In alternative embodiments, the procedures, processes, and/or activities of method 1200 can be executed in another suitable order. In further embodiments, one or more of the procedures, processes, and/or activities of method 1200 can be combined or omitted.

In various embodiments, system 300 (FIG. 3A), AI operations management system 310 (FIG. 3A), and/or diagnostic system 315 (FIG. 3A) can be suitably configured to perform method 1200 and/or one or more of the activities of method 1200. In these or other embodiments, one or more of the activities of method 1200 can be implemented as computing instructions configured to execute on one or more processors and stored on one or more non-transitory computer-readable media. Such non-transitory computer-readable media can be part of system 300 (FIG. 3A). The processor(s) can be similar or identical to the processor(s) described with respect to computer system 100 (FIG. 1).

Referring to FIG. 12, method 1200 can include an activity 1205 of receiving active incident data for an active incident and historical incident data. The active incident data can include active incident information and/or active configuration item information. The historical incident data can include historical incident information, historical configuration item information, and/or historical resolution outcomes. In some embodiments, the active incident information can include incident short descriptions, descriptions, journal entries, work notes, assignment group transitions, configuration item metadata, opened timestamps, and/or business pause duration. In some embodiments, the historical incident information can include resolution codes, resolved timestamps, and/or work-time tracking data. In some embodiments, the historical incident data can include cross-tenant historical incident data from a plurality of tenants. In some embodiments, the active incident data can be received from ITSM platform 341 (FIG. 3A) and/or data store 318 (FIG. 3A) in response to an incident on live computing infrastructure, such as a production outage, a service degradation, and/or an application failure affecting mainframes, distributed systems, networks, and/or cloud platforms. In some embodiments, activity 1205 can be performed by data ingestion system 371 (FIG. 3B).

In many embodiments, method 1200 can include an activity 1210 of generating feature embeddings from the active incident data and the historical incident data. The feature embeddings can include semantic embeddings and/or structured operational metadata embeddings. In some embodiments, the semantic embeddings can be generated using semantic NLP encoding of incident descriptions, resolution code embeddings, and/or other suitable natural language processing techniques. In some embodiments, the semantic NLP encoding can be performed using sentence transformer models, word embedding models such as word2vec and/or GloVe, TF-IDF (term frequency-inverse document frequency) vectors, and/or other suitable embedding models that can convert text descriptions into numerical vector representations. In some embodiments, the structured operational metadata embeddings can be generated from configuration item clustering, assignment group vectors, and/or temporal resolution patterns. In some embodiments, configuration item clustering can include grouping configuration items based on configuration item class, environment, service level, and/or operational characteristics using clustering techniques, such as k-means clustering, hierarchical clustering, and/or other suitable clustering algorithms. In some embodiments, the feature embeddings can produce a unified similarity feature representation that combines both semantic and structured operational dimensions. In some embodiments, the feature embeddings can include Jaro-Winkler similarity scores as a method for identifying similar historical cases, vector embeddings for semantic similarity, operational metadata vectors, and/or hybrid structured and unstructured similarity scoring. In some embodiments, activity 1210 can be performed by feature extraction and embedding system 372 (FIG. 3B).

In many embodiments, method 1200 can include an activity 1215 of determining contextual similarity scores between the active incident data and the historical incident data based at least on the feature embeddings. In some embodiments, determining the contextual similarity scores can include applying string similarity scoring, such as Jaro-Winkler similarity, and/or weighted semantic similarity to the active incident data and the historical incident data. In some embodiments, Jaro-Winkler similarity can be a string similarity metric that measures the similarity between two strings based on the number of matching characters, the number of transpositions, and/or a prefix bonus for strings that share a common prefix. In some embodiments, the Jaro-Winkler similarity can produce a score between zero and one, in which higher scores can indicate greater similarity between the two strings. In some embodiments, the contextual similarity scores can be determined using weighted semantic similarity, structured metadata alignment, configuration item match weighting, assignment group weighting, and/or resolution pattern similarity. In some embodiments, a composite similarity score can be produced using weighted aggregation of NLP semantic embeddings, structured metadata similarity, configuration item-level correlation, and/or assignment group transition patterns. In some embodiments, the weighted aggregation can include assigning a weight to each similarity dimension, such as a weight for semantic similarity, a weight for structured metadata alignment, a weight for configuration item match, a weight for assignment group match, and/or a weight for resolution pattern similarity. In some embodiments, the composite similarity score can be determined by determining a weighted sum and/or a weighted average of the individual similarity dimension scores. In some embodiments, the weights for each similarity dimension can be configurable and/or can be dynamically adjusted based on resolution outcomes during periodic retraining cycles. In some embodiments, activity 1215 can be performed by similarity intelligence system 373 (FIG. 3B).

In many embodiments, method 1200 can include an activity 1220 of identifying one or more similar historical incidents from the historical incident data based at least on the contextual similarity scores. In some embodiments, identifying the one or more similar historical incidents can include ranking candidate similar cases and/or returning a top number of matches. In some embodiments, identifying the one or more similar historical incidents can include selecting historical incidents having a confidence score that meets or exceeds a confidence threshold. In some embodiments, the confidence threshold can be based at least on one or more of embedding stability, historical recommendation accuracy, and/or resolution consistency. In some embodiments, embedding stability can refer to the consistency of the embedding vectors across multiple evaluations and/or across similar input variations. In some embodiments, historical recommendation accuracy can refer to the proportion of past recommendations from similar cases that led to successful resolution. In some embodiments, resolution consistency can refer to the degree to which similar historical cases had consistent resolution approaches and/or resolution outcomes. In some embodiments, low-confidence matches can be excluded and/or deprioritized. In some embodiments, patterns learned from one tenant's incident resolutions can be used to inform recommendations for another tenant with similar infrastructure profiles. In some embodiments, tenant-specific thresholds can restrict cross-tenant visibility while preserving pattern learning. In some embodiments, activity 1220 can be performed by similarity intelligence system 373 (FIG. 3B) and/or confidence scoring system 374 (FIG. 3B).

In many embodiments, method 1200 can include an activity 1225 of constructing a data structure associated with the active incident. In some embodiments, the data structure can be a JSON data structure. In some embodiments, the data structure can include concatenated alerts, changes, incidents, and/or requests associated with the active incident. In some embodiments, the data structure can include fields for alert identifiers, alert descriptions, alert timestamps, change identifiers, change descriptions, change timestamps, incident identifiers, incident descriptions, incident timestamps, request identifiers, request descriptions, request timestamps, configuration item identifiers, assignment group designations, and/or priority levels. In some embodiments, the data structure also can include the one or more similar historical incidents identified at activity 1220 and/or case details for the one or more similar historical incidents. In some embodiments, activity 1225 can be performed by feature extraction and embedding system 372 (FIG. 3B).

In many embodiments, method 1200 can include an activity 1230 of transmitting the data structure to a large language model. In some embodiments, the data structure can be transmitted to LLM system 343 (FIG. 3A). In some embodiments, LLM system 343 can use custom prompting strategies to drive summarization of incident-related details. In some embodiments, the custom prompting strategies can include structured prompt templates that instruct LLM system 343 to generate specific output types from the data structure, such as an incident summary, a root cause analysis, and/or resolution recommendations. In some embodiments, the custom prompting strategies can include instructions for LLM system 343 to identify relationships between preceding events and the active incident, assign ownership information to timeline entries, and/or prioritize recommendations based on the severity and/or urgency of the incident. In some embodiments, the custom prompting strategies can include instructions for LLM system 343 to generate output in a structured format, such as separate sections for incident summary, root cause analysis, and/or recommendations. In some embodiments, activity 1230 can be performed by diagnostic system 315 (FIG. 3A) and/or feature extraction and embedding system 372 (FIG. 3B).

In many embodiments, method 1200 can include an activity 1235 of generating a resolution recommendation for the active incident based at least on the one or more similar historical incidents. In some embodiments, the resolution recommendation can be based at least in part on an output of LLM system 343 (FIG. 3A). In some embodiments, the resolution recommendation can include an incident summary describing the incident, affected systems, affected applications, and/or precursor events on live computing infrastructure. In some embodiments, the resolution recommendation can include a root cause analysis identifying underlying causes of the incident based on the operational telemetry data, the timeline of preceding events, and/or the LLM analysis. In some embodiments, the resolution recommendation can include actionable resolution steps, such as specific commands, procedures, verification steps, and/or configuration changes to be performed on the affected live computing infrastructure. In some embodiments, the resolution recommendation can enable operations personnel to resolve incidents on live computing infrastructure with reduced manual investigation. In some embodiments, the resolution recommendation can include specific remediation steps for the affected live computing infrastructure, such as deallocating files, running maintenance procedures, restarting services, verifying system resources, and/or coordinating with operations teams responsible for the affected systems. In some embodiments, the resolution recommendation can reduce the number of teams involved in incident resolution and/or reduce the time to resolve the incident on the affected live computing infrastructure. In some embodiments, the resolution recommendation can be posted as work notes, journal entries, and/or resolution notes within the incident record in ITSM platform 341 (FIG. 3A). In some embodiments, activity 1235 can be performed by diagnostic system 315 (FIG. 3A).

In many embodiments, method 1200 can include an activity 1240 of determining an expected resolution duration based at least on the historical resolution outcomes associated with the one or more similar historical incidents. In some embodiments, determining the expected resolution duration can include determining one or more of a total cycle time, a business-hour resolution time, and/or an active work time excluding pause durations. In some embodiments, the total cycle time can represent wall clock time from incident open to incident close. In some embodiments, the business-hour resolution time can represent time counted during business hours. In some embodiments, the active work time can represent time in which operations personnel are actively working on the incident, excluding pause durations such as waiting on customer response and/or business pauses. In some embodiments, the expected resolution duration can include average MTTR, median MTTR, business-hour MTTR, and/or active work-time MTTR of the one or more similar historical incidents. In some embodiments, activity 1240 can be performed by resolution benchmarking system 375 (FIG. 3B).

In many embodiments, method 1200 can include an activity 1245 of determining a resolution time savings by comparing an actual resolution duration of the active incident against the expected resolution duration. In some embodiments, the resolution time savings can represent the difference between the expected resolution duration and the actual resolution duration. In some embodiments, the resolution time savings can be determined for each of the total cycle time, the business-hour resolution time, and/or the active work time. In some embodiments, activity 1245 can be performed by acceleration quantification system 376 (FIG. 3B).

In many embodiments, method 1200 can include an activity 1250 of determining an estimated impact based at least on the resolution time savings, an average hourly labor cost, and/or an average personnel count. In some embodiments, the average personnel count can be derived from historical participation patterns associated with the one or more similar historical incidents. In some embodiments, the estimated impact can be determined using a formula, such as estimated impact equals the resolution time savings multiplied by the average hourly labor cost multiplied by the average personnel count. In some embodiments, the estimated impact can provide measurable financial impact attribution for the diagnostic incident resolution process. In some embodiments, activity 1250 can be performed by acceleration quantification system 376 (FIG. 3B).

In many embodiments, method 1200 can include an activity 1255 of recalibrating the contextual similarity scores during a periodic retraining cycle based at least on post-resolution outcomes associated with the one or more similar historical incidents. In some embodiments, the recalibration can include recording whether recommendations were acted upon, user feedback ratings, post-resolution outcomes, and/or deviation from predicted benchmarks. In some embodiments, similarity weighting can be dynamically adjusted during retraining based on whether similar case recommendations led to faster resolution, post-resolution feedback, and/or false similarity correlations. In some embodiments, the periodic retraining cycle can use resolution effectiveness data to recalibrate the similarity model. In some embodiments, activity 1255 can be performed by feedback and learning system 377 (FIG. 3B).

Change Risk System

Returning to FIG. 3B, in many embodiments, change risk system 316 can include a data ingestion system 381, a compliance risk scoring system 382, a behavioral risk intelligence system 383, a similarity and historical failure system 384, a major incident risk prediction system 385, a document quality evaluation system 386, a CMDB intelligence system 387, a conflict detection system 388, an AI recommendation system 389, and/or other suitable systems.

In many embodiments, data ingestion system 381 can receive change request data and/or historical change outcome data. In some embodiments, data ingestion system 381 can ingest change request metadata, such as risk, impact, type, and/or category, assignment group and/or requestor history, CMDB configuration item attributes, such as environment, service level, and/or operational status, historical change outcomes, such as success, failure, and/or backout, major incident linkage data, implementation windows and/or timestamps, documentation fields, such as test plan, backout plan, and/or implementation plan, change reassignment counts, compliance state transition timestamps, attachment evidence, and/or conflict detection results. In some embodiments, data can be retrieved from enterprise ITSM and/or CMDB systems. In some embodiments, data ingestion system 381 can be part of or communicate with data ingestion system 312 (FIG. 3A).

In many embodiments, compliance risk scoring system 382 can evaluate timing and/or governance compliance risks. In some embodiments, compliance risk scoring system 382 can evaluate window duration analysis, late state transition prediction, owner late closure history, rushed change detection, retroactive change detection, unauthorized change behavior patterns, and/or production flag mismatch with CMDB environment. In some embodiments, each factor can contribute to a bounded risk score, such as a score from zero to one hundred. In some embodiments, compliance risk scoring system 382 can generate urgent alerts when a change window has ended without proper state transition, when a production mismatch is detected, and/or when a critical compliance timing violation is imminent.

In many embodiments, behavioral risk intelligence system 383 can analyze historical performance of change owners and/or teams. In some embodiments, behavioral risk intelligence system 383 can analyze historical performance of assignment groups, change owners, and/or clients. In some embodiments, metrics can include success rate, major incident causation rate, late closure rate, recent failures, and/or unauthorized or retroactive change patterns. In some embodiments, risk scores can be adjusted based on threshold-based behavioral patterns and/or relative performance versus organizational baseline.

In many embodiments, similarity and historical failure system 384 can identify similar historical changes and/or extract failure causes. In some embodiments, similarity and historical failure system 384 can retrieve historical failed changes on the same configuration item, similar changes by description similarity using a Jaro-Winkler threshold, similar changes by configuration item class and/or category, and/or cross-team similarity matches. In some embodiments, similarity and historical failure system 384 can extract historical failure causes, identify recurring technical failure modes, generate specific and/or actionable mitigation steps, and/or determine a similarity-weighted major incident causation rate. In some embodiments, similarity and historical failure system 384 can function as a preventive intelligence engine.

In many embodiments, MI risk prediction system 385 can predict probability of MI causation. In some embodiments, MI risk prediction system 385 can use a hybrid model that determines a heuristic MI risk score based on risk classification, impact level, configuration item production status, high-risk keywords, missing rollback plan, similar change MI history, configuration item historical MI count, team MI rate, and/or scheduling factors. In some embodiments, MI risk prediction system 385 can invoke LLM system 343 (FIG. 3A) to contextualize structured risk factors, weigh historical MI evidence, and/or produce a probability classification, such as high, medium, or low, a confidence score, a key risk factor, and/or an actionable recommendation. In some embodiments, if LLM system 343 fails, a heuristic fallback classification can be applied. In some embodiments, this hybrid architecture can advantageously provide deterministic stability and/or contextual reasoning.

In many embodiments, document quality evaluation system 386 can score documentation completeness. In some embodiments, document quality evaluation system 386 can use language model evaluation to score short description clarity, assess test plan completeness, evaluate rollback sufficiency, identify ambiguous and/or vague language, and/or detect missing success criteria. In some embodiments, document quality evaluation system 386 can output section-level quality scores, an overall documentation score, such as a score from zero to one hundred, a critical gaps list, and/or a risk rating, such as low, medium, high, or critical.

In many embodiments, CMDB intelligence system 387 can analyze configuration item attributes. In some embodiments, CMDB intelligence system 387 can analyze environment, such as production, test, or development, service level, such as premium or unmanaged, operational status, lifecycle stage, and/or configuration item class, such as database, cluster, firewall, or mainframe. In some embodiments, CMDB intelligence system 387 can adjust risk scores based on production and/or premium classification, high-risk configuration item classes, operational live systems, and/or non-production mitigating factors.

In many embodiments, conflict detection system 388 can identify scheduling conflicts. In some embodiments, conflict detection system 388 can identify same-configuration-item overlapping changes, same-client overlapping windows, and/or state-based conflict conditions. In some embodiments, conflict detection system 388 can calculate overlap duration, risk of concurrency collision, and/or scheduling congestion.

In many embodiments, AI recommendation system 389 can generate approval recommendations with explainable justifications. In some embodiments, AI recommendation system 389 can aggregate compliance risk score, MI risk score, documentation quality, historical intelligence, conflict analysis, behavioral metrics, and/or structured risk assessment t answers. In some embodiments, AI recommendation system 389 can feed structured context into LLM system 343 (FIG. 3A) with approval policy rules. In some embodiments, AI recommendation system 389 can construct a data structure, such as a JSON data structure, which can include concatenated alerts, changes, incidents, and/or requests data for language model analysis. In some embodiments, custom prompting strategies can be employed to drive summarization of change-related details. In some embodiments, AI recommendation system 389 can output structured data, such as JSON data, including an overall situation summary, field-by-field flag analysis, such as green, yellow, and/or red classifications, a final recommendation, key concerns, and/or a confidence score. In some embodiments, AI recommendation system 389 can generate approval recommendations, such as auto-approve recommendations, needs-review recommendations, and/or manual-approval recommendations. In some embodiments, AI recommendation system 389 can advantageously create explainable AI decision-making rather than opaque classifications.

Figure 9:
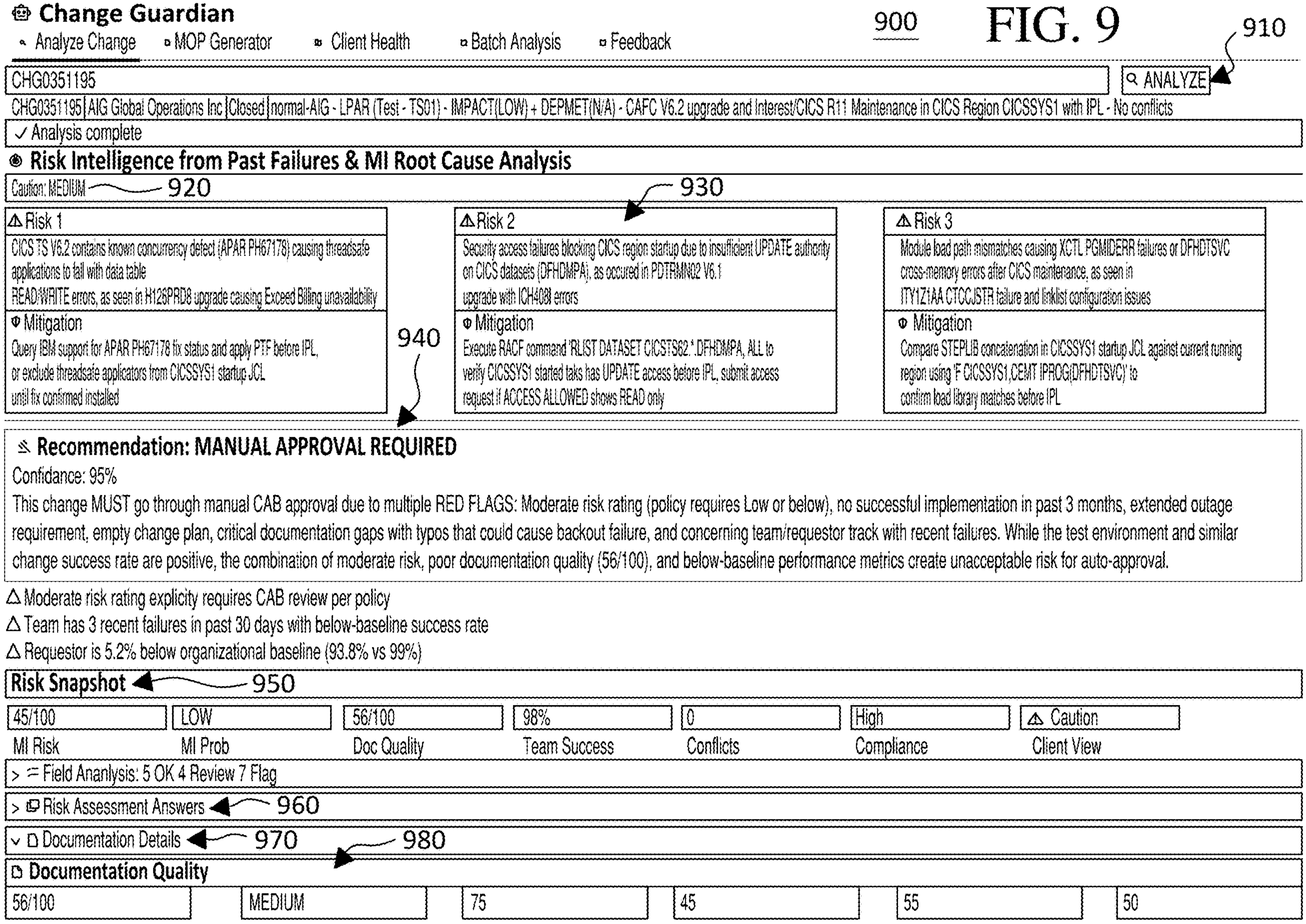
FIG. 9 illustrates an example of a display screen of a graphical user interface for a change risk evaluation display.

Jumping ahead in the drawings, FIG. 9 illustrates a display screen of a graphical user interface (GUI) 900 for a change risk evaluation display, according to an embodiment. In some embodiments, GUI 900 can be an example of a graphical user interface displayed on GUI 323 (FIG. 3A) of user device 322 (FIG. 3A) and/or generated by change risk system 316 (FIG. 3A). In some embodiments, GUI 900 can display the results generated by change risk system 316 (FIG. 3A) for a change request affecting live IT infrastructure. In some embodiments, GUI 900 can include navigation tabs such as an analyze change tab, a method of procedure generator tab, a client health tab, a batch analysis tab, and/or a feedback tab, and/or a change request identifier field with an analyze selector 910 for initiating a change risk assessment.

In some embodiments, GUI 900 can display change request metadata, such as a change request identifier, a tenant name, a status, a priority, a change type, an impact level, a description of the change, and/or a conflict detection status. In some embodiments, GUI 900 can include a status indicator showing analysis completion status.

In some embodiments, GUI 900 can include a risk intelligence section with risk intelligence from past failures and/or major incident root cause analysis. In some embodiments, the risk intelligence section can include a caution level indicator 920, such as low, medium, or high. In some embodiments, the risk intelligence section can include one or more risk panels 930, in which each risk panel can display a specific risk description identifying a historical failure pattern, a technical issue, and/or a potential impact on live IT infrastructure. In some embodiments, the risk panels can each include a mitigation section describing specific remediation steps, verification procedures, and/or configuration changes to address the identified risk on the affected live IT infrastructure.

In some embodiments, GUI 900 can include a recommendation section 940. In some embodiments, recommendation section 940 can display an approval recommendation, such as an auto-approve recommendation, a needs-review recommendation, and/or a manual-approval recommendation. In some embodiments, recommendation section 940 can display a confidence percentage indicating the confidence level of the approval recommendation. In some embodiments, recommendation section 940 can include an explainable justification describing the factors contributing to the approval recommendation, such as risk rating, implementation history, outage requirements, documentation gaps, and/or team performance metrics. In some embodiments, recommendation section 940 can include one or more warning indicators identifying specific policy requirements, recent failure history, and/or performance deviations relative to organizational baseline.

In some embodiments, GUI 900 can include a risk snapshot section 950. In some embodiments, risk snapshot section 950 can display a plurality of risk metrics in colored indicators, such as a major incident risk score displayed as a numerical value out of one hundred, a major incident probability displayed as a classification such as low, medium, or high, a documentation quality score displayed as a numerical value out of one hundred, a team success rate displayed as a percentage, a conflicts count displayed as a numerical value, a compliance indicator displayed as a classification such as low, medium, or high, and/or a client view indicator. In some embodiments, the colored indicators can use color coding to indicate risk levels, such as green for low risk, yellow for medium risk, and/or red for high risk.

In some embodiments, GUI 900 can include a field analysis section 960. In some embodiments, field analysis section 960 can display a summary of field-level analysis results, such as a count of fields with acceptable status, a count of fields requiring review, and/or a count of fields with flagged issues.

In some embodiments, GUI 900 can include a risk assessment answers section 970. In some embodiments, risk assessment answers section 970 can be expandable to display detailed risk assessment responses.

In some embodiments, GUI 900 can include a documentation quality section 980. In some embodiments, documentation quality section 980 can display an overall documentation quality score, such as a numerical value out of one hundred, and/or a quality classification, such as low, medium, or high. In some embodiments, documentation quality section 980 can display individual component scores for different documentation aspects, such as short description clarity, test plan completeness, rollback plan sufficiency, and/or implementation plan quality. In some embodiments, the individual component scores can be displayed in colored cells indicating quality levels, such as green for acceptable quality, yellow for review needed, and/or red for flagged issues.

In some embodiments, GUI 900 can enable user 321 (FIG. 3A) to evaluate change risk, review historical failure patterns, understand approval recommendations with explainable justifications, and/or make informed decisions about change approval for changes affecting live IT infrastructure. In some embodiments, the risk intelligence, approval recommendations, and/or documentation quality assessments displayed in GUI 900 can support change advisory board review processes and/or automated change governance workflows.

Figure 13:
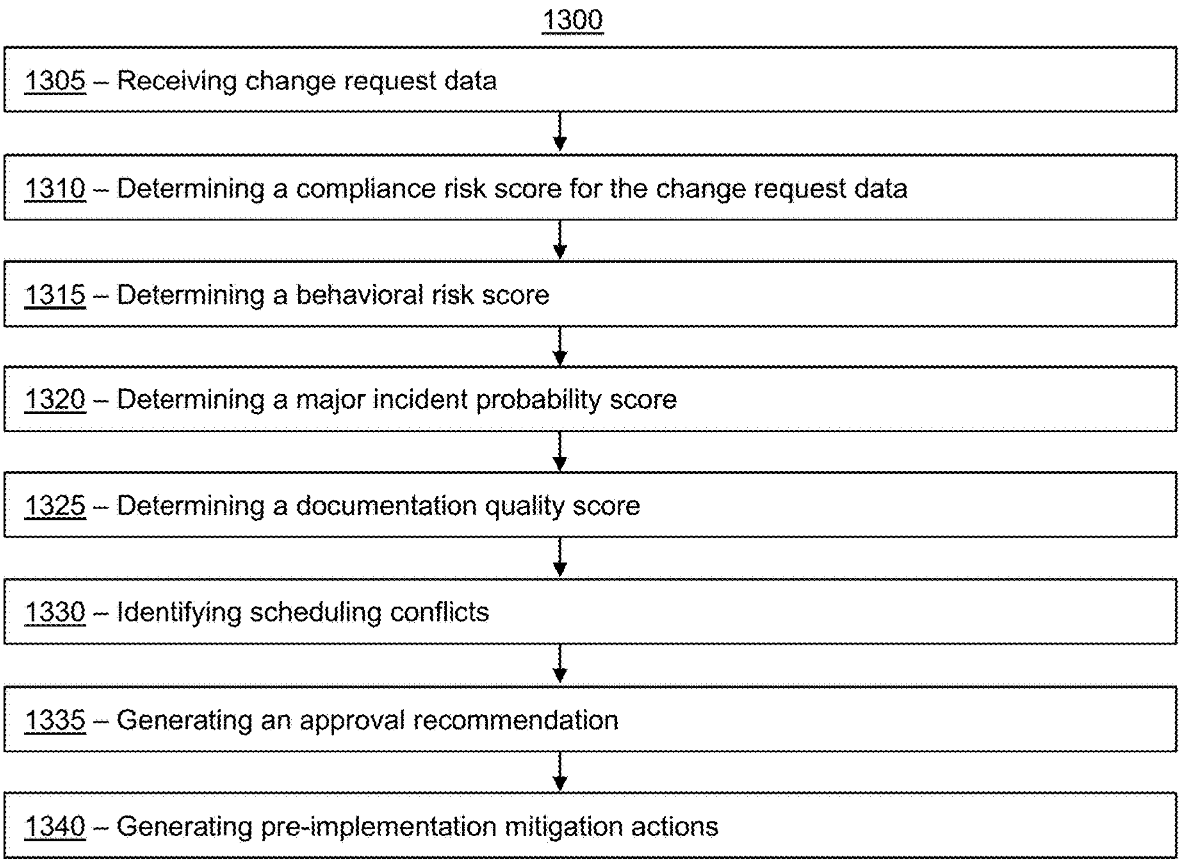
FIG. 13 illustrates a flowchart for a method for change risk evaluation, according to an embodiment.

Jumping ahead in the drawings, FIG. 13 illustrates a flowchart for a method 1300 for change risk evaluation, according to an embodiment. Method 1300 is exemplary and is not limited to the embodiments presented herein. The method can be employed in many different embodiments or examples not specifically depicted or described in this disclosure. In some embodiments, the procedures, processes, and/or activities of method 1300 can be executed in the sequence presented. In alternative embodiments, the procedures, processes, and/or activities of method 1300 can be executed in another suitable order. In further embodiments, one or more of the procedures, processes, and/or activities of method 1300 can be combined or omitted.

In various embodiments, system 300 (FIG. 3A), AI operations management system 310 (FIG. 3A), and/or change risk system 316 (FIG. 3A) can be suitably configured to perform method 1300 and/or one or more of the activities of method 1300. In these or other embodiments, one or more of the activities of method 1300 can be implemented as computing instructions configured to execute on one or more processors and stored on one or more non-transitory computer-readable media. Such non-transitory computer-readable media can be part of system 300 (FIG. 3A). The processor(s) can be similar or identical to the processor(s) described with respect to computer system 100 (FIG. 1).

Referring to FIG. 13, method 1300 can include an activity 1305 of receiving change request data. The change request data can include change request metadata, configuration item attributes, and/or historical change outcome data. In some embodiments, the change request metadata can include risk, impact, type, and/or category designations, assignment group and/or requestor history, implementation windows and/or timestamps, documentation fields such as test plan, backout plan, and/or implementation plan, change reassignment counts, compliance state transition timestamps, and/or attachment evidence. In some embodiments, the configuration item attributes can include CMDB configuration item attributes, such as environment, service level, and/or operational status. In some embodiments, the historical change outcome data can include success, failure, and/or backout outcomes, major incident linkage data, and/or conflict detection results. In some embodiments, the change request data can pertain to a proposed change to live IT infrastructure, such as a software upgrade, a maintenance operation, a configuration modification, and/or a hardware replacement on production systems. In some embodiments, activity 1305 can be performed by data ingestion system 381 (FIG. 3B).

In many embodiments, method 1300 can include an activity 1310 of determining a compliance risk score for the change request data based at least on timing and governance factors. In some embodiments, the timing and governance factors can include window duration analysis, late state transition prediction, owner late closure history, rushed change detection, retroactive change detection, unauthorized change behavior patterns, and/or production flag mismatch with CMDB environment. In some embodiments, each factor can contribute to a bounded risk score, such as a score from zero to one hundred, in which zero can indicate low compliance risk and one hundred can indicate high compliance risk. In some embodiments, the compliance risk score can be determined by assigning a weighted score to each timing and governance factor and/or determining a weighted sum and/or a maximum of the individual factor scores. In some embodiments, determining the compliance risk score can include evaluating one or more of a state transition timing analysis, a rushed change detection, and/or a production flag mismatch between the change request data and a configuration management database environment classification. In some embodiments, the compliance risk score can include cross-checking a change production system flag against a CMDB environment classification, and if a mismatch is detected, escalating the compliance risk, generating an urgent warning, and/or flagging a data integrity inconsistency. In some embodiments, compliance risk scoring system 382 (FIG. 3B) can generate urgent alerts when a change window has ended without proper state transition, when a production mismatch is detected, and/or when a compliance timing violation is imminent. In some embodiments, activity 1310 can be performed by compliance risk scoring system 382 (FIG. 3B).

In many embodiments, method 1300 can include an activity 1315 of determining a behavioral risk score based at least on a historical performance of a change owner. In some embodiments, determining the behavioral risk score can include evaluating one or more of a success rate, a major incident causation rate, a late closure rate, and/or an unauthorized change pattern associated with the change owner. In some embodiments, the behavioral risk score also can be based on historical performance of an assignment group and/or a client associated with the change request. In some embodiments, the behavioral risk score can include evaluating recent failures, unauthorized and/or retroactive change patterns, and/or relative performance versus organizational baseline. In some embodiments, the organizational baseline can be determined from aggregate performance metrics across all change owners and/or assignment groups within a tenant and/or across multiple tenants. In some embodiments, the behavioral risk score can be increased when the change owner's performance metrics fall below the organizational baseline by a threshold amount, such as when the change owner's success rate is a percentage below the organizational baseline success rate. In some embodiments, a high late closure rate can increase the compliance risk, retroactive changes can increase governance risk, and/or a high major incident team rate can increase incident probability. In some embodiments, the behavioral risk score can embed human behavioral modeling into the change approval logic. In some embodiments, activity 1315 can be performed by behavioral risk intelligence system 383 (FIG. 3B).

In many embodiments, method 1300 can include an activity 1320 of determining a major incident probability score based at least on the change request data and the historical change outcome data. In some embodiments, determining the major incident probability score can include determining a heuristic major incident risk score based on risk classification, impact level, configuration item production status, high-risk keywords, missing rollback plan, similar change major incident history, configuration item historical major incident count, team major incident rate, and/or scheduling factors.

In some embodiments, determining the major incident probability score can include identifying one or more similar historical changes based on string similarity scoring applied to the change request data and the historical change outcome data. In some embodiments, the string similarity scoring can include Jaro-Winkler similarity applied to change descriptions and/or other textual fields. In some embodiments, identifying the one or more similar historical changes can include retrieving historical failed changes on the same configuration item, similar changes by description similarity using a Jaro-Winkler threshold, similar changes by configuration item class and/or category, and/or cross-team similarity matches. In some embodiments, from the one or more similar historical changes, the system can extract historical failure causes, identify recurring technical failure modes, and/or determine a similarity-weighted major incident causation rate. In some embodiments, extracting historical failure causes can include extracting close notes from failed historical changes and/or identifying specific failure causes from the close notes. In some embodiments, activity 1320 can be performed by MI risk prediction system 385 (FIG. 3B) and/or similarity and historical failure system 384 (FIG. 3B).

In many embodiments, method 1300 can include an activity 1325 of determining a documentation quality score based at least on an evaluation of documentation fields associated with the change request data. In some embodiments, the documentation quality score can be based on language model evaluation of short description clarity, test plan completeness, rollback sufficiency, ambiguous and/or vague language, and/or missing success criteria. In some embodiments, the documentation quality evaluation can identify specific documentation gaps, such as missing shutdown commands, missing pre-implementation verification steps, missing success criteria, and/or missing rollback procedures. In some embodiments, the documentation quality evaluation can provide specific reasons for each quality score, enabling operations personnel to address the identified gaps prior to change implementation on live IT infrastructure. In some embodiments, the documentation quality outputs can include section-level quality scores, an overall documentation score such as a score from zero to one hundred, a critical gaps list, and/or a risk rating such as low, medium, high, and/or critical. In some embodiments, the approval recommendation can be further based on the documentation quality score. In some embodiments, activity 1325 can be performed by document quality evaluation system 386 (FIG. 3B).

In many embodiments, method 1300 can include an activity 1330 of identifying scheduling conflicts based at least on the change request data and one or more concurrent change requests. In some embodiments, the scheduling conflicts can include same-configuration-item overlapping changes, same-client overlapping windows, and/or state-based conflict conditions. In some embodiments, identifying the scheduling conflicts can include determining overlap duration, risk of concurrency collision, and/or scheduling congestion. In some embodiments, the approval recommendation can be further based on the scheduling conflicts. In some embodiments, activity 1330 can be performed by conflict detection system 388 (FIG. 3B).

In many embodiments, method 1300 can include an activity 1335 of generating an approval recommendation based at least on an aggregation of the compliance risk score, the behavioral risk score, and the major incident probability score. In some embodiments, the approval recommendation also can be based on the documentation quality score from activity 1325 and/or the scheduling conflicts from activity 1330. In some embodiments, generating the approval recommendation can include generating, by LLM system 343 (FIG. 3A) based on the compliance risk score, the behavioral risk score, the major incident probability score, and/or the change request data, a contextual risk evaluation. In some embodiments, the structured context fed to LLM system 343 can include the compliance risk score, the major incident risk score, the documentation quality score, historical intelligence from the one or more similar historical changes, conflict analysis results, behavioral metrics, and/or structured risk assessment answers. In some embodiments, the structured context also can include approval policy rules that define the criteria for auto-approve, needs-review, and/or manual-approval recommendations.

In some embodiments, the contextual risk evaluation can include a risk classification, an explainable justification, and/or a field-level flag classification for each of the compliance risk score, the behavioral risk score, and/or the major incident probability score. In some embodiments, the field-level flag classification can include green, yellow, and/or red classifications for each risk dimension. In some embodiments, the approval recommendation can include an auto-approve recommendation, a needs-review recommendation, and/or a manual-approval recommendation. In some embodiments, the auto-approve recommendation can be generated when the compliance risk score is below a low-risk threshold, the documentation quality score meets or exceeds a completeness threshold, no red flag classifications are present in the field-level flag analysis, and/or no major scheduling conflicts are detected. In some embodiments, the needs-review recommendation can be generated when one or more risk factors are at a moderate level. In some embodiments, the manual-approval recommendation can be generated when one or more risk factors exceed a high-risk threshold, such as when the change owner has recent failures, the documentation quality is below a minimum threshold, and/or the major incident probability score exceeds a risk threshold. In some embodiments, the approval recommendation can include an explainable justification describing the factors contributing to the recommendation, such as risk rating, implementation history, outage requirements, documentation gaps, team performance metrics, and/or behavioral risk indicators. In some embodiments, the approval recommendation can be posted to ITSM platform 341 (FIG. 3A) to support change advisory board review processes and/or automated change governance workflows for changes affecting live IT infrastructure. In some embodiments, activity 1335 can be performed by AI recommendation system 389 (FIG. 3B).

In many embodiments, method 1300 also can include an activity 1340 of generating pre-implementation mitigation actions based at least on failure causes extracted from the one or more similar historical changes identified at activity 1320. In some embodiments, the pre-implementation mitigation actions can include specific commands, checks, validation steps, and/or configuration changes to be performed on the affected live IT infrastructure prior to implementing the change. In some embodiments, the pre-implementation mitigation actions can be based on close notes from failed historical changes, recurring technical failure modes, and/or specific failure causes identified from the one or more similar historical changes. In some embodiments, the pre-implementation mitigation actions can include actionable pre-change safeguards, such as verifying security access, confirming load path configurations, checking storage availability, and/or validating system dependencies on the affected live IT infrastructure. In some embodiments, activity 1340 can be performed by similarity and historical failure system 384 (FIG. 3B) and/or AI recommendation system 389 (FIG. 3B).

In some embodiments, change risk system 316 (FIG. 3A) also can generate a method of procedure for a proposed change to live IT infrastructure. In some embodiments, the method of procedure can be generated based on a description of the proposed change, such as a high-level description provided by user 321 (FIG. 3A). In some embodiments, the system can prompt user 321 for clarifying information, such as specific device identifiers, environment designations such as production and/or non-production, and/or availability configurations. In some embodiments, the system can identify similar historical methods of procedure from data store 318 (FIG. 3A), identify which historical methods of procedure were successful, and/or generate a method of procedure based on the successful historical methods of procedure. In some embodiments, the generated method of procedure can include pre-implementation checks, specific commands with time estimates for each command step, an estimated total duration for the change, a risk level assessment, a backout procedure, and/or a communication plan. In some embodiments, the generated method of procedure can be downloaded and/or imported into ITSM platform 341 (FIG. 3A) and/or other change management systems.

Although the methods described above are with reference to the illustrated flowcharts, it will be appreciated that many other ways of performing the activities associated with the method can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although artificial intelligence (AI)-driven predictive, diagnostic, and risk analytics for information technology operations is described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-13 may be modified, and that the foregoing discussion of certain of these embodiments does not necessarily represent a complete description of all possible embodiments. For example, one or more of the procedures, processes, or activities of FIGS. 4A, 4B, 6, and 10-13 may include different procedures, processes, and/or activities and be performed by many different modules, in many different orders or be performed in a different suitable one of FIGS. 4A, 4B, 6, and 10-13. As another example, the systems within system 300 (FIGS. 3A-3B) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A computer-implemented method comprising:

receiving operational telemetry data from one or more monitoring sources and an information technology service management (ITSM) platform, wherein the operational telemetry data comprise alert events, incident records, change requests, and configuration item metadata;

generating structured features from the operational telemetry data, wherein the structured features comprise temporal features, relational features, and cross-tenant features;

routing the operational telemetry data to one or more of a predictive system, a diagnostic system, or a change risk system based at least on an event type of the operational telemetry data;

generating, by the one or more of the predictive system, the diagnostic system, or the change risk system, one or more model outputs based at least on the structured features;

evaluating the one or more model outputs based at least on a confidence score to produce an aggregated risk evaluation; and executing an operational response based at least on the aggregated risk evaluation.

2. The computer-implemented method of claim 1, wherein routing the operational telemetry data comprises:

routing the alert events to the predictive system;

routing the incident records to the diagnostic system; and routing the change requests to the change risk system.

3. The computer-implemented method of claim 1, wherein evaluating the one or more model outputs comprises:

comparing a confidence score for a first output of a cross-tenant machine learning model against a predefined threshold, wherein the first output is one of the one or more model outputs; and routing the operational telemetry data to an infrastructure-specific machine learning model when the confidence score is below the predefined threshold.

4. The computer-implemented method of claim 3, wherein evaluating the one or more model outputs further comprises:

aggregating the first output of the cross-tenant machine learning model and a second output of the infrastructure-specific machine learning model using weighted voting to produce the aggregated risk evaluation.

5. The computer-implemented method of claim 3, wherein evaluating the one or more model outputs further comprises:

escalating to a human-in-the-loop workflow when the confidence score for the first output of the cross-tenant machine learning model and a confidence score for a second output of the infrastructure-specific machine learning model both fall below the predefined threshold.

6. The computer-implemented method of claim 1 further comprising:

correlating a predicted incident generated by the predictive system with a scheduled change request evaluated by the change risk system.

7. The computer-implemented method of claim 6, wherein correlating the predicted incident with the scheduled change request comprises:

increasing a risk score of the scheduled change request when a prediction horizon of the predicted incident intersects with a change window of the scheduled change request.

8. The computer-implemented method of claim 1, wherein:

the structured features are generated from the operational telemetry data aggregated across a plurality of tenants; and the one or more model outputs are generated by one or more machine learning models trained on the operational telemetry data, as aggregated.

9. The computer-implemented method of claim 8 further comprising:

applying tenant-specific thresholds to the one or more model outputs, wherein the tenant-specific thresholds are independently configurable per tenant.

10. The computer-implemented method of claim 1 further comprising:

ingesting actual operational outcomes comprising incident occurrence data, change failure data, and resolution time data; and retraining one or more machine learning models based at least on the actual operational outcomes.

11. The computer-implemented method of claim 1, wherein generating the one or more model outputs comprises:

applying behavioral risk modifiers based at least on a historical performance of a change owner associated with the change request, wherein the historical performance comprises one or more of a success rate, a major incident causation rate, or an unauthorized change pattern.

12. The computer-implemented method of claim 1, wherein the aggregated risk evaluation comprises a unified operational risk score computed from a weighted aggregation of an incident probability, a change risk score, a behavioral risk score, a compliance risk score, and a historical major incident density.

13. The computer-implemented method of claim 1 further comprising:

detecting a feature drift in the operational telemetry data, and triggering a retraining recommendation for one or more machine learning models based at least on the feature drift.

14. The computer-implemented method of claim 1 further comprising:

maintaining a model registry comprising a plurality of predictive and analytical models, wherein:

the model registry stores performance metrics for each model of the plurality of predictive and analytical models; and evaluating the one or more model outputs is based at least in part on the performance metrics.

15. A system comprising one or more processors and one or more non-transitory computer-readable media storing computing instructions that, when executed on the one or more processors, cause the one or more processors to perform operations comprising:

receiving operational telemetry data from one or more monitoring sources and an information technology service management (ITSM) platform, wherein the operational telemetry data comprise alert events, incident records, change requests, and configuration item metadata;

generating structured features from the operational telemetry data, wherein the structured features comprise temporal features, relational features, and cross-tenant features;

routing the operational telemetry data to one or more of a predictive system, a diagnostic system, or a change risk system based at least on an event type of the operational telemetry data;

generating, by the one or more of the predictive system, the diagnostic system, or the change risk system, one or more model outputs based at least on the structured features;

evaluating the one or more model outputs based at least on a confidence score to produce an aggregated risk evaluation; and executing an operational response based at least on the aggregated risk evaluation.

16. The system of claim 15, wherein evaluating the one or more model outputs comprises:

comparing a confidence score for a first output of a cross-tenant machine learning model against a predefined threshold, wherein the first output is one of the one or more model outputs; and routing the operational telemetry data to an infrastructure-specific machine learning model when the confidence score is below the predefined threshold.

17. The system of claim 15, wherein the operations further comprise:

correlating a predicted incident generated by the predictive system with a scheduled change request evaluated by the change risk system.

18. The system of claim 15, wherein:

the structured features are generated from the operational telemetry data aggregated across a plurality of tenants; and the one or more model outputs are generated by one or more machine learning models trained on the aggregated operational telemetry data.

19. The system of claim 15, wherein the operations further comprise:

ingesting actual operational outcomes comprising incident occurrence data, change failure data, and resolution time data; and retraining one or more machine learning models based at least on the actual operational outcomes.

20. One or more non-transitory computer-readable media storing computing instructions that, when executed on one or more processors, cause the one or more processors to perform operations comprising:

receiving operational telemetry data from one or more monitoring sources and an information technology service management (ITSM) platform, wherein the operational telemetry data comprise alert events, incident records, change requests, and configuration item metadata;

generating structured features from the operational telemetry data, wherein the structured features comprise temporal features, relational features, and cross-tenant features;

routing the operational telemetry data to one or more of a predictive system, a diagnostic system, or a change risk system based at least on an event type of the operational telemetry data;

generating, by the one or more of the predictive system, the diagnostic system, or the change risk system, one or more model outputs based at least on the structured features;

evaluating the one or more model outputs based at least on a confidence score to produce an aggregated risk evaluation; and executing an operational response based at least on the aggregated risk evaluation.

* * * * *